(12) United States Patent
Nagata

(10) Patent No.: US 11,778,333 B2
(45) Date of Patent: Oct. 3, 2023

(54) SIGNAL PROCESSING METHOD AND IMAGING APPARATUS

(71) Applicant: SONY SEMICONDUCTOR SOLUTIONS CORPORATION, Kanagawa (JP)

(72) Inventor: Takuma Nagata, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 17/429,765

(22) PCT Filed: Dec. 11, 2019

(86) PCT No.: PCT/JP2019/048497
§ 371 (c)(1),
(2) Date: Aug. 10, 2021

(87) PCT Pub. No.: WO2020/170565
PCT Pub. Date: Aug. 27, 2020

(65) Prior Publication Data
US 2022/0132014 A1    Apr. 28, 2022

(30) Foreign Application Priority Data
Feb. 19, 2019  (JP) ................ 2019-027479

(51) Int. Cl.
*H04N 23/73*  (2023.01)
*H04N 23/67*  (2023.01)
(Continued)

(52) U.S. Cl.
CPC ........... *H04N 23/73* (2023.01); *H04N 23/672* (2023.01); *H04N 25/13* (2023.01); *H04N 25/583* (2023.01)

(58) Field of Classification Search
CPC .............. H04N 5/2353; H04N 9/04551; H04N 5/232122; H04N 5/35554; H04N 23/73;
(Continued)

(56) References Cited

U.S. PATENT DOCUMENTS

2009/0219266 A1   9/2009  Lim
2012/0305750 A1*  12/2012 Barbier ............. H04N 5/35554
                                                              250/208.1
(Continued)

FOREIGN PATENT DOCUMENTS

CN    207573459 U    7/2018
CN    108462841 A    8/2018
(Continued)

OTHER PUBLICATIONS

International Search Report and Written Opinion of PCT Application No. PCT/JP2019/048497, dated Jan. 28, 2020, 09 pages of ISRWO.

*Primary Examiner* — Jason A Flohre
(74) *Attorney, Agent, or Firm* — CHIP LAW GROUP

(57) ABSTRACT

An imaging apparatus according to an embodiment of the present disclosure includes: a plurality of pixels each including a photoelectric conversion element, and disposed in matrix on a light-receiving surface; a plurality of light-receiving lenses provided one by one for each of the plurality of pixels in the plurality of pixels; and a control section that controls exposure times of the plurality of pixels. The control section controls the exposure times of the plurality of pixels to allow exposure times of at least two of the pixels, of the plurality of pixels corresponding to each of the light-receiving lenses, to be the same, and exposure times of at least two of the pixels, of the plurality of pixels corresponding to each of the light-receiving lenses, to be different from each other.

15 Claims, 45 Drawing Sheets

(51) Int. Cl.
*H04N 25/13* (2023.01)
*H04N 25/583* (2023.01)

(58) Field of Classification Search
CPC .... H04N 23/672; H04N 25/13; H04N 25/583; H04N 25/585; H04N 25/704; H04N 25/40; H04N 25/58; H04N 23/12; H04N 25/11; H04N 25/70; H04N 25/76; G03B 35/08; G03B 15/00
See application file for complete search history.

(56) References Cited

U.S. PATENT DOCUMENTS

| | | | | |
|---|---|---|---|---|
| 2013/0156339 | A1* | 6/2013 | Hayata | G06T 5/002 |
| | | | | 382/268 |
| 2015/0042853 | A1* | 2/2015 | Minagawa | H04N 5/374 |
| | | | | 348/270 |
| 2015/0163423 | A1* | 6/2015 | Yin | H04N 5/3591 |
| | | | | 348/295 |
| 2015/0256734 | A1 | 9/2015 | Fukuhara | |
| 2015/0312461 | A1* | 10/2015 | Kim | H01L 27/1464 |
| | | | | 348/308 |
| 2016/0248956 | A1* | 8/2016 | Mitsunaga | H04N 5/2355 |
| 2016/0286108 | A1* | 9/2016 | Fettig | H04N 9/04557 |
| 2017/0013217 | A1* | 1/2017 | Lee | H04N 5/37457 |
| 2017/0026602 | A1* | 1/2017 | Kim | G06T 7/50 |
| 2017/0104942 | A1 | 4/2017 | Hirota et al. | |
| 2017/0318252 | A1* | 11/2017 | Minagawa | H04N 9/04557 |
| 2017/0353679 | A1 | 12/2017 | Negishi | |
| 2018/0343404 | A1* | 11/2018 | Hwang | H04N 5/3559 |
| 2019/0019835 | A1 | 1/2019 | Tanaka et al. | |
| 2019/0342511 | A1* | 11/2019 | Zhao | H04N 5/2352 |

FOREIGN PATENT DOCUMENTS

| | | |
|---|---|---|
| JP | 2015-181213 A | 10/2015 |
| JP | 2015-201834 A | 11/2015 |
| JP | 2019-029985 A | 2/2019 |
| WO | 2015/151794 A1 | 10/2015 |
| WO | 2017/126326 A1 | 7/2017 |
| WO | 2019/026718 A1 | 2/2019 |

\* cited by examiner

[FIG. 1]
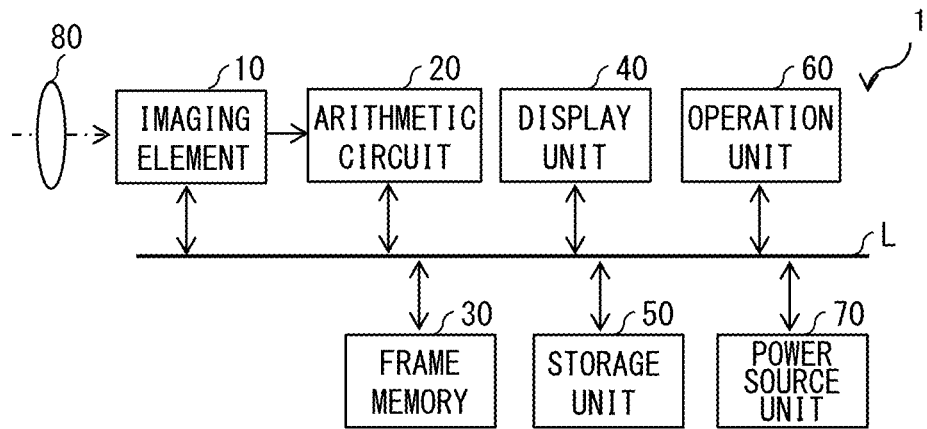
[FIG. 2]
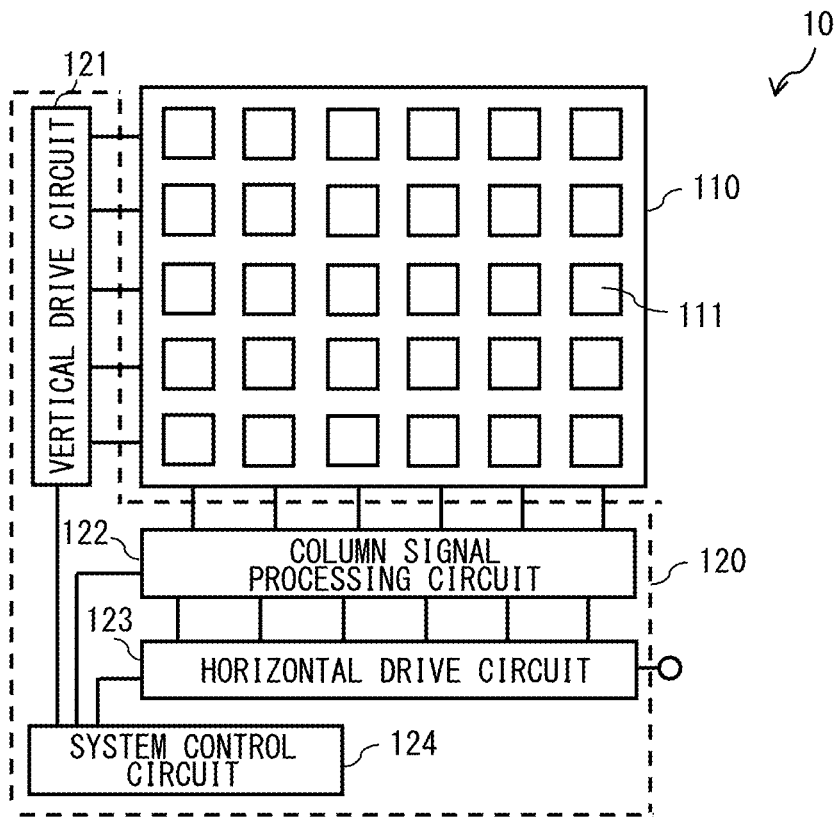

[FIG. 3]
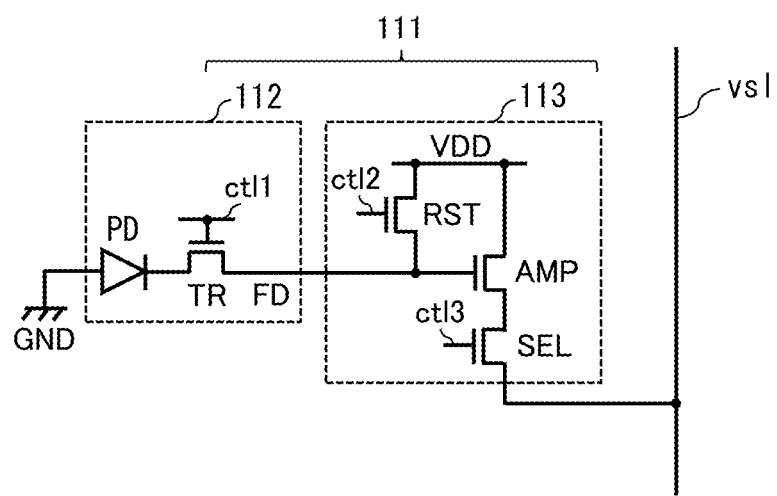

[FIG. 4]
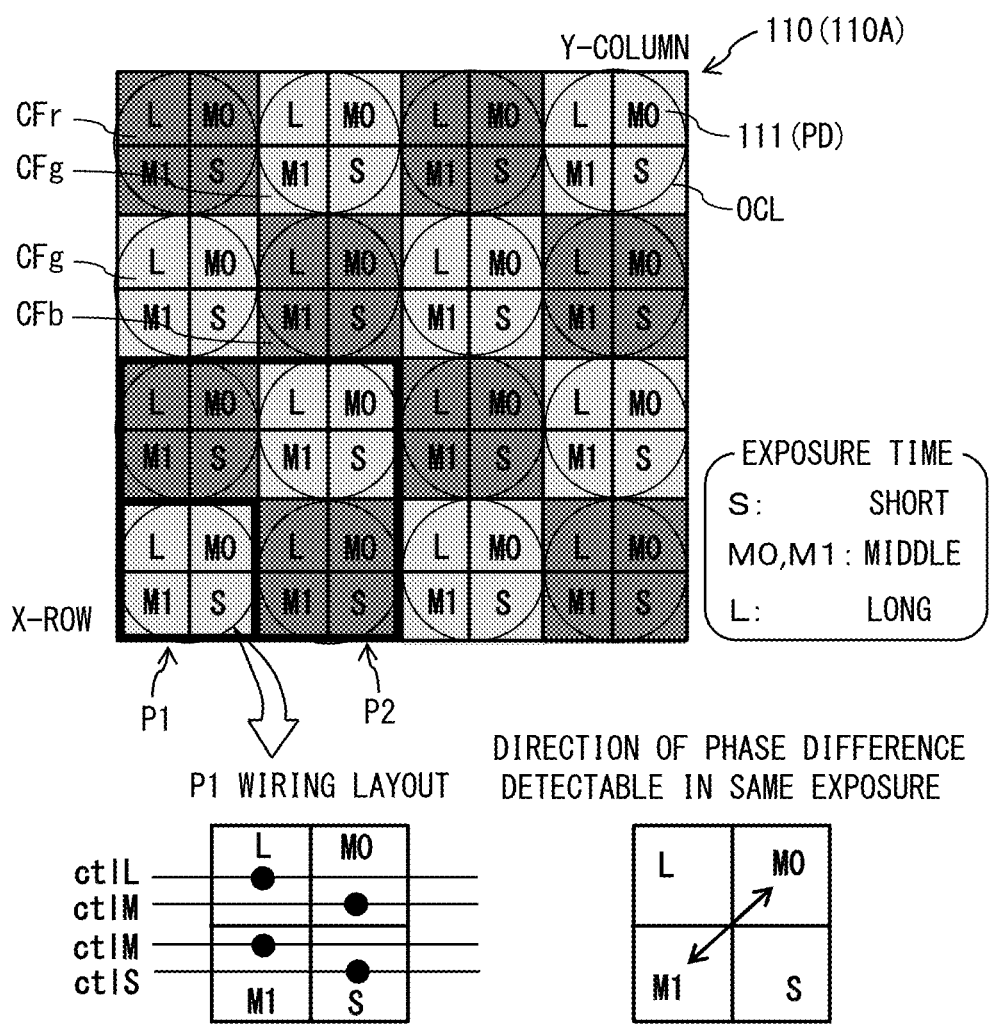

[FIG. 5]
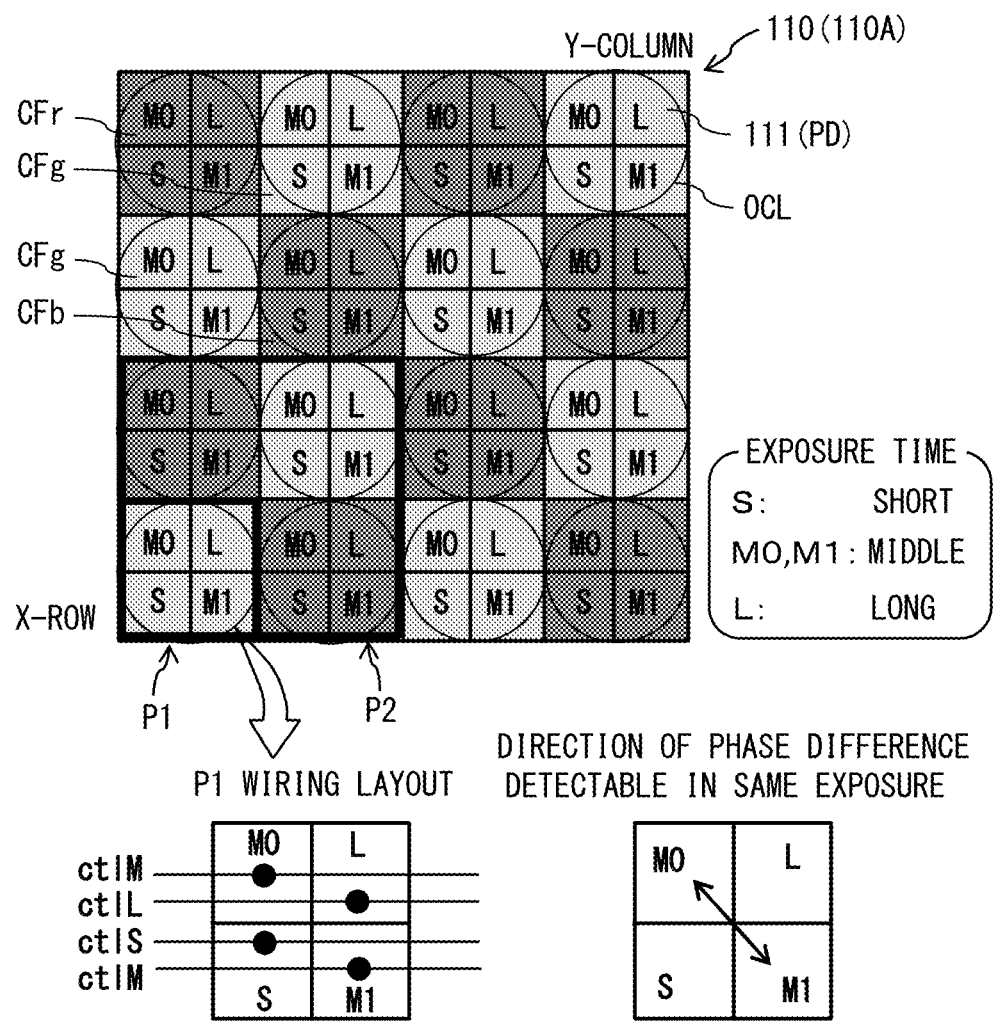

[FIG. 6]
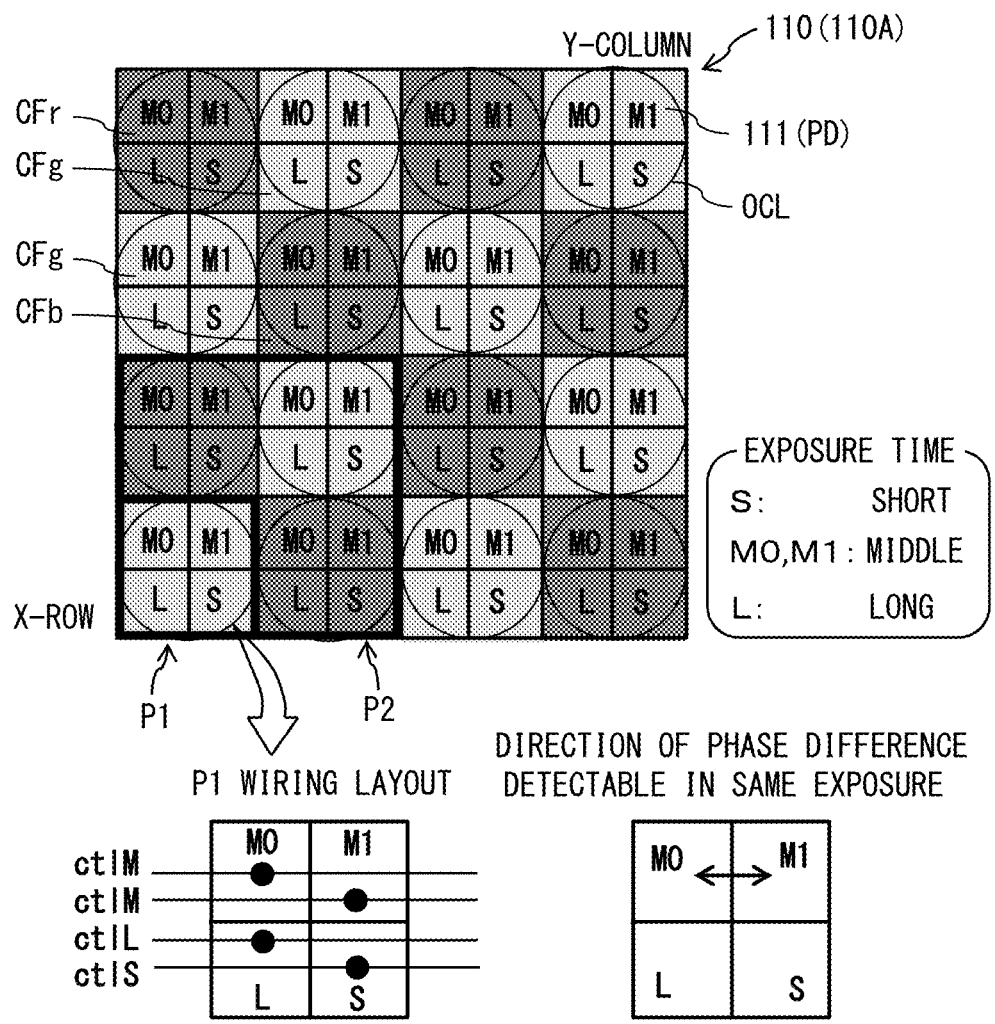

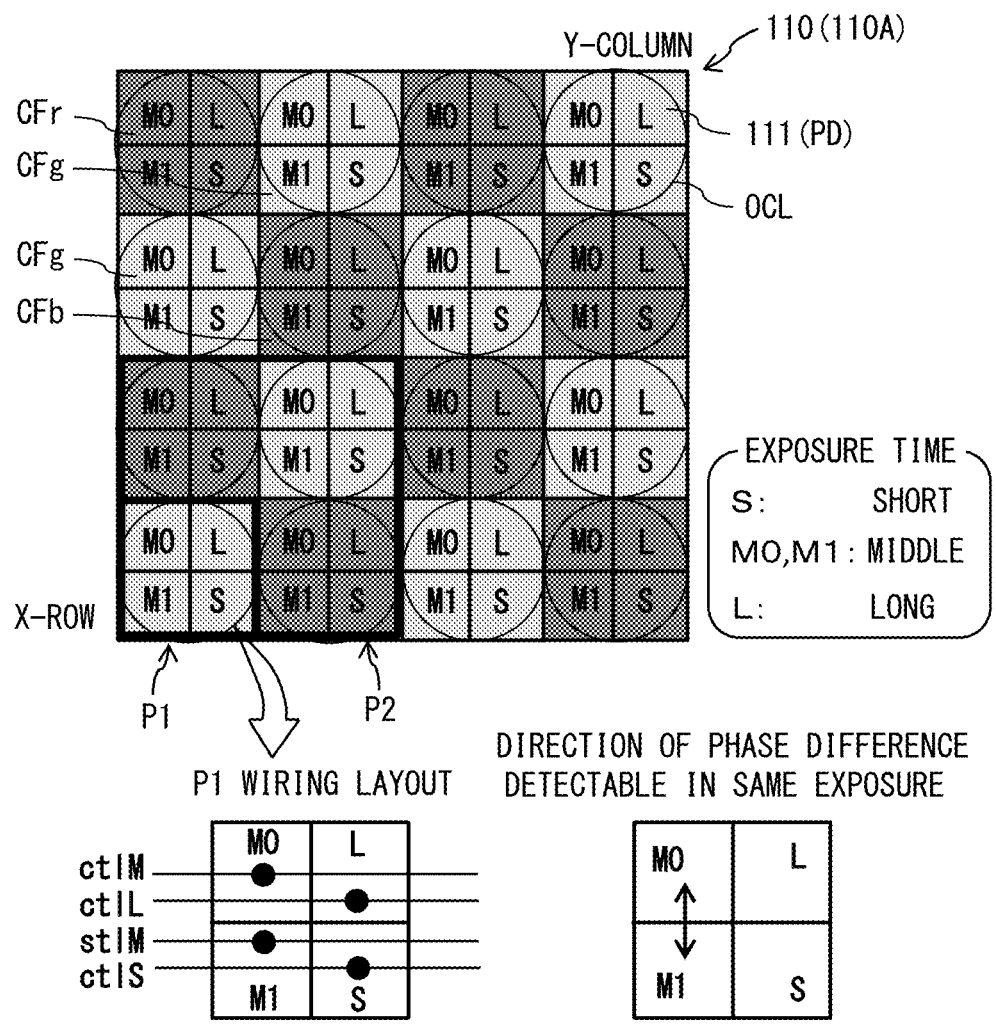
[FIG. 7]

[FIG. 8]
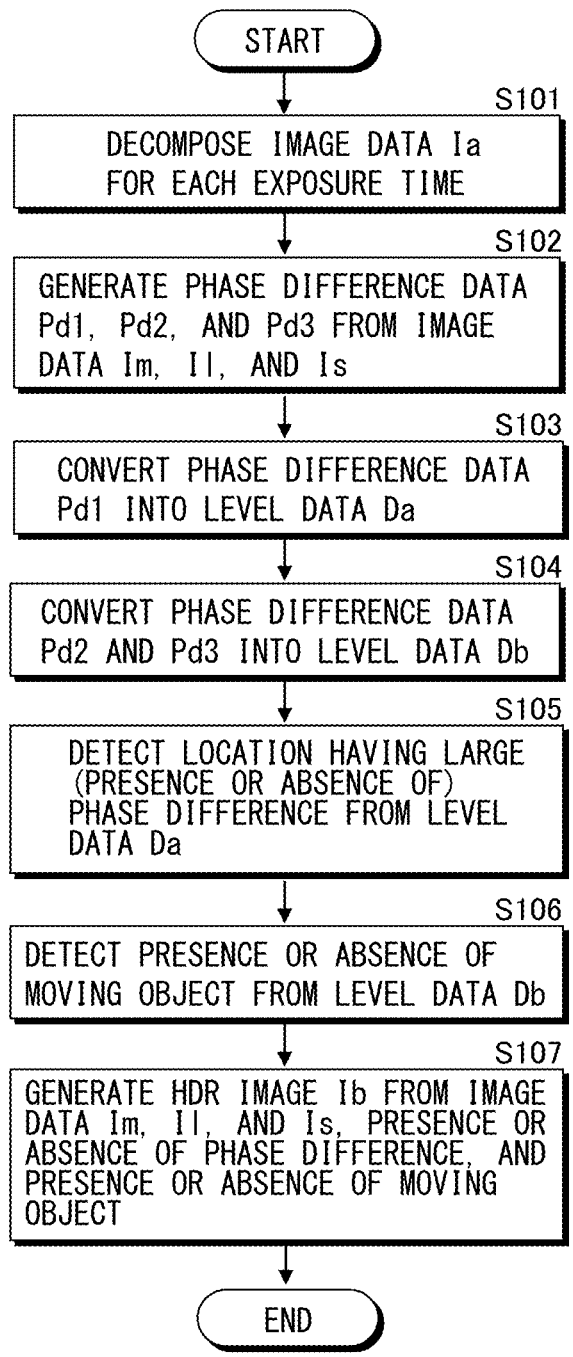

[FIG. 9]
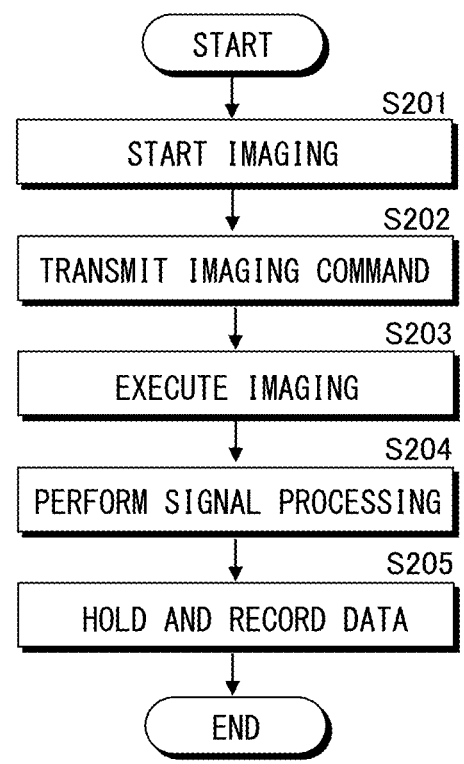

[FIG. 10]
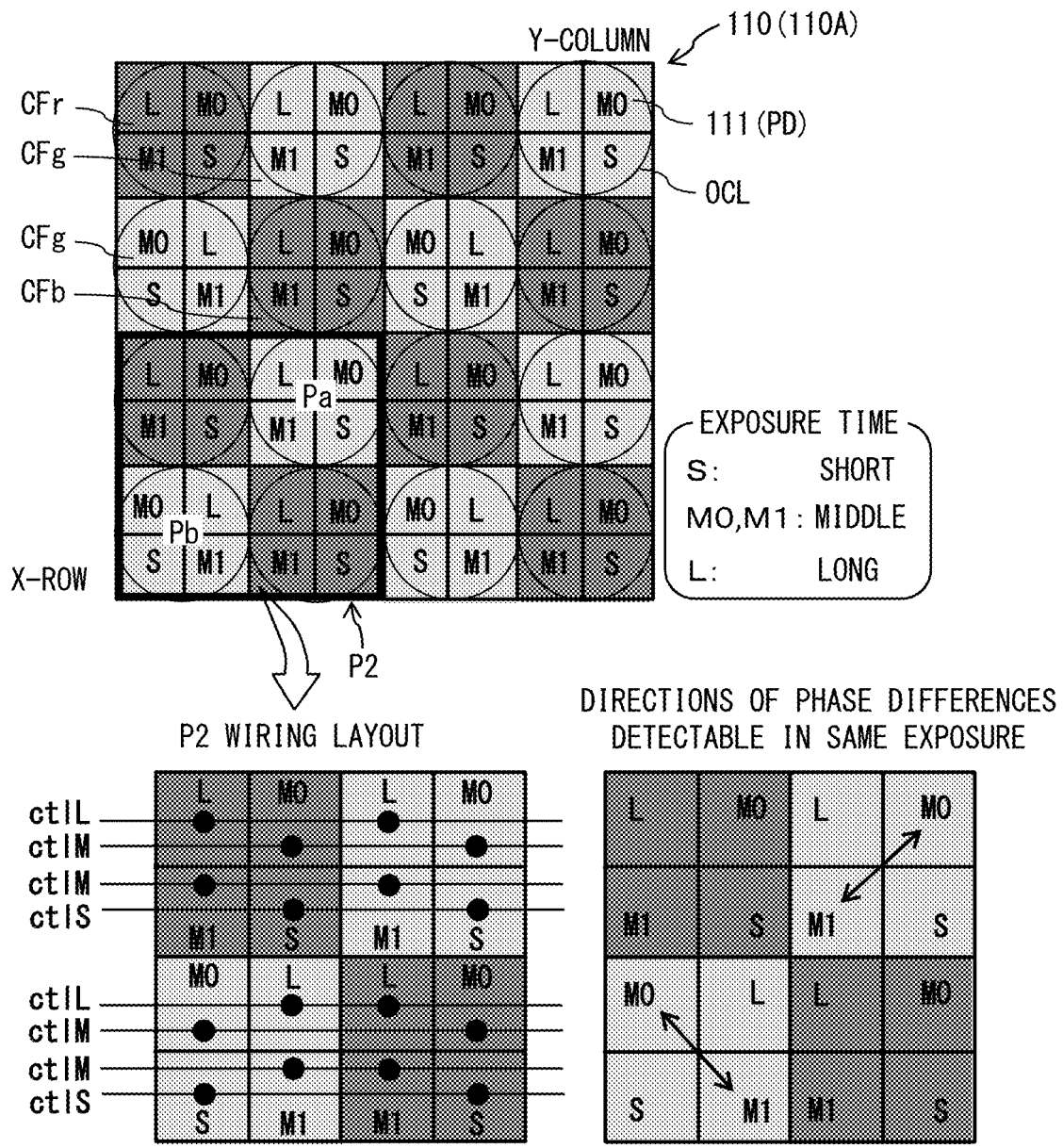

[FIG. 11]
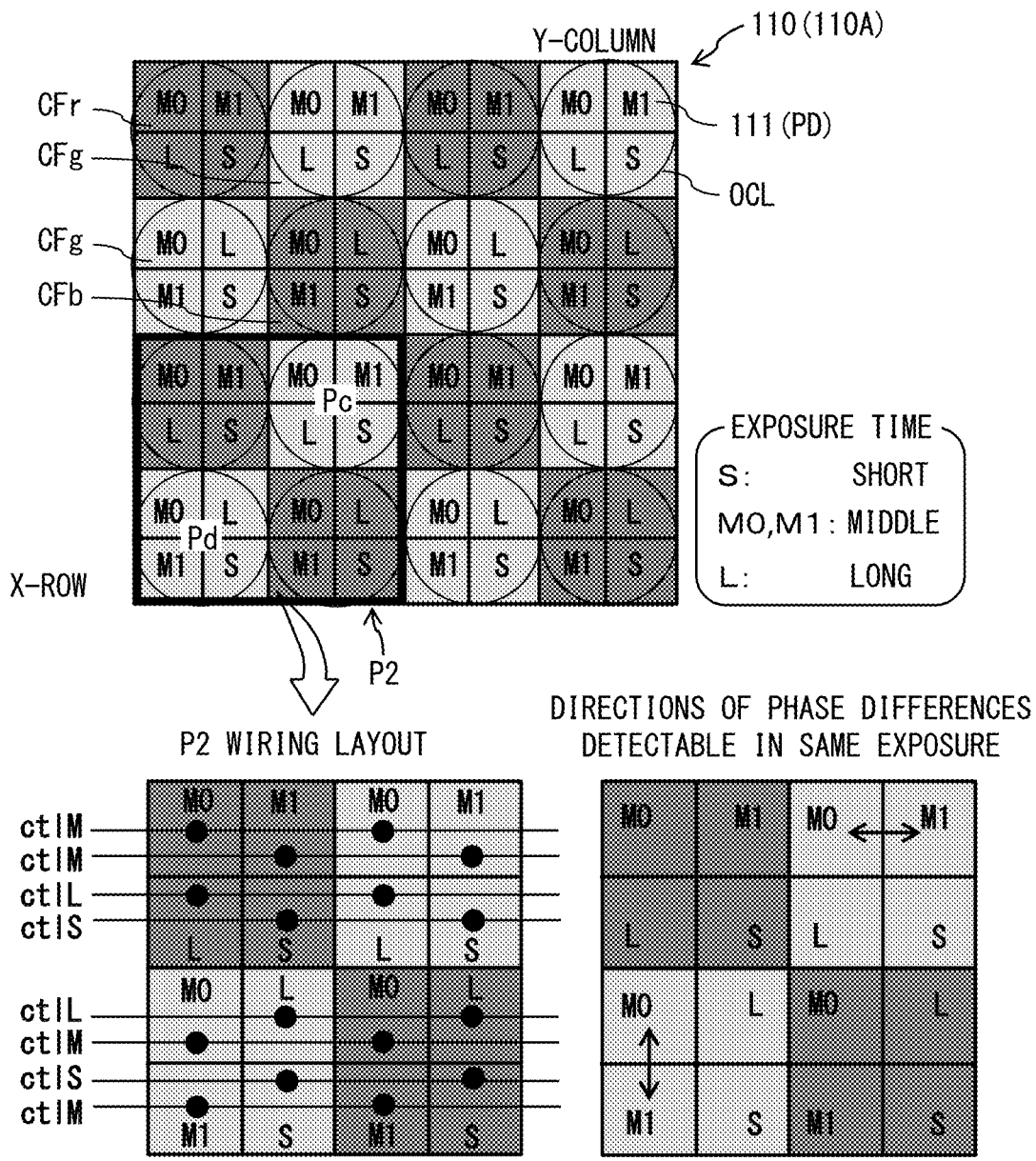

[FIG. 12]
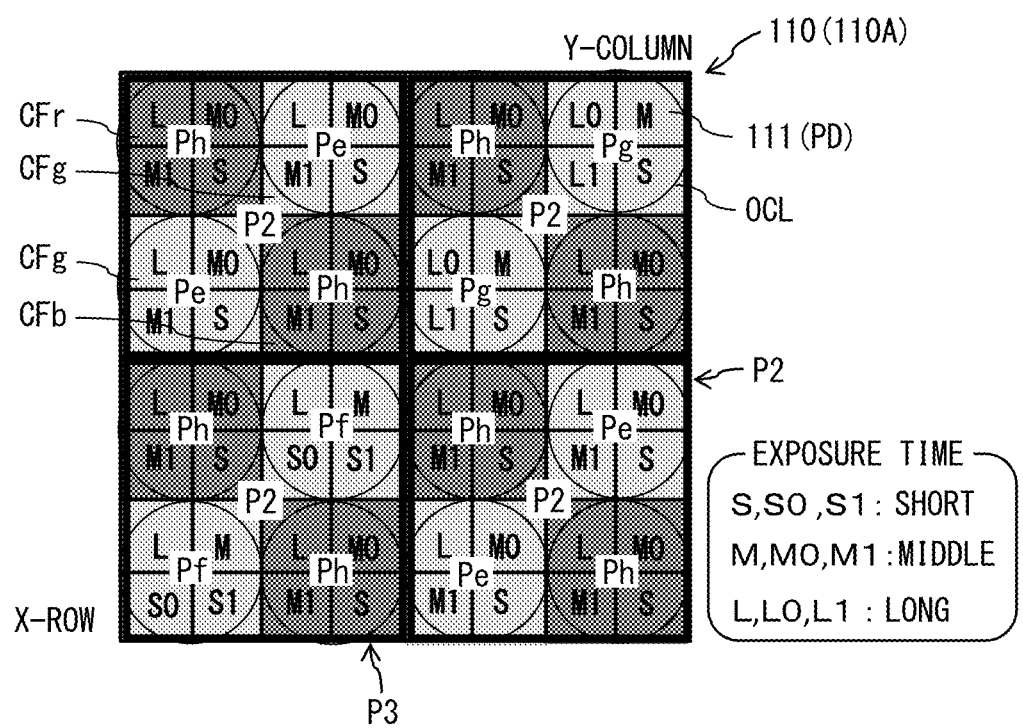

[FIG. 13]
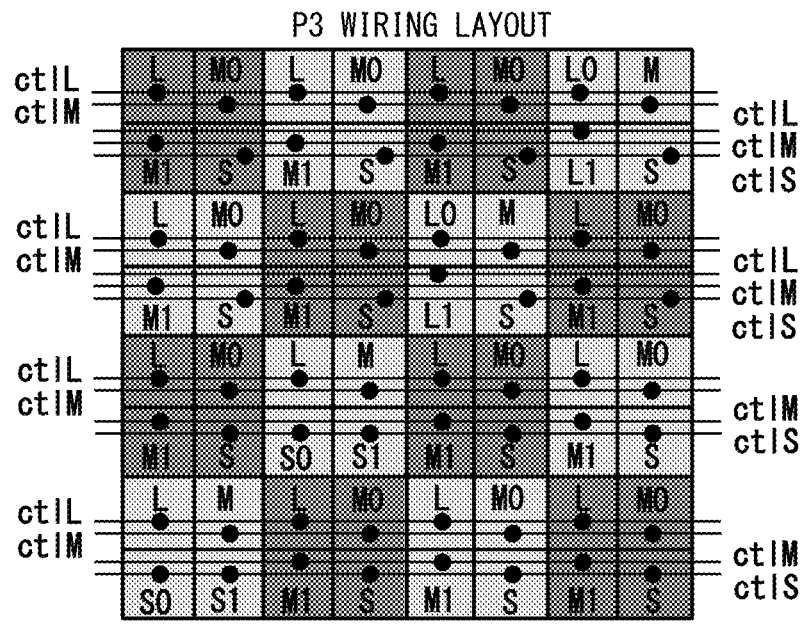
[FIG. 14]
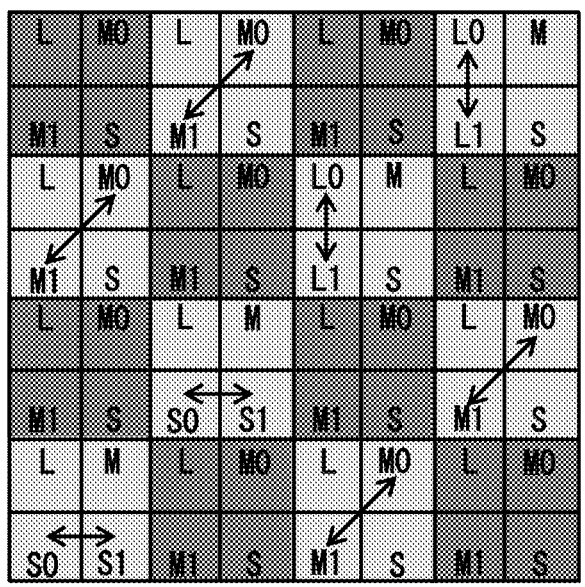

[FIG. 15]
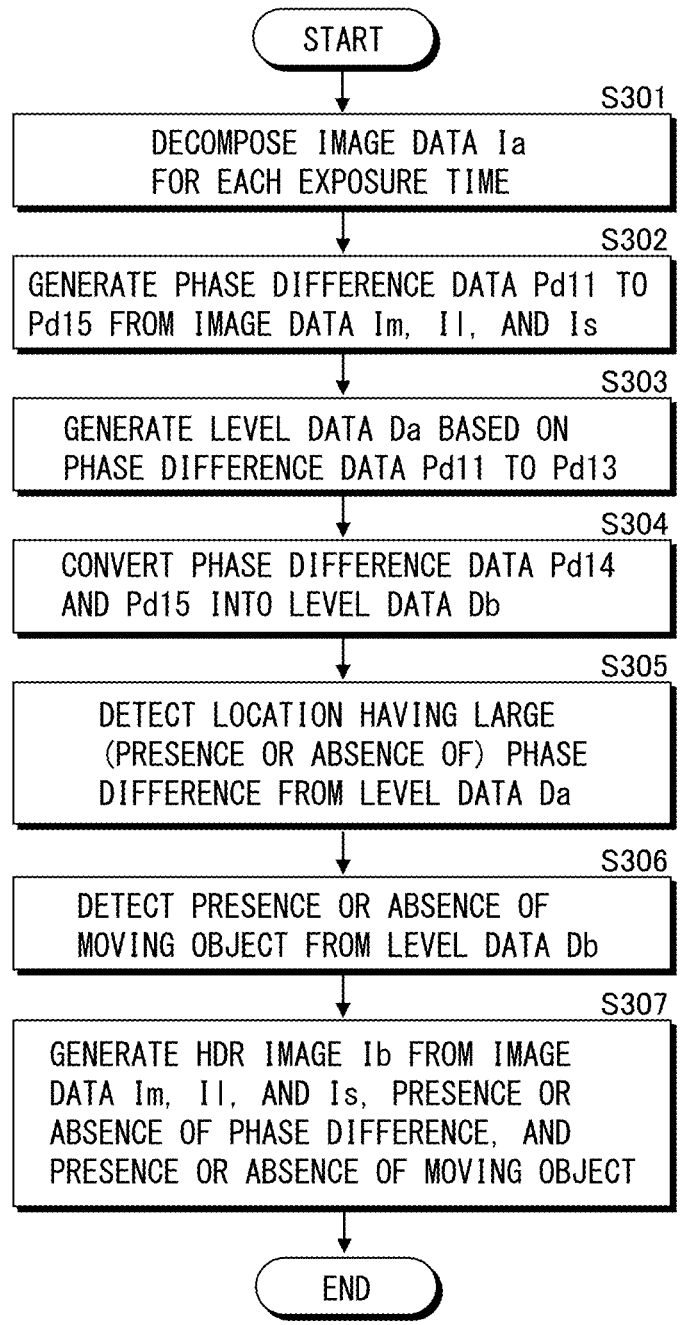

[FIG. 16]
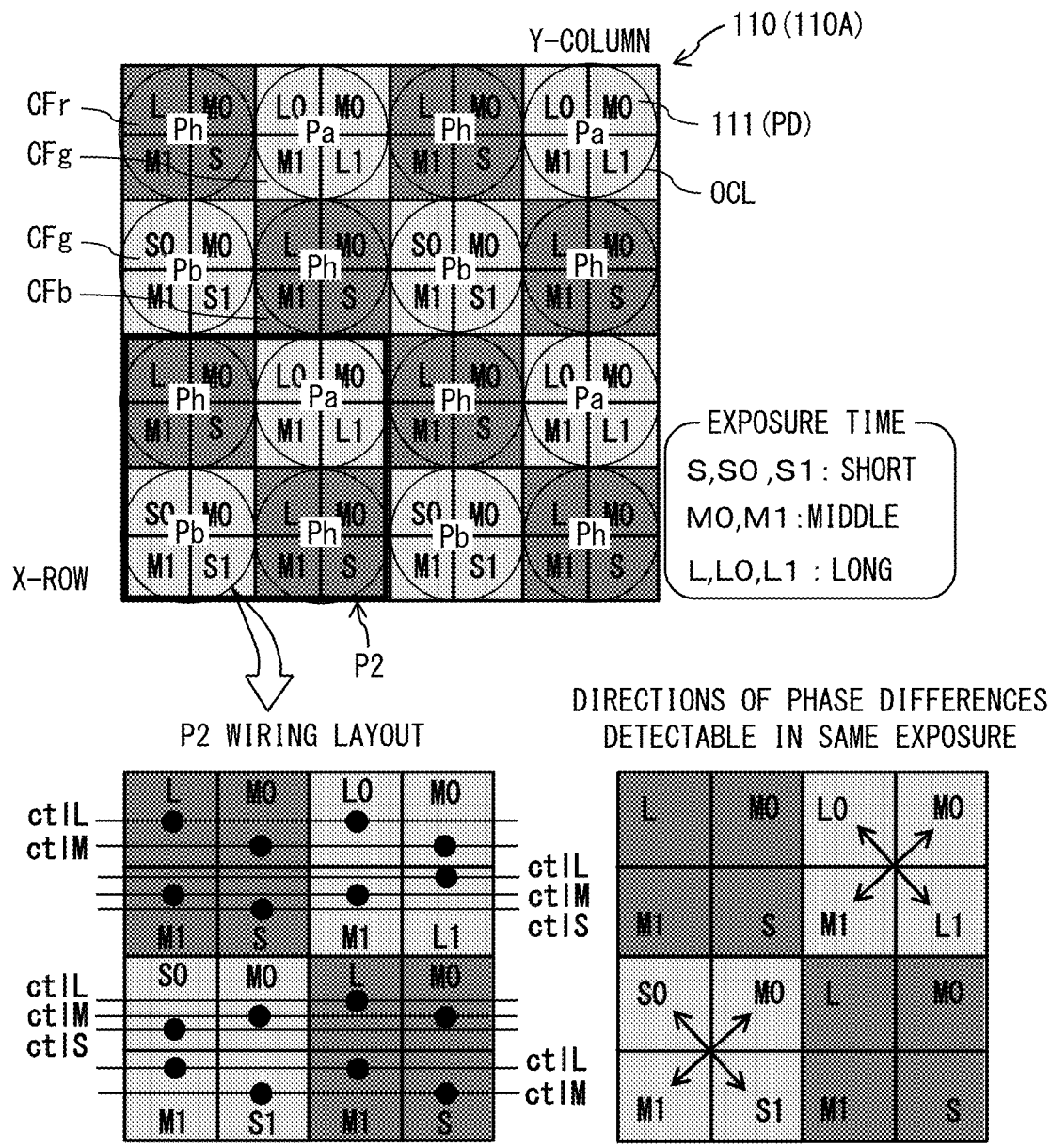

[FIG. 17]
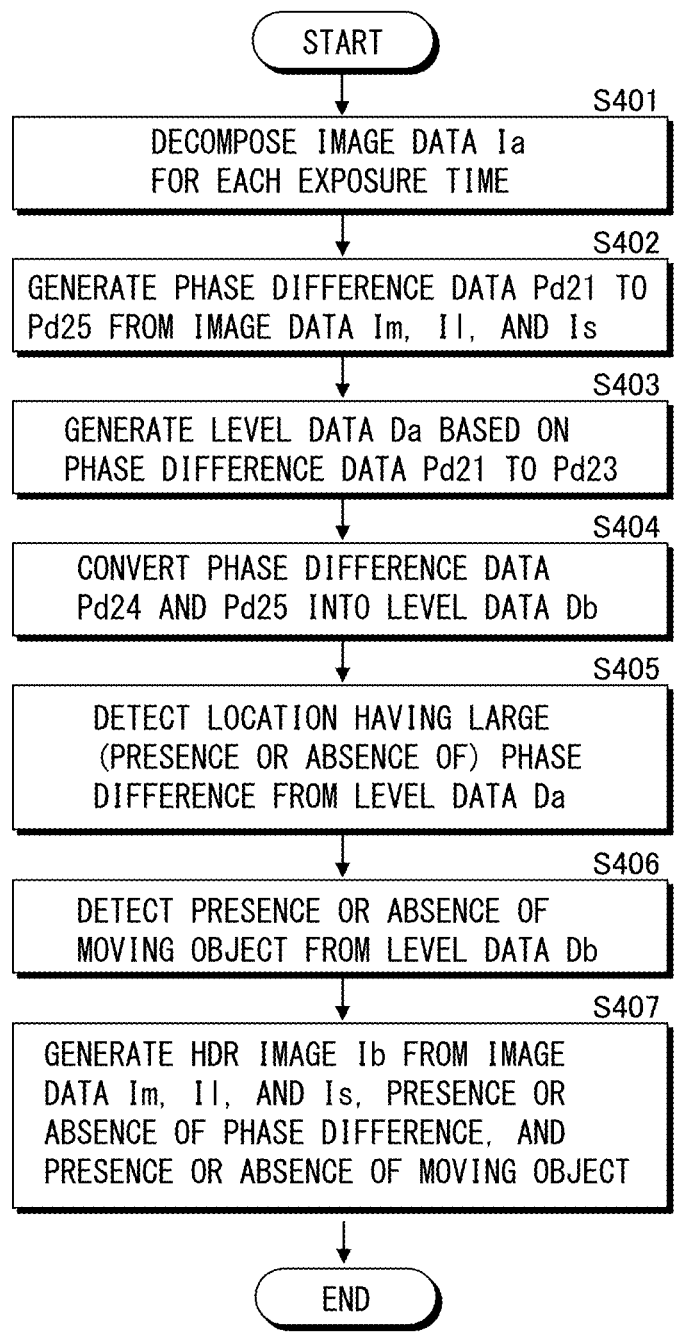

[FIG. 18]
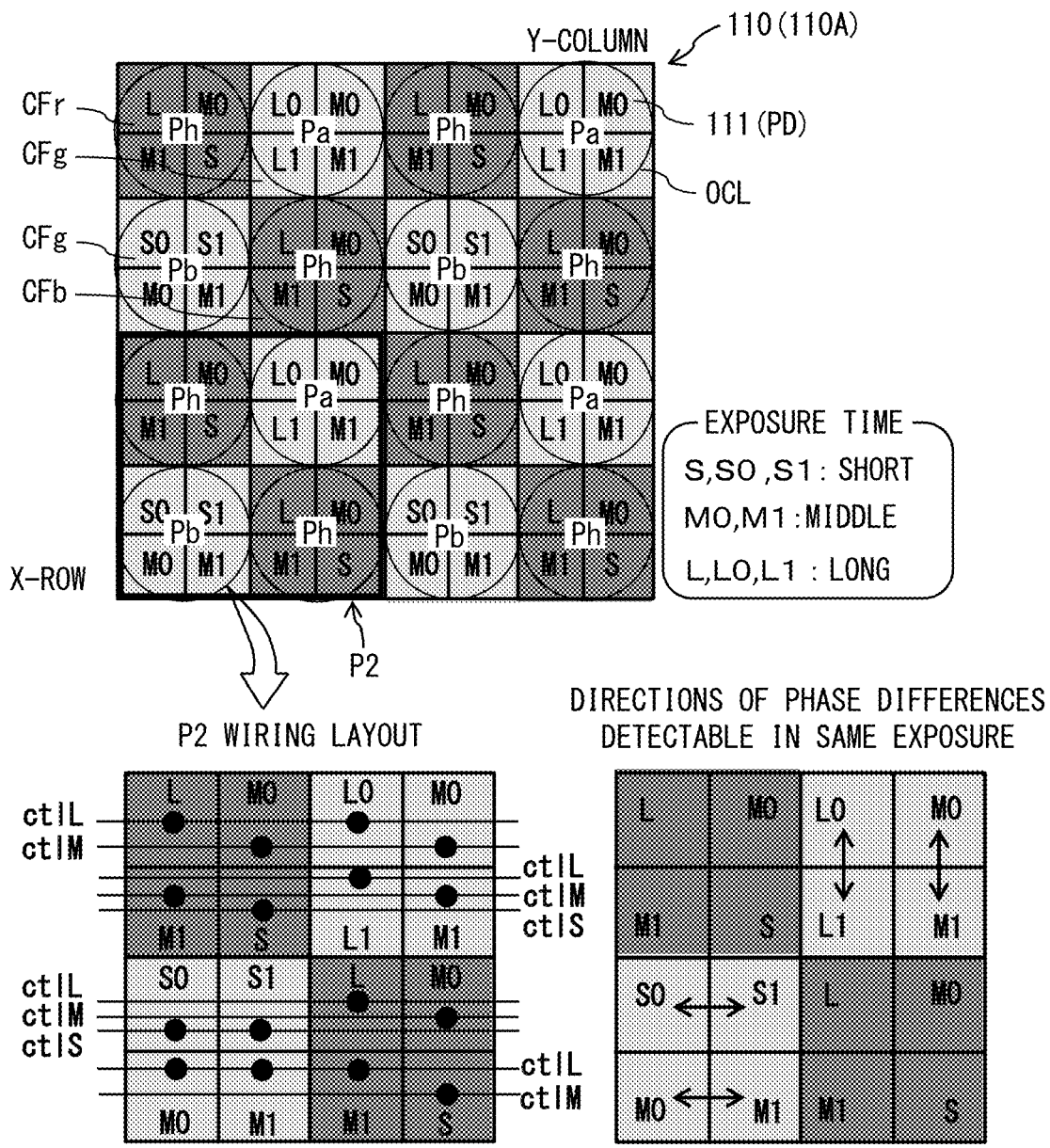

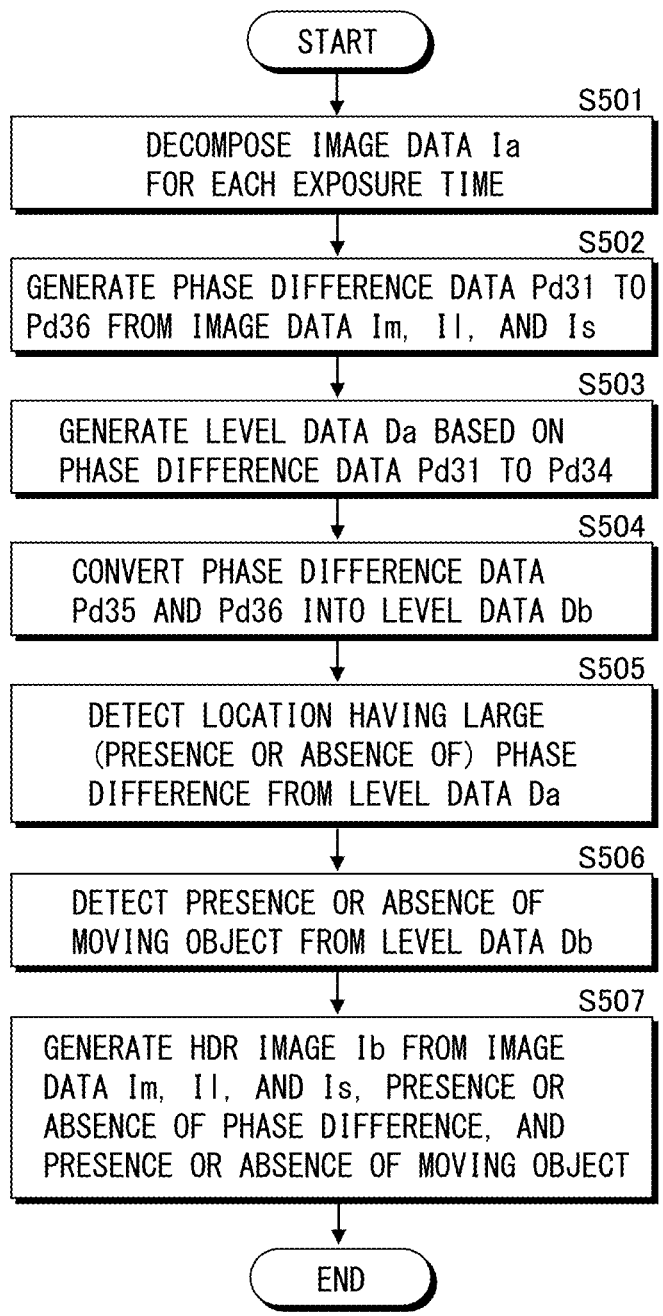
[FIG. 19]

[FIG. 20]
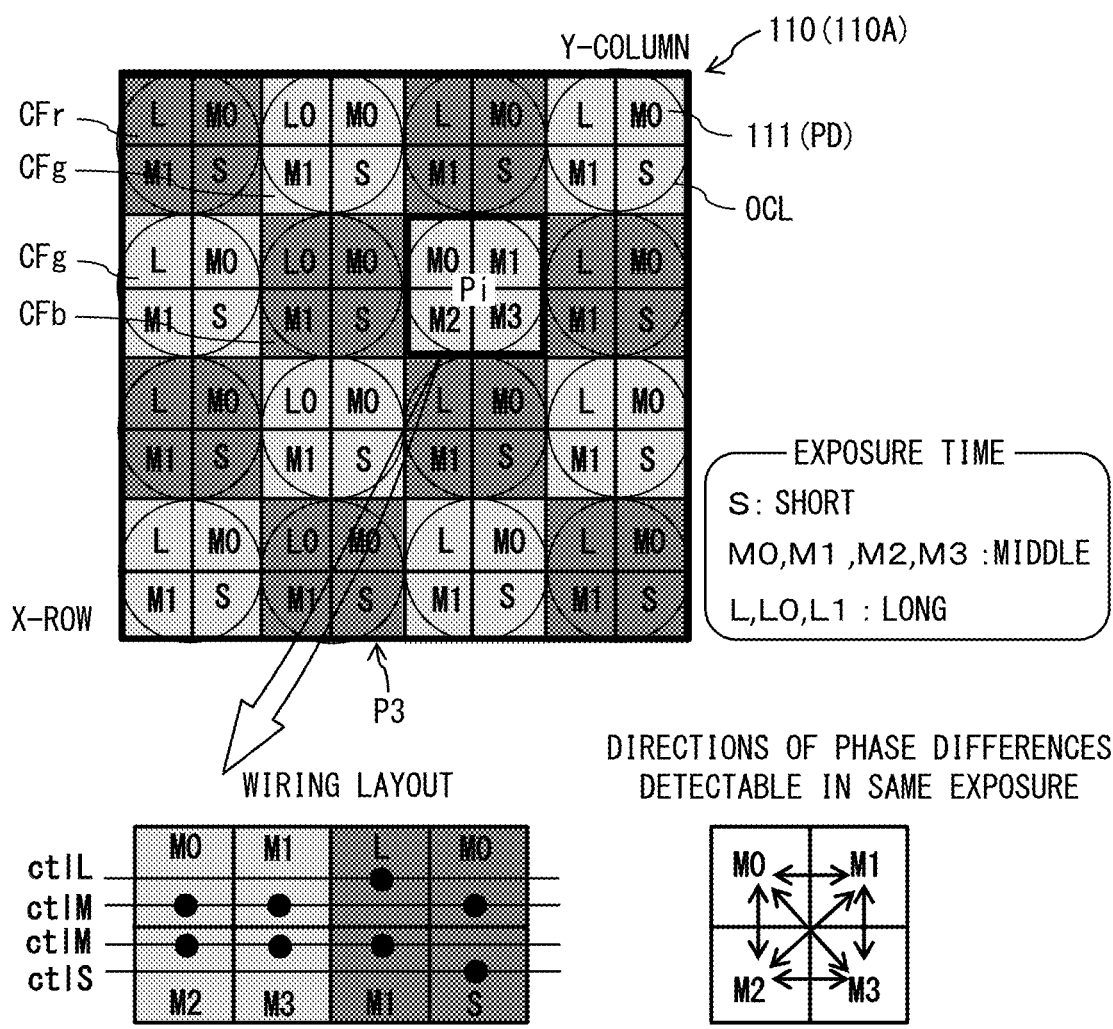

[FIG. 21]
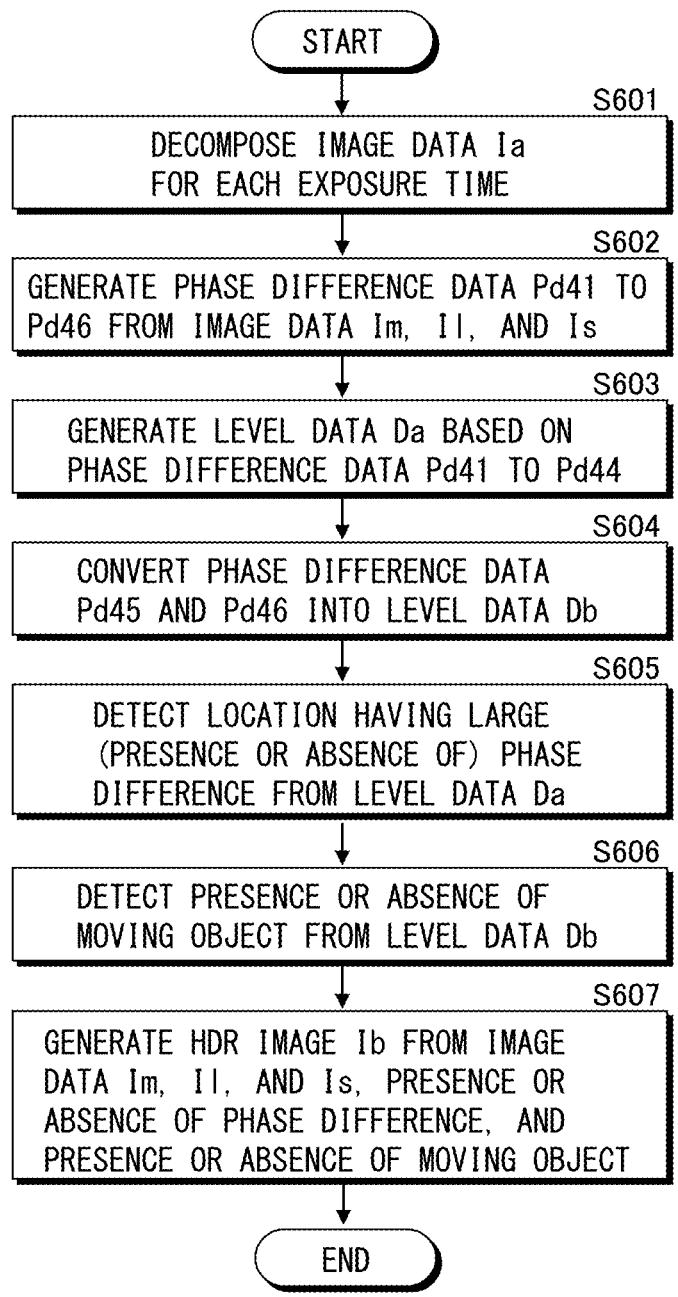

[FIG. 22]
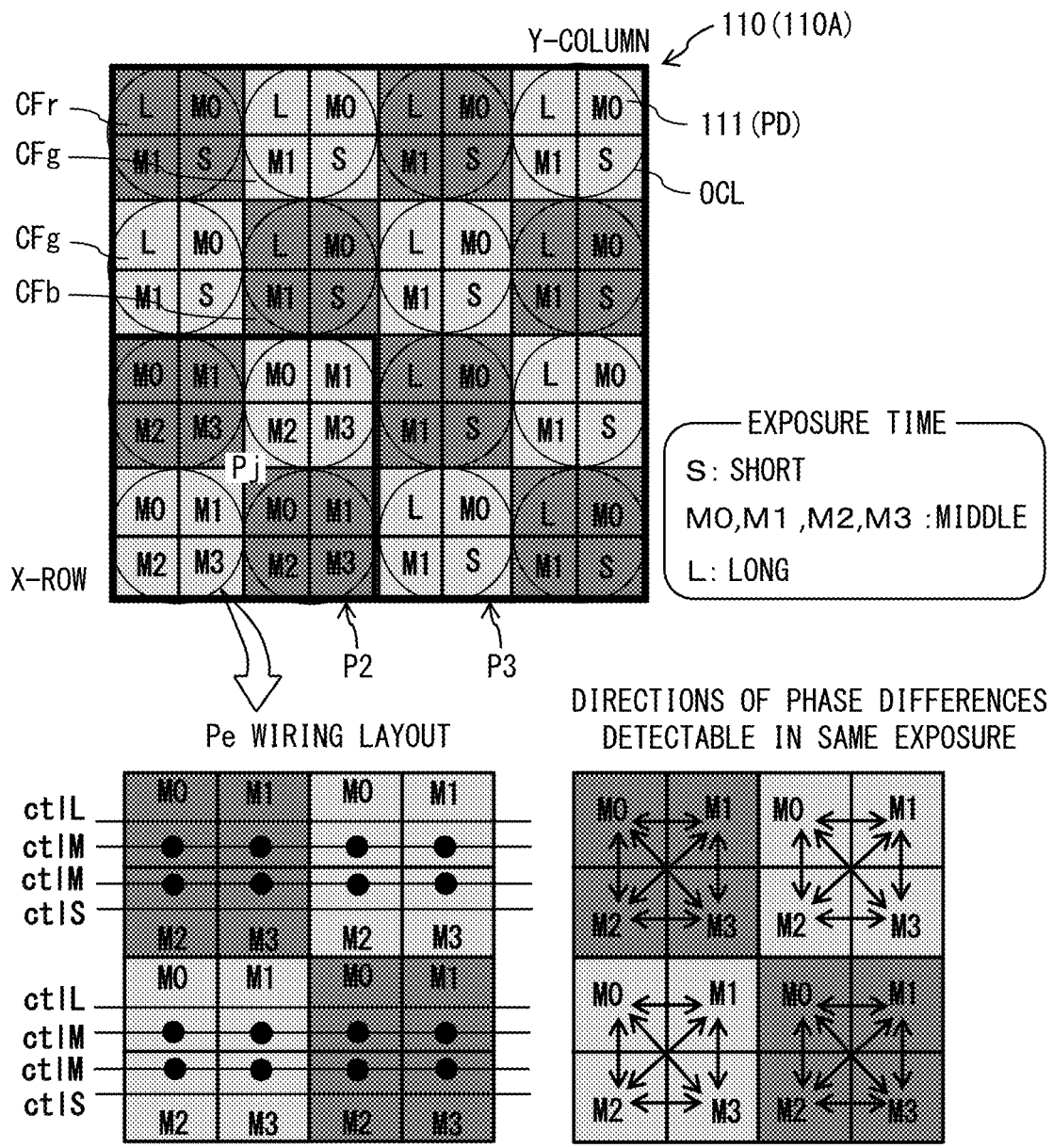

[FIG. 23]
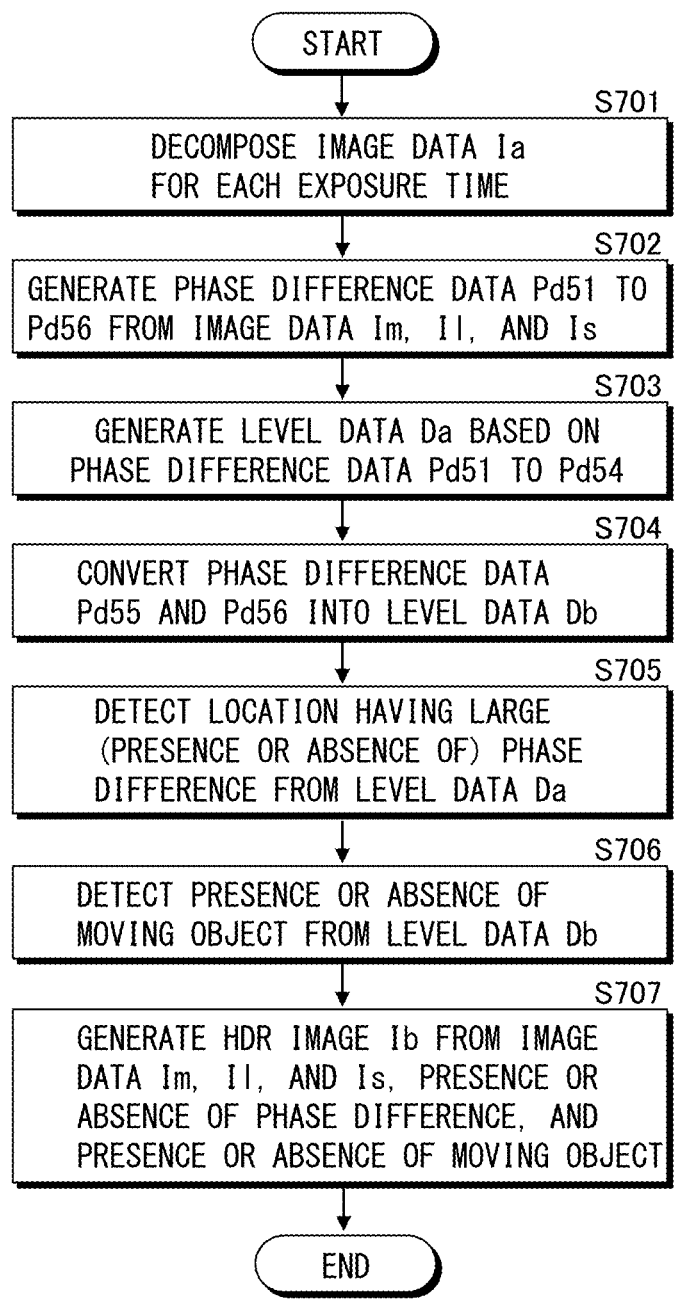

[FIG. 24]
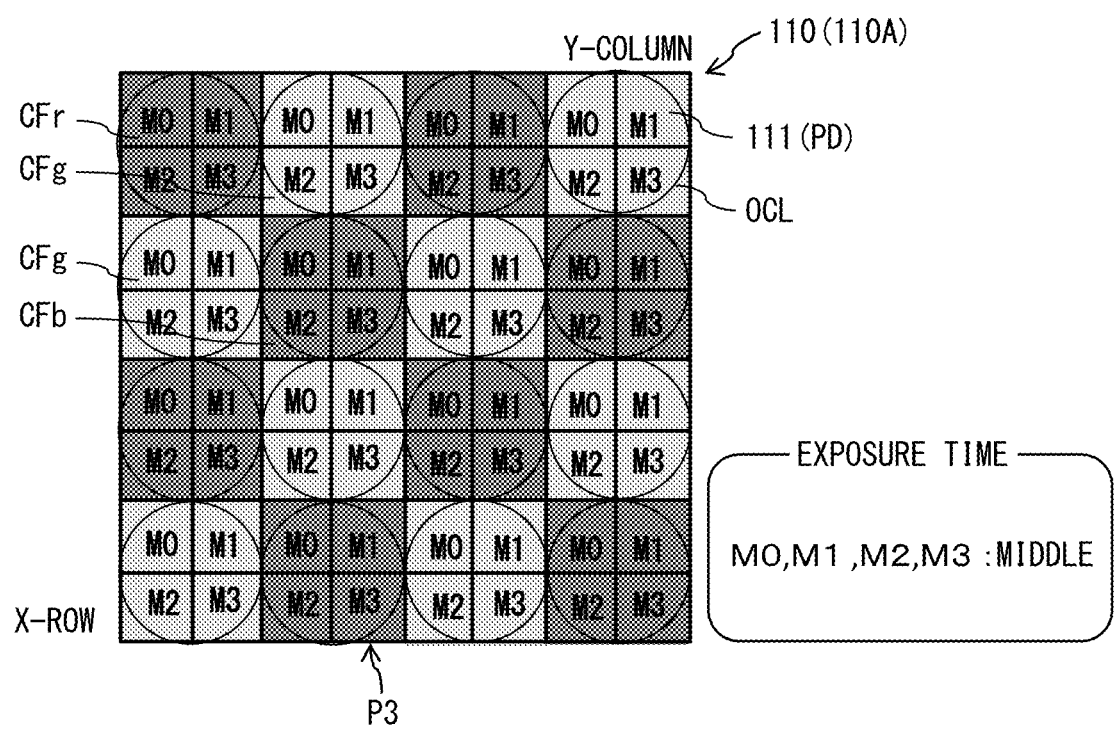

[FIG. 25]
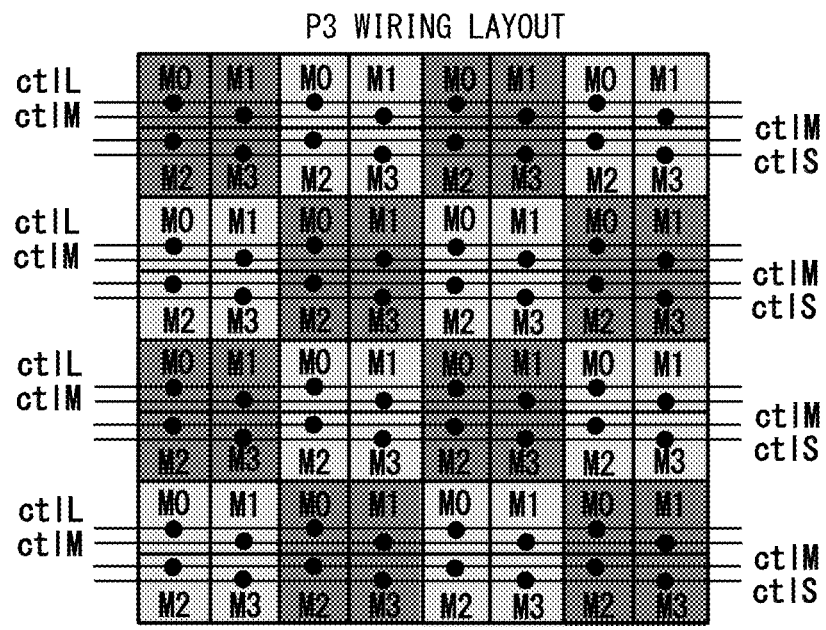
[FIG. 26]
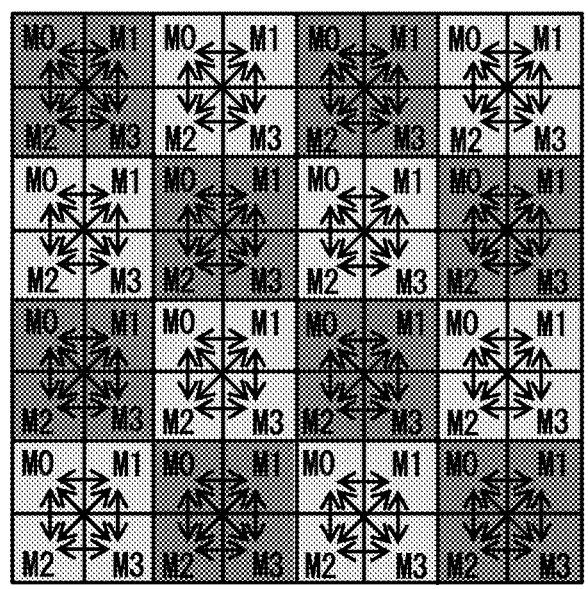

[FIG. 27]
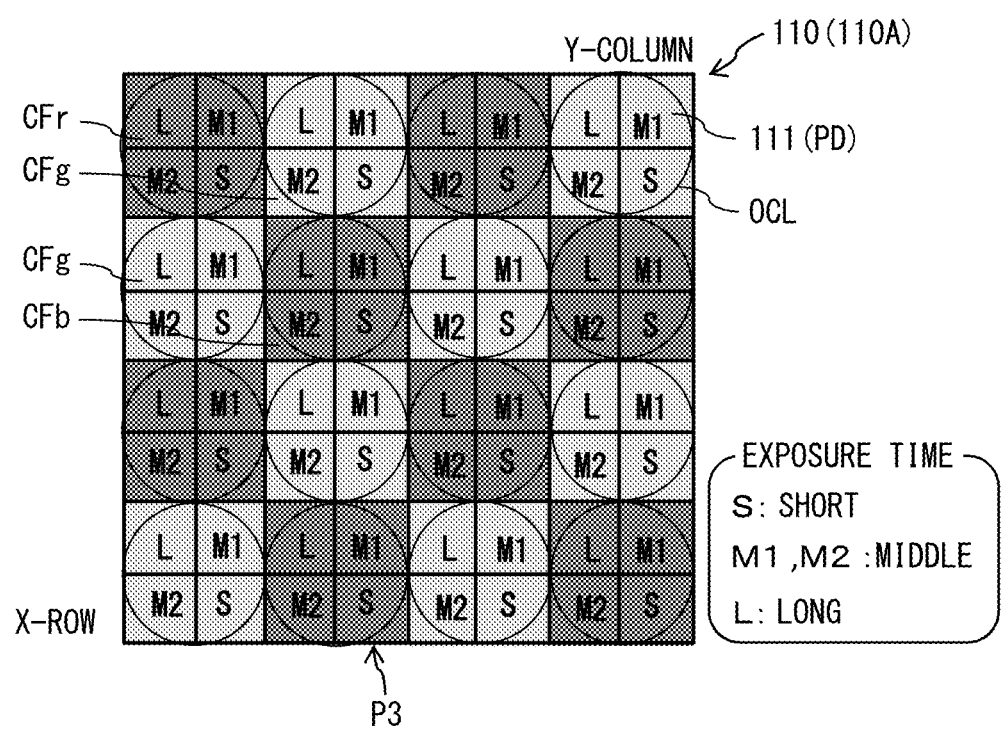

[FIG. 28]
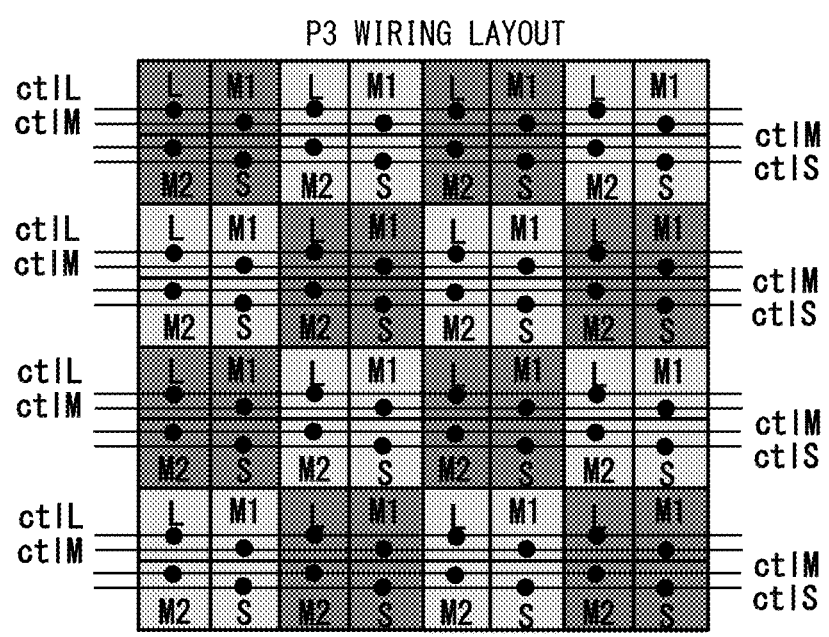

[FIG. 29]
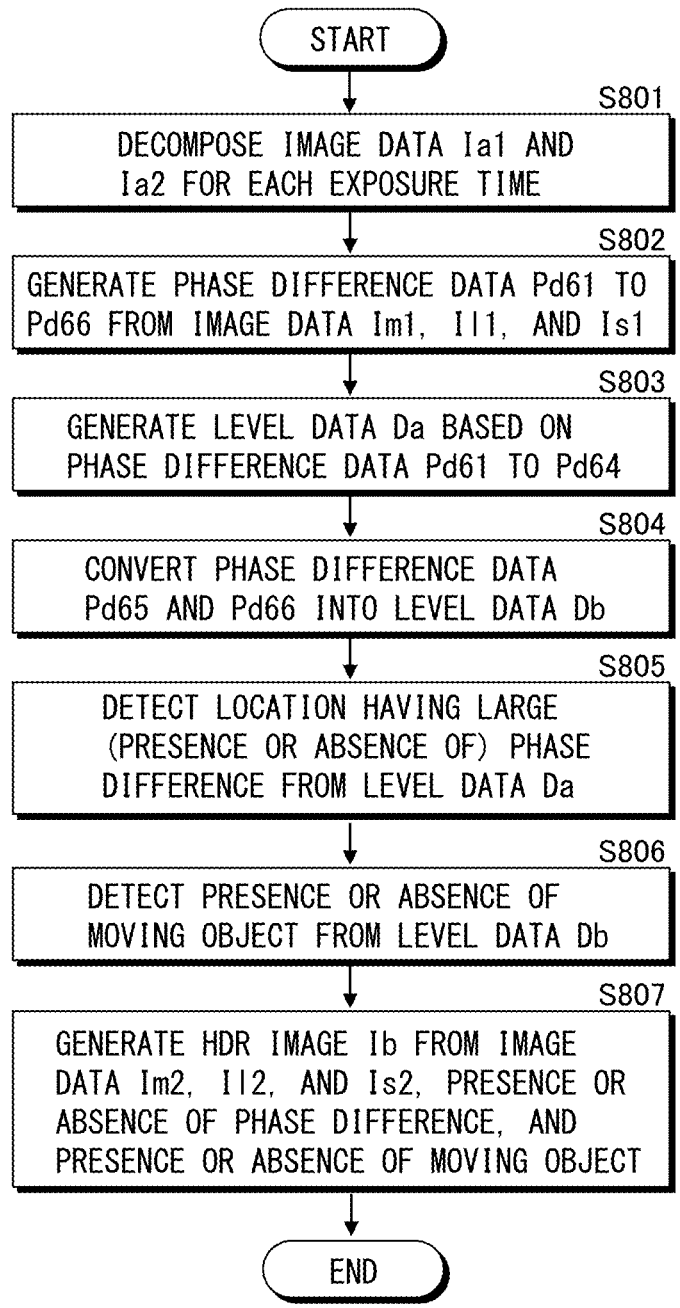

[FIG. 30]
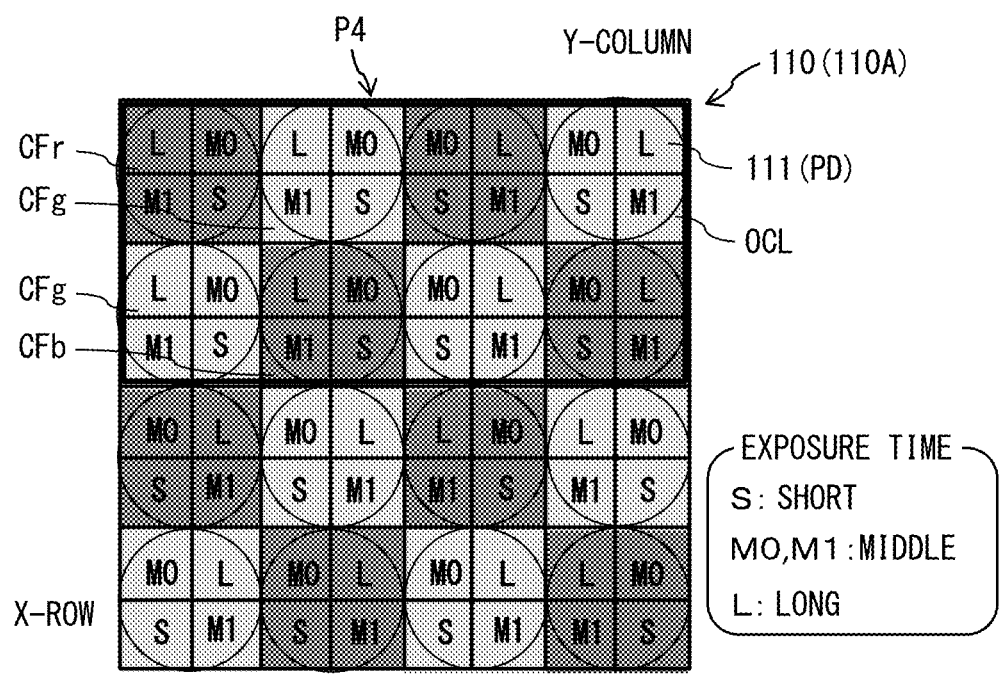

[FIG. 31]
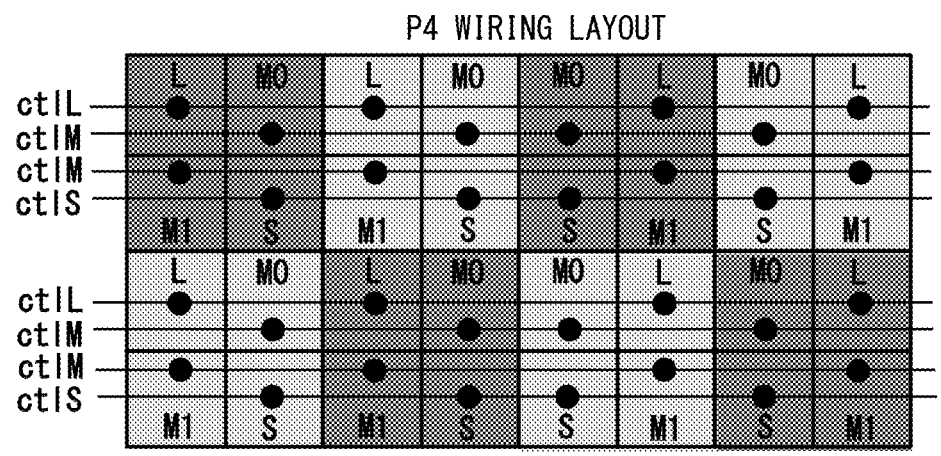
[FIG. 32]
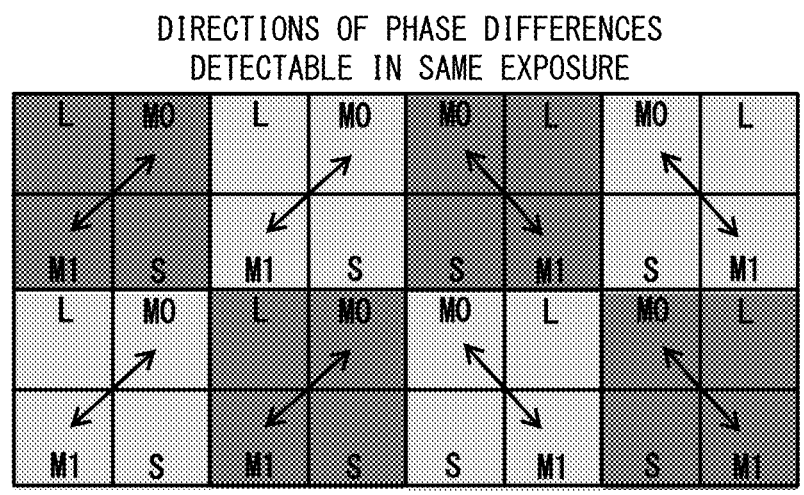

[FIG. 33]
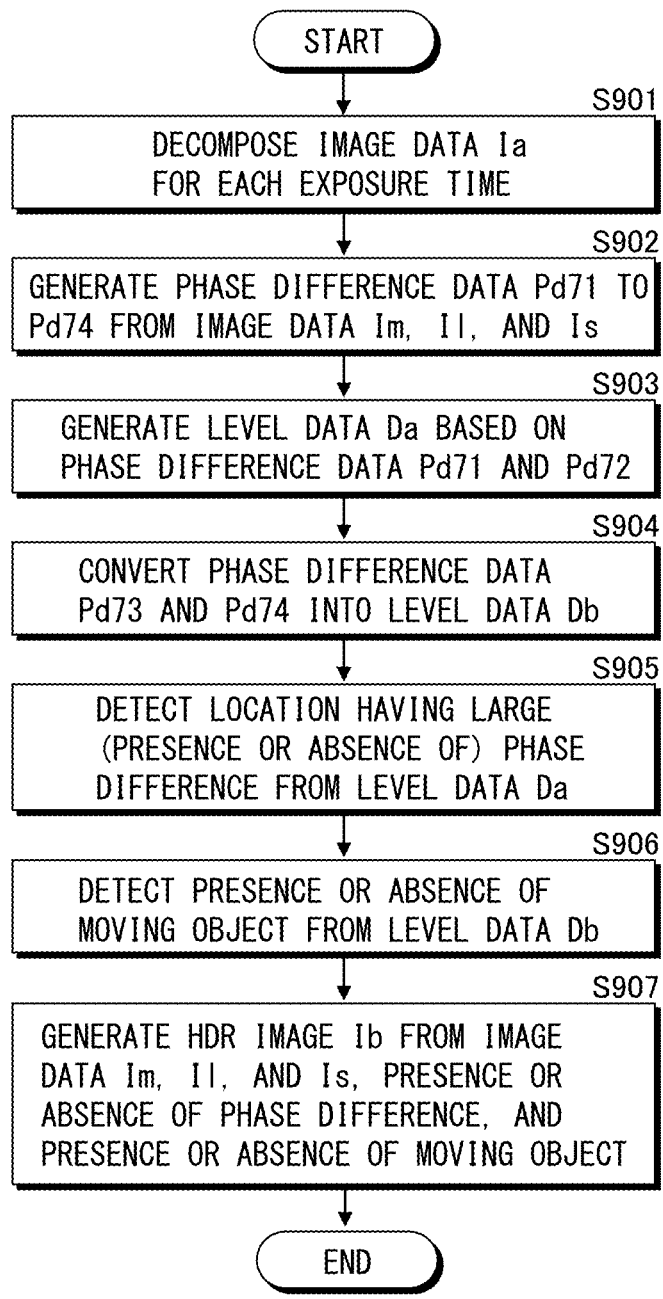

[FIG. 34]
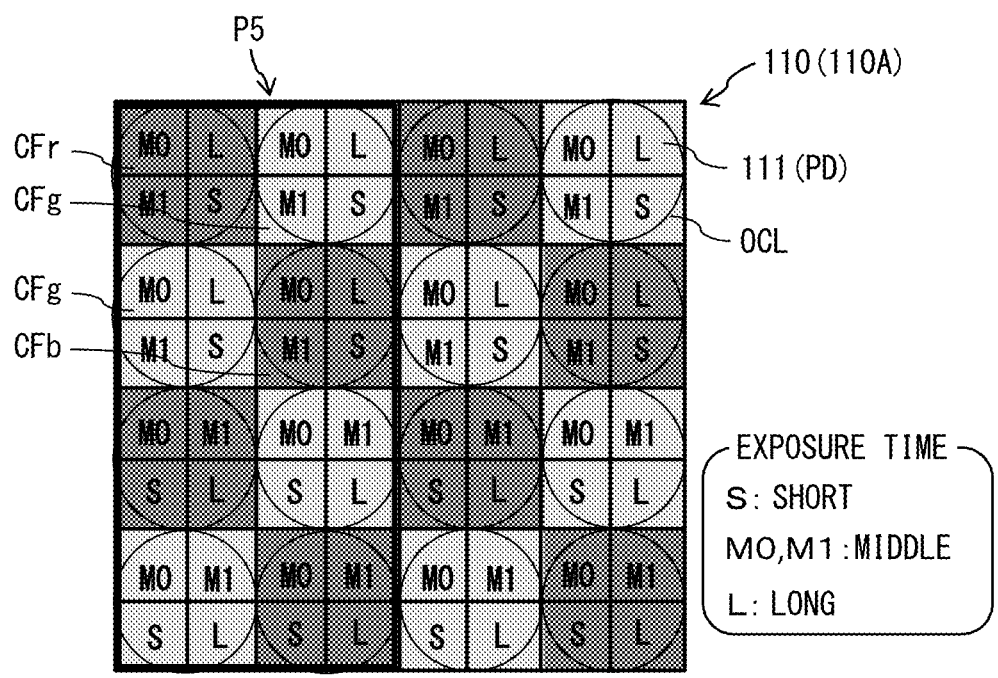

[FIG. 35]
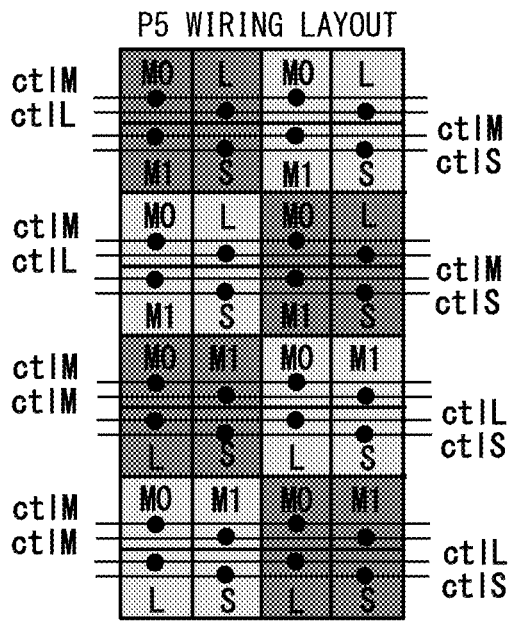
[FIG. 36]
DIRECTIONS OF PHASE DIFFERENCES
DETECTABLE IN SAME EXPOSURE
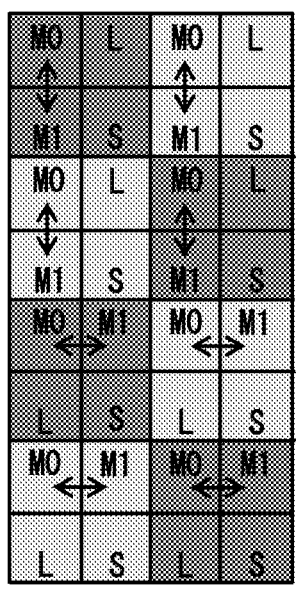

[FIG. 37]
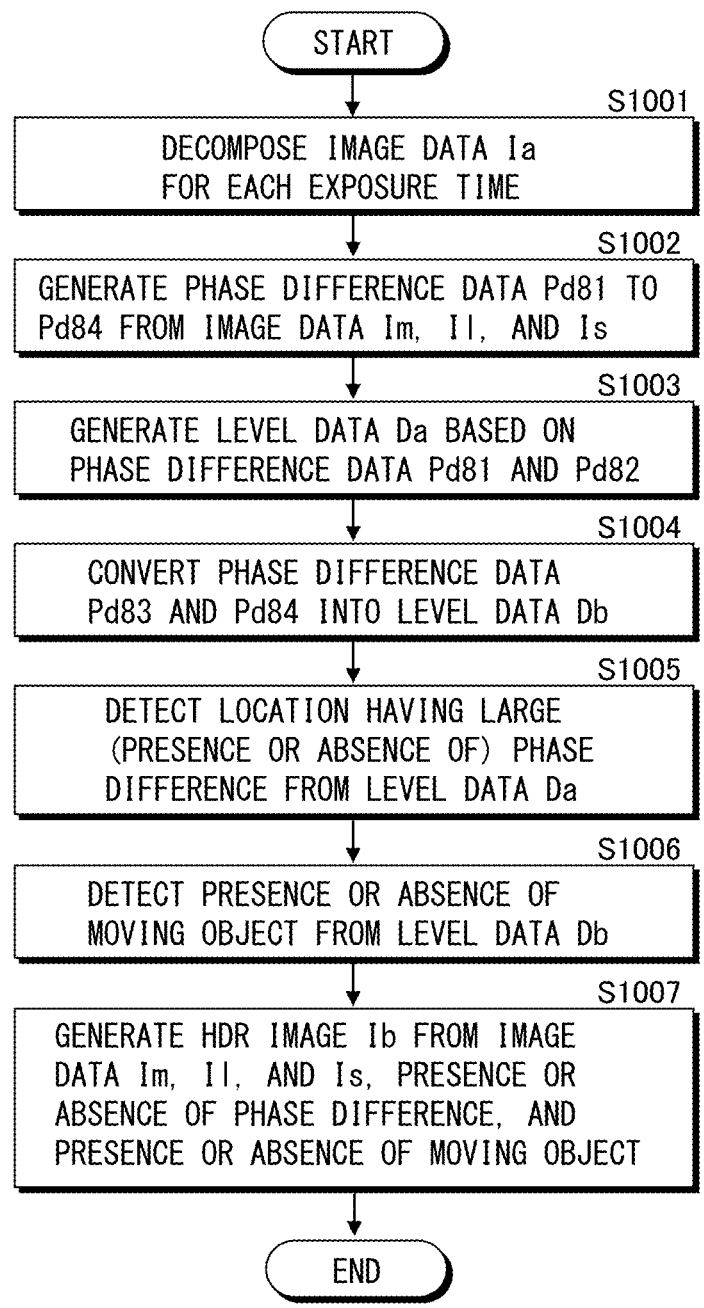

[FIG. 38]
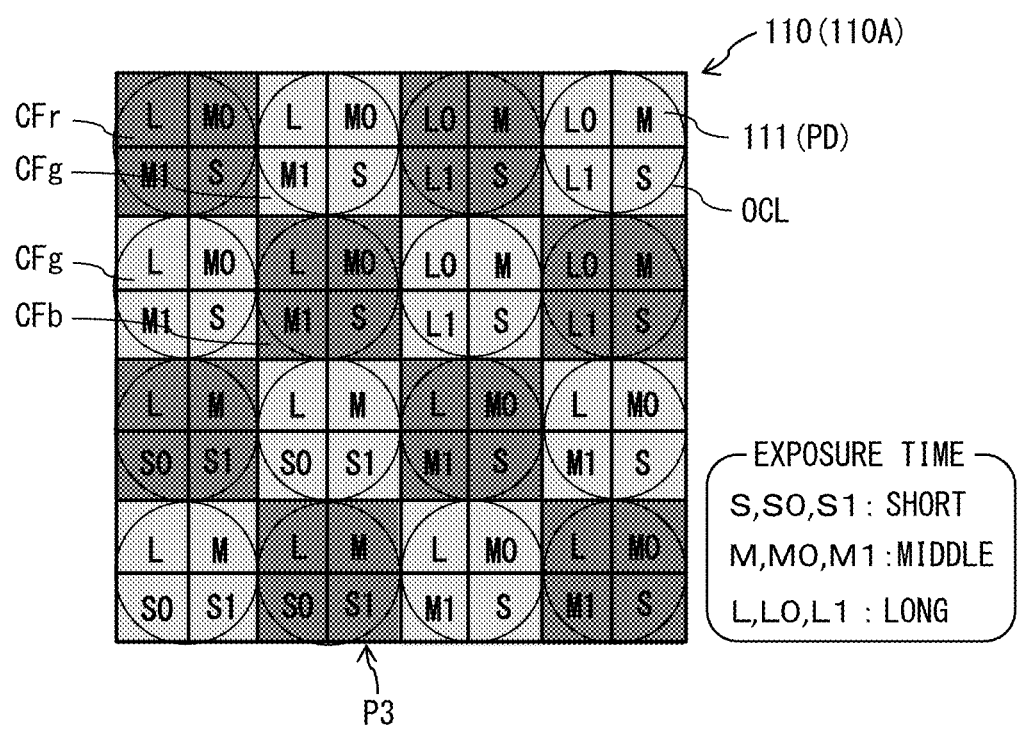

[FIG. 39]
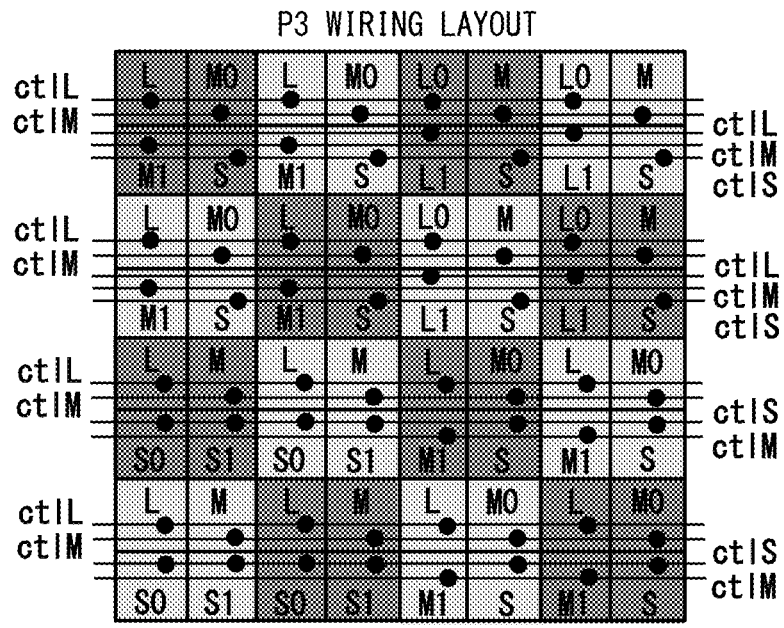
[FIG. 40]
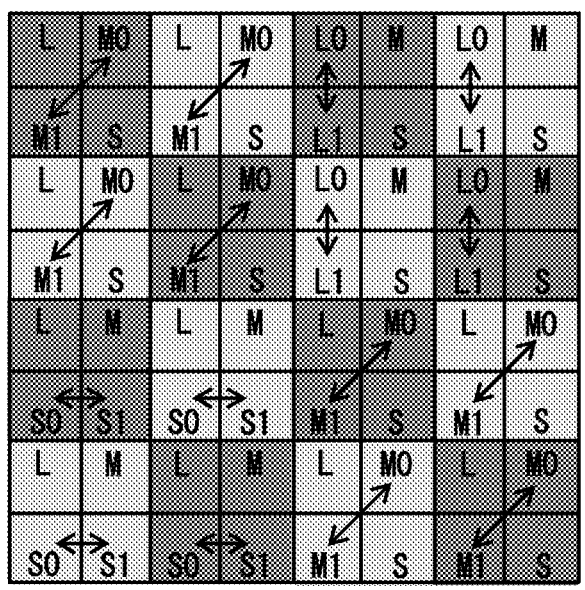

[FIG. 41]
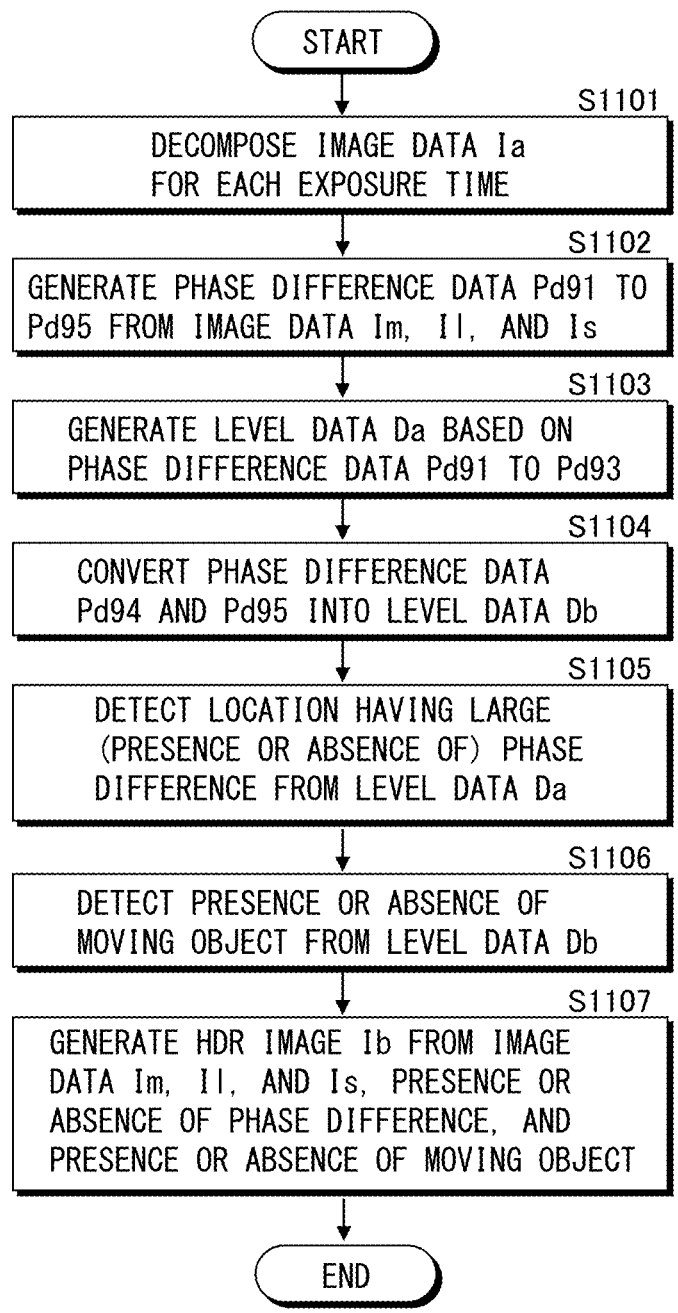

[FIG. 42]
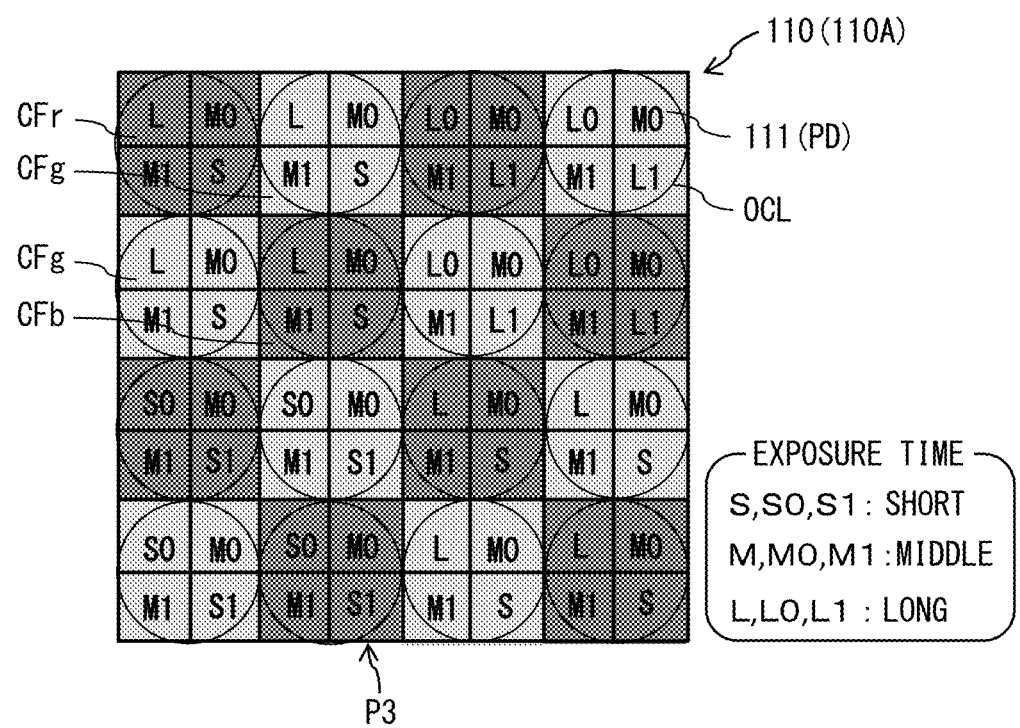

[FIG. 43]
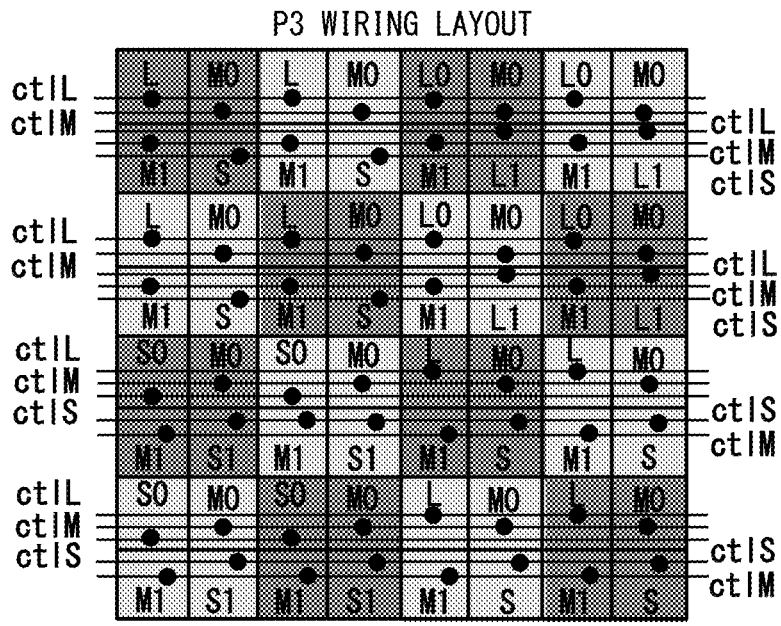
[FIG. 44]
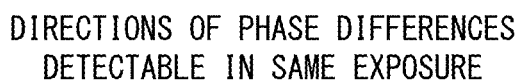
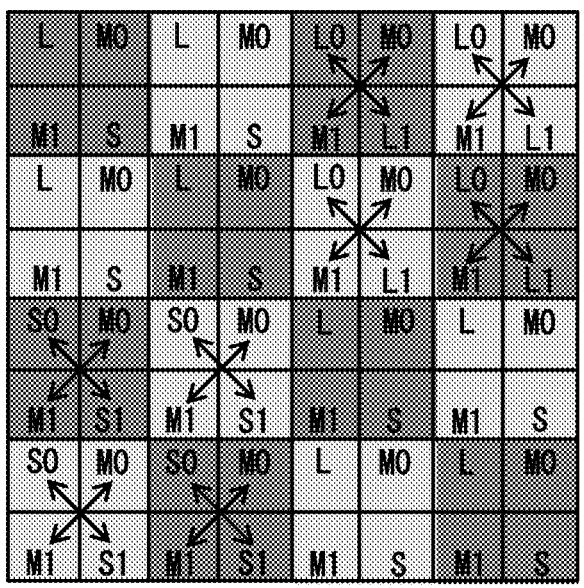

[FIG. 45]
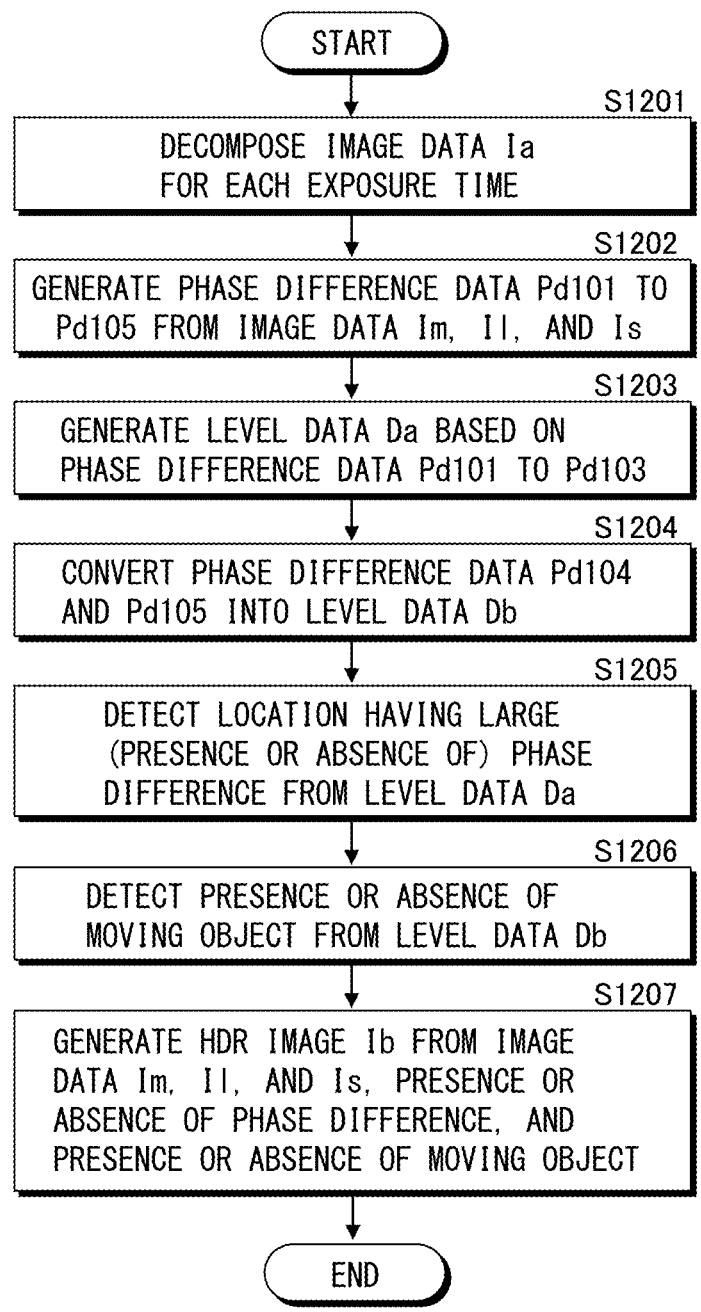

[FIG. 46]
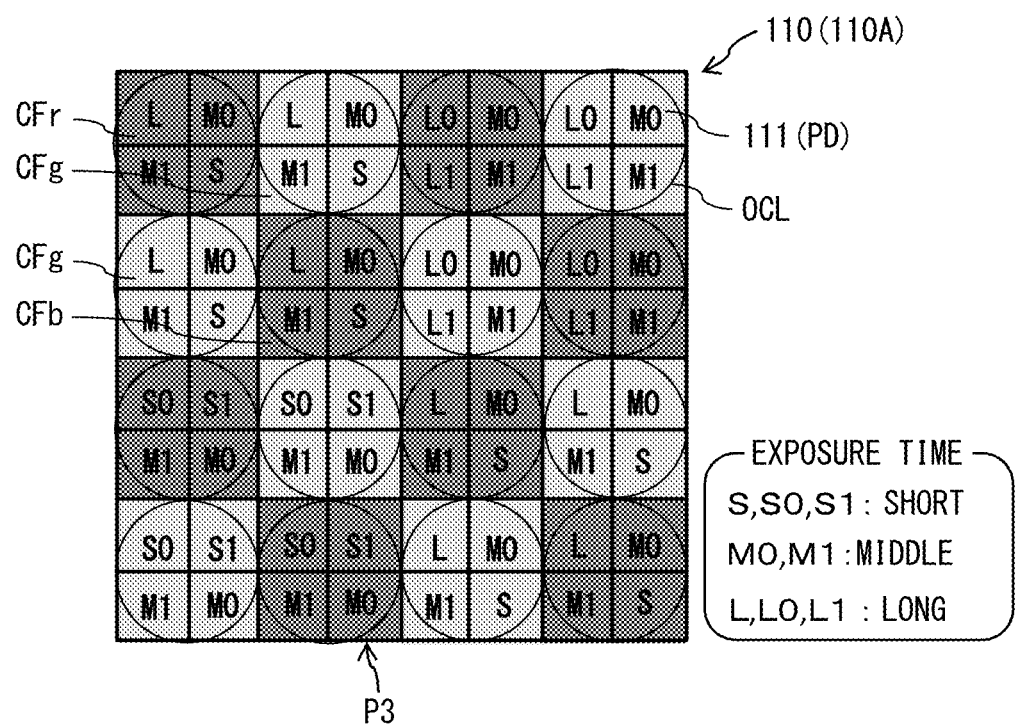

[FIG. 47]
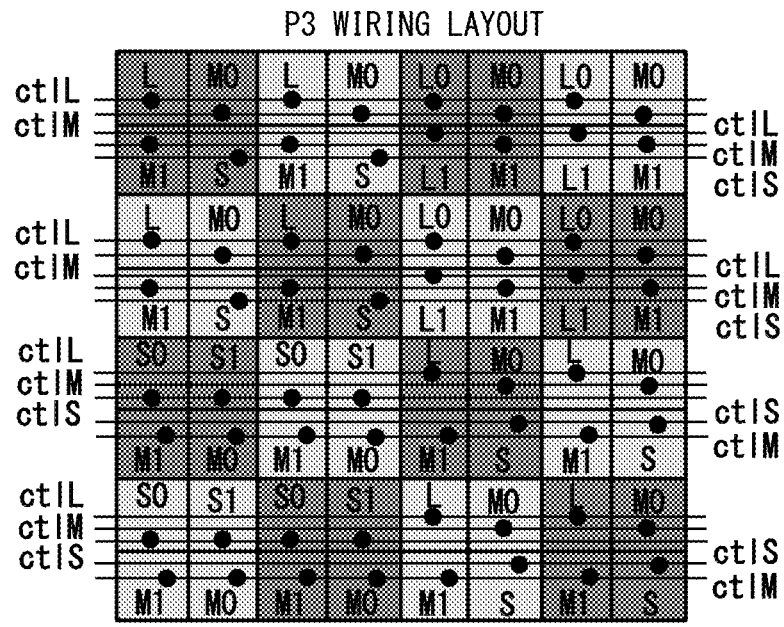
[FIG. 48]
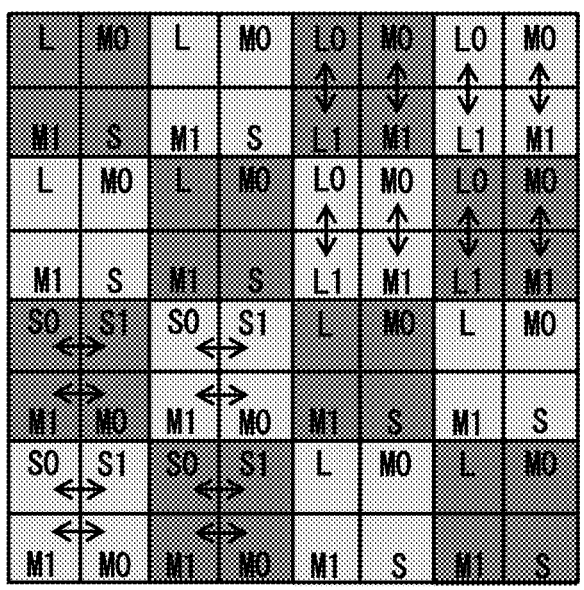

[FIG. 49]
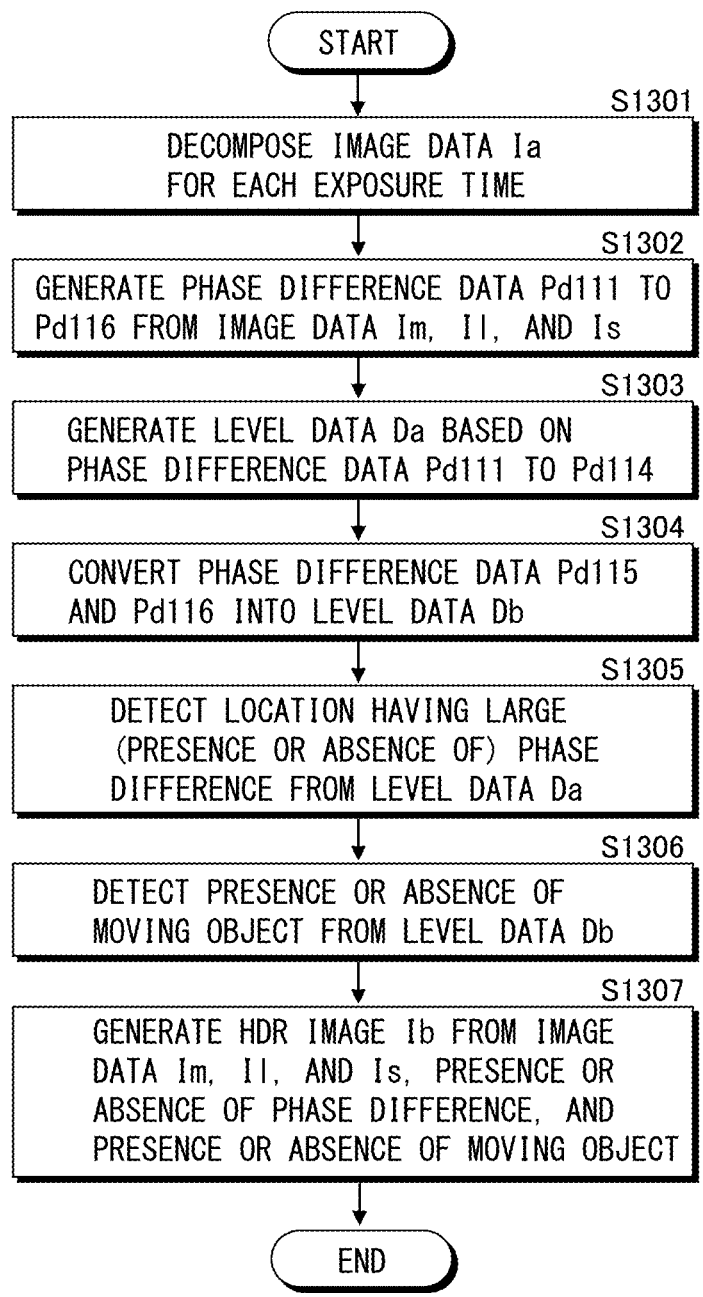

[FIG. 51]
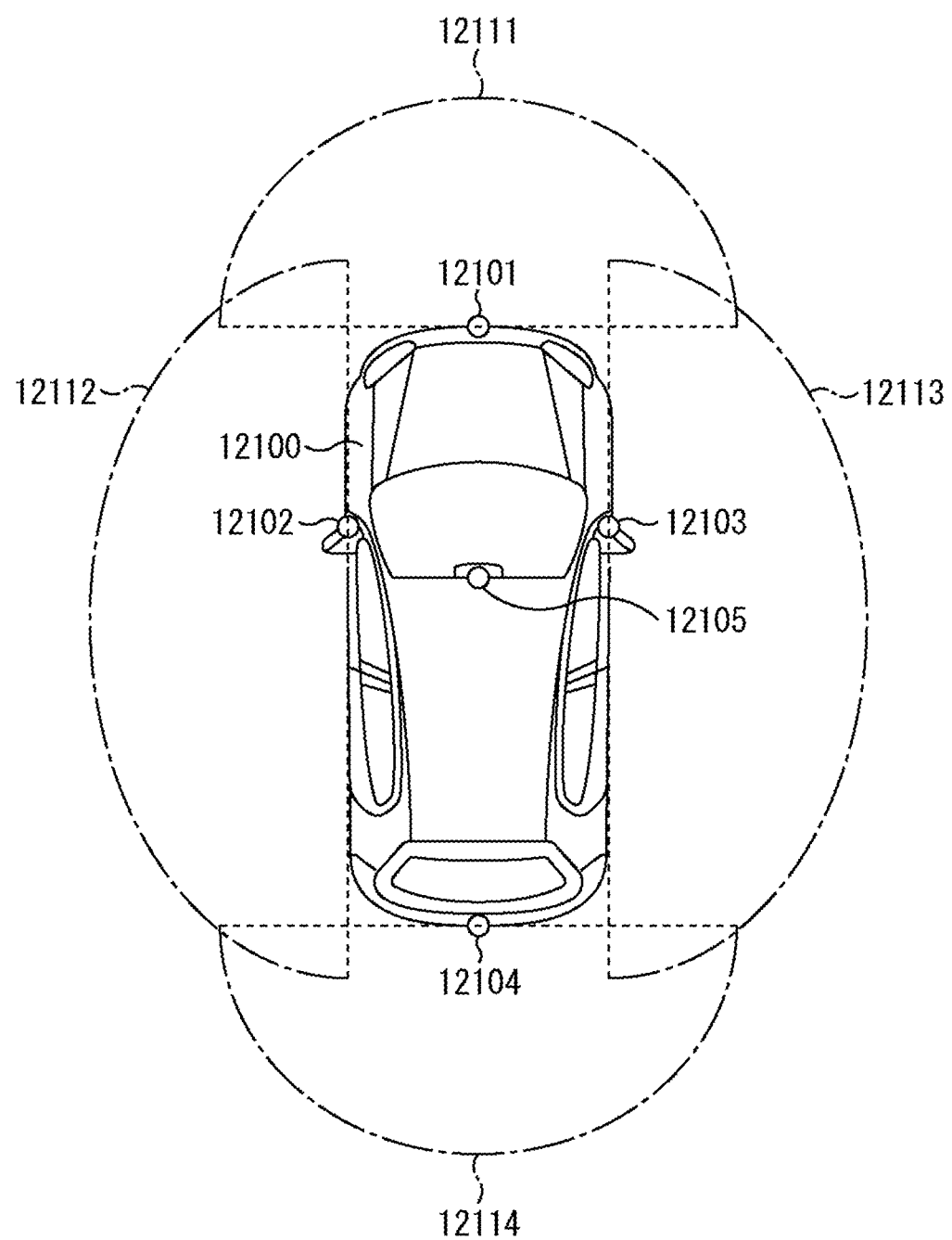

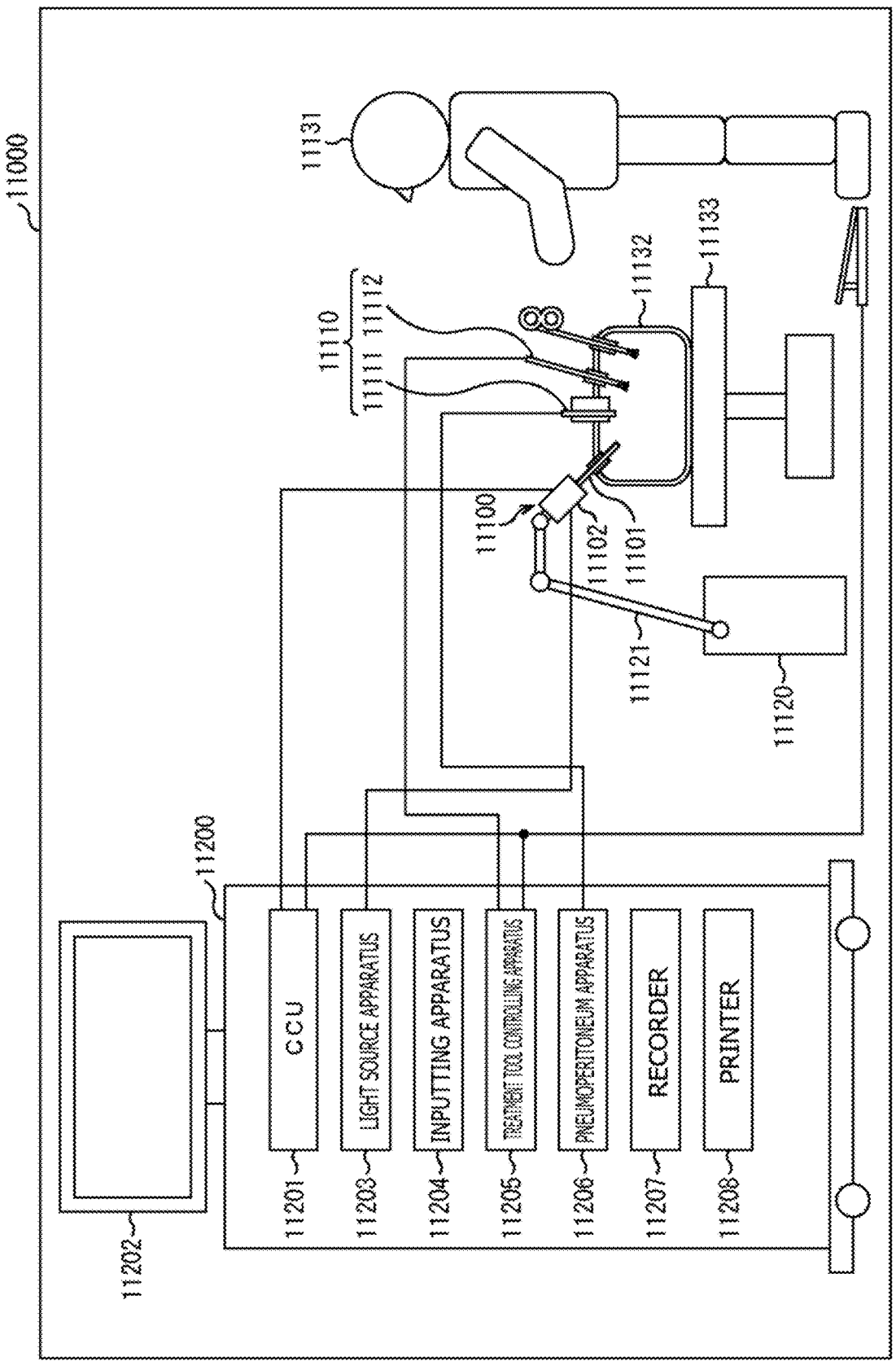
[FIG. 52]

[FIG. 53]
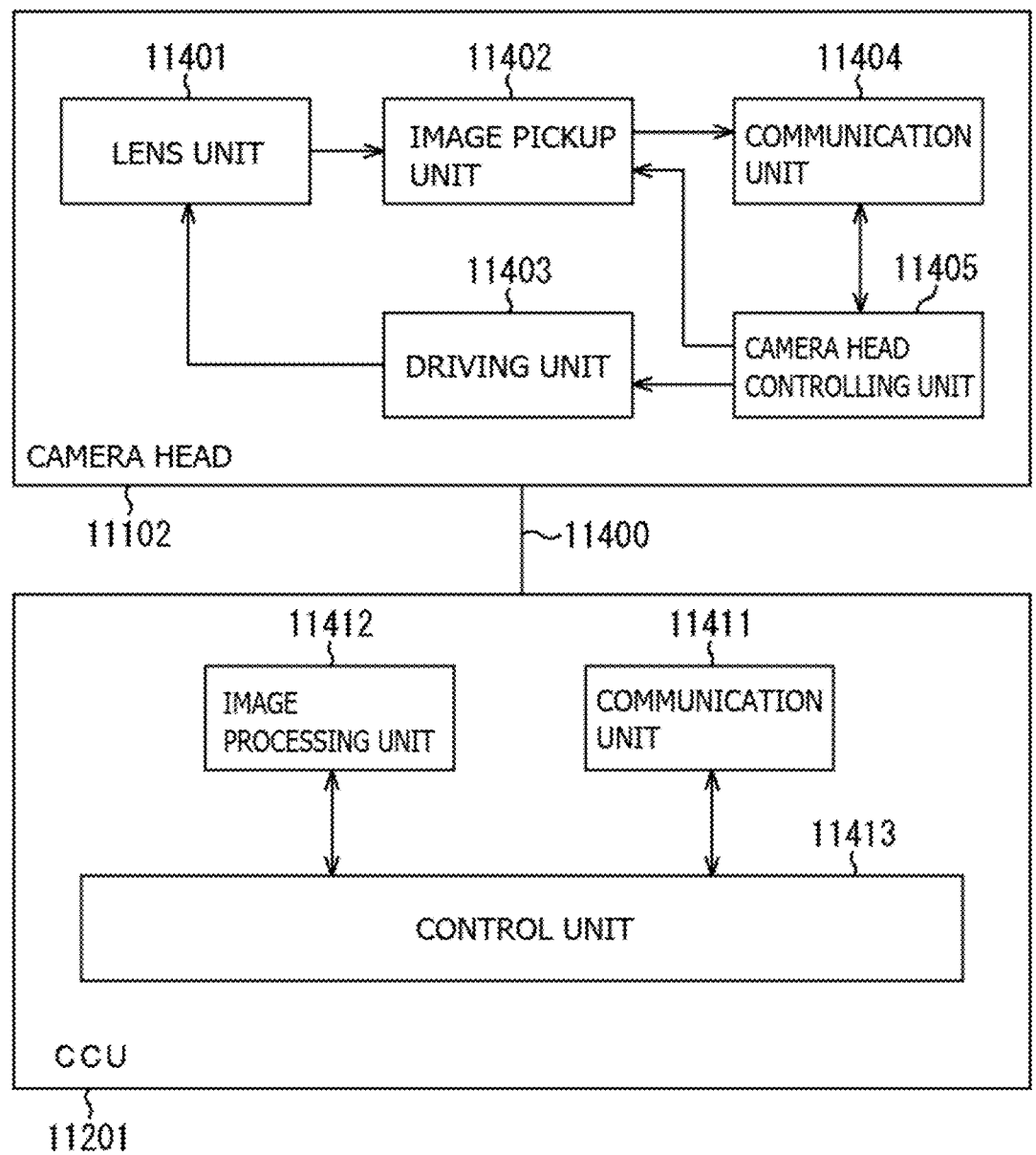

SIGNAL PROCESSING METHOD AND IMAGING APPARATUS

CROSS REFERENCE TO RELATED APPLICATIONS

This application is a U.S. National Phase of International Patent Application No. PCT/JP2019/048497 filed on Dec. 11, 2019, which claims priority benefit of Japanese Patent Application No. JP 2019-027479 filed in the Japan Patent Office on Feb. 19, 2019. Each of the above-referenced applications is hereby incorporated herein by reference in its entirety.

TECHNICAL FIELD

The present disclosure relates to a signal processing method and an imaging apparatus.

BACKGROUND ART

There has been known an imaging apparatus that generates an HDR (High Dynamic Range) image having a dynamic range wider than that of an image obtained by correct exposure (see, e.g., PTL 1).

CITATION LIST

Patent Literature

PTL 1: Japanese Unexamined Patent Application Publication No. 2015-201834

SUMMARY OF THE INVENTION

Incidentally, the HDR image may suffer image quality degradation such as decoloration, coloration, and double contour, in some cases. It is therefore desirable to provide a signal processing method and an imaging apparatus that make it possible to suppress image quality degradation of an HDR image.

An imaging apparatus according to a first aspect of the present disclosure includes: a plurality of pixels each including a photoelectric conversion element, and disposed in matrix on a light-receiving surface; a plurality of light-receiving lenses provided one by one for each of the plurality of pixels in the plurality of pixels; and a control section that controls exposure times of the plurality of pixels. The control section controls the exposure times of the plurality of pixels to allow exposure times of at least two of the pixels, of the plurality of pixels corresponding to each of the light-receiving lenses, to be the same, and exposure times of at least two of the pixels, of the plurality of pixels corresponding to each of the light-receiving lenses, to be different from each other.

In the imaging apparatus according to the first aspect of the present disclosure, the exposure times of the plurality of pixels are controlled to allow the exposure times of at least two of the pixels, of the plurality of pixels corresponding to each of the light-receiving lenses, to be the same, and the exposure times of at least two of the pixels, of the plurality of pixels corresponding to each of the light-receiving lenses, to be different from each other. This makes it possible, for example, to generate phase difference data for each of the exposure times from image data obtained by exposure control by the control section, and to generate an HDR (High Dynamic Range) image from a plurality of the phase difference data having different exposure times and a plurality of image data having different exposure times.

A signal processing method according to a second aspect of the present disclosure is a signal processing method in an imaging apparatus that includes a plurality of pixels each including a photoelectric conversion element and disposed in matrix on a light-receiving surface, and a plurality of light-receiving lenses provided one by one for each of the plurality of pixels in the plurality of pixels. The signal processing method includes the following:
(1) controlling exposure times of the plurality of pixels to allow exposure times of at least two of the pixels, of the plurality of pixels corresponding to each of the light-receiving lenses, to be the same, and exposure times of at least two of the pixels, of the plurality of pixels corresponding to each of the light-receiving lenses, to be different from each other; and
(2) generating phase difference data for each of the exposure times from image data obtained by control of the exposure times, and generating an HDR image from a plurality of the phase difference data having different exposure times and a plurality of image data having different exposure times.

In the signal processing method according to the second aspect of the present disclosure, the exposure times of the plurality of pixels are controlled to allow the exposure times of at least two of the pixels, of the plurality of pixels corresponding to the light-receiving lenses, to be the same, and the exposure times of at least two of the pixels, of the plurality of pixels corresponding to each of the light-receiving lenses, to be different from each other. This makes it possible to generate phase difference data for each of the exposure times from image data obtained by exposure control, and to generate an HDR image from a plurality of the phase difference data having different exposure times and a plurality of image data having different exposure times.

BRIEF DESCRIPTION OF THE DRAWINGS

FIG. 1 illustrates an example of a schematic configuration of an imaging apparatus according to an embodiment of the present disclosure.

FIG. 2 illustrates an example of a schematic configuration of an imaging element of FIG. 1.

FIG. 3 illustrates an example of a circuit configuration example of a sensor pixel of FIG. 1.

FIG. 4 illustrates a configuration example of a pixel array section of FIG. 2.

FIG. 5 illustrates a configuration example of the pixel array section of FIG. 2.

FIG. 6 illustrates a configuration example of the pixel array section of FIG. 2.

FIG. 7 illustrates a configuration example of the pixel array section of FIG. 2.

FIG. 8 illustrates an example of a generation procedure of an HDR image in the imaging apparatus of FIG. 1.

FIG. 9 illustrates an example of an imaging procedure in the imaging apparatus of FIG. 1.

FIG. 10 illustrates a modification example of the configuration of the pixel array section of FIG. 2.

FIG. 11 illustrates a modification example of the configuration of the pixel array section of FIG. 2.

FIG. 12 illustrates a modification example of the configuration of the pixel array section of FIG. 2.

FIG. 13 illustrates an example of a wiring layout of the pixel array section of FIG. 12.

FIG. 14 illustrates an example of directions of phase differences detectable in the pixel array section of FIG. 12.

FIG. 15 illustrates an example of a generation procedure of an HDR image in an imaging apparatus provided with the pixel array section of FIG. 12.

FIG. 16 illustrates a modification example of the configuration of the pixel array section of FIG. 2.

FIG. 17 illustrates an example of a generation procedure of an HDR image in an imaging apparatus provided with the pixel array section of FIG. 16.

FIG. 18 illustrates a modification example of the configuration of the pixel array section of FIG. 2.

FIG. 19 illustrates an example of a generation procedure of an HDR image in an imaging apparatus provided with the pixel array section of FIG. 18.

FIG. 20 illustrates a modification example of the configuration of the pixel array section of FIG. 2.

FIG. 21 illustrates an example of a generation procedure of an HDR image in an imaging apparatus provided with the pixel array section of FIG. 20.

FIG. 22 illustrates a modification example of the configuration of the pixel array section of FIG. 2.

FIG. 23 illustrates an example of a generation procedure of an HDR image in an imaging apparatus provided with the pixel array section of FIG. 22.

FIG. 24 illustrates a modification example of the configuration of the pixel array section of FIG. 2.

FIG. 25 illustrates an example of a wiring layout of the pixel array section of FIG. 24.

FIG. 26 illustrates an example of directions of phase differences detectable in the pixel array section of FIG. 24.

FIG. 27 illustrates a modification example of the configuration of the pixel array section of FIG. 2.

FIG. 28 illustrates an example of a wiring layout of the pixel array section of FIG. 27.

FIG. 29 illustrates an example of a generation procedure of an HDR image in an imaging apparatus provided with any of the pixel array sections of FIGS. 24 to 28.

FIG. 30 illustrates a modification example of the configuration of the pixel array section of FIG. 2.

FIG. 31 illustrates an example of a wiring layout of the pixel array section of FIG. 30.

FIG. 32 illustrates an example of directions of phase differences detectable in the pixel array section of FIG. 30.

FIG. 33 illustrates an example of a generation procedure of an HDR image in an imaging apparatus provided with the pixel array section of FIG. 30.

FIG. 34 illustrates a modification example of the configuration of the pixel array section of FIG. 2.

FIG. 35 illustrates an example of a wiring layout of the pixel array section of FIG. 34.

FIG. 36 illustrates an example of directions of phase differences detectable in the pixel array section of FIG. 34.

FIG. 37 illustrates an example of a generation procedure of an HDR image in an imaging apparatus provided with the pixel array section of FIG. 34.

FIG. 38 illustrates a modification example of the configuration of the pixel array section of FIG. 2.

FIG. 39 illustrates an example of a wiring layout of the pixel array section of FIG. 38.

FIG. 40 illustrates an example of directions of phase differences detectable in the pixel array section of FIG. 38.

FIG. 41 illustrates an example of a generation procedure of an HDR image in an imaging apparatus provided with the pixel array section of FIG. 38.

FIG. 42 illustrates a modification example of the configuration of the pixel array section of FIG. 2.

FIG. 43 illustrates an example of a wiring layout of the pixel array section of FIG. 42.

FIG. 44 illustrates an example of directions of phase differences detectable in the pixel array section of FIG. 42.

FIG. 45 illustrates an example of a generation procedure of an HDR image in an imaging apparatus provided with the pixel array section of FIG. 42.

FIG. 46 illustrates a modification example of the configuration of the pixel array section of FIG. 2.

FIG. 47 illustrates an example of a wiring layout of the pixel array section of FIG. 46.

FIG. 48 illustrates an example of directions of phase differences detectable in the pixel array section of FIG. 46.

FIG. 49 illustrates an example of a generation procedure of an HDR image in an imaging apparatus provided with the pixel array section of FIG. 46.

FIG. 51 is a diagram of assistance in explaining an example of installation positions of an outside-vehicle information detecting section and an imaging section.

FIG. 52 is a view depicting an example of a schematic configuration of an endoscopic surgery system.

FIG. 53 is a block diagram depicting an example of a functional configuration of a camera head and a camera control unit (CCU).

MODES FOR CARRYING OUT THE INVENTION

Figure 50:
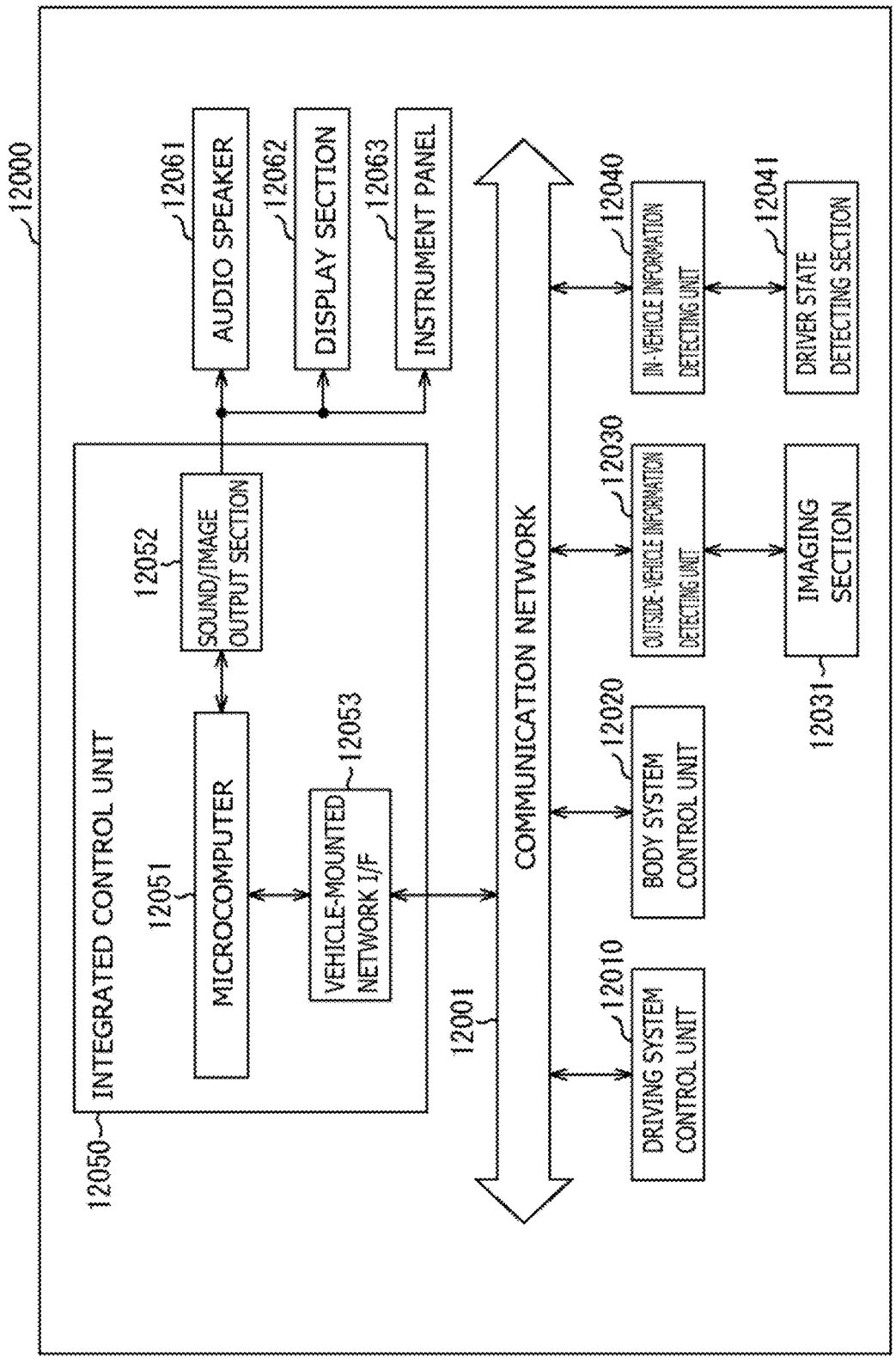
FIG. 50 is a block diagram depicting an example of schematic configuration of a vehicle control system.

Hereinafter, description is given in detail of embodiments of the present disclosure with reference to the drawings. It is to be noted that the description is given in the following order.
1. Embodiment (Imaging Apparatus) . . . FIGS. 1 to 9
2. Modification Examples (Imaging Apparatus) . . . FIGS. 10 to 49
3. Practical Application Examples
Example of Practical Application to Mobile Body . . . FIGS. 50 and 51
Example of Practical Application to Endoscopic Surgery System . . . FIGS. 52 and 53

1. Embodiment

[Configuration]
Description is given of an imaging apparatus 1 according to an embodiment of the present disclosure. FIG. 1 illustrates an example of a schematic configuration of the imaging apparatus 1. The imaging apparatus 1 is, for example, an electronic apparatus such as a digital still camera, a video camera, a smartphone, or a tablet-type terminal. The imaging apparatus 1 includes an imaging element 10, an arithmetic unit 20, a frame memory 30, a display unit 40, a storage unit 50, an operation unit 60, a power source unit 70, and an optical system 80. The imaging element 10, the arithmetic unit 20, the frame memory 30, the display unit 40, the storage unit 50, the operation unit 60, and the power source unit 70 are coupled to one another via a bus line L.

The optical system 80 includes one or a plurality of lenses, and guides light (incident light) from a subject to the imaging element 10 to form an image on a light-receiving surface of the imaging element 10. The imaging element 10 outputs a pixel signal (image data) corresponding to the light to be formed on the light-receiving surface via the optical system 80. The imaging element 10 is, for example, a CMOS (Complementary Metal Oxide Semiconductor) image sensor. The inner configuration of the imaging element 10 is described later in detail. The arithmetic unit 20 is a signal processing circuit that processes the pixel signal (image data) outputted from the imaging element 10. The arithmetic unit 20 generates an HDR image on the basis of the pixel signal (image data). The signal processing procedure in the arithmetic unit 20 is described later in detail.

The frame memory 30 temporarily holds image data (e.g., HDR image data) obtained by the signal processing by the arithmetic unit 20 on a frame-by-frame basis. The display unit 40 is, for example, configured by a panel-type display device such as a liquid crystal panel or an organic EL (Electro Luminescence) panel, and displays a moving image or a still image captured by the imaging element 10. The storage unit 50 records image data of the moving image or the still image captured by the imaging element 10, in a recording medium such as a semiconductor memory or a hard disk. The operation unit 60 issues an operation command for various functions of the imaging apparatus 1, in accordance with an operation by a user. In accordance with an imaging instruction by the user, for example, the operation unit 60 outputs a drive signal for controlling of a transfer operation of the imaging element 10 to drive the imaging element 10. The power source unit 70 appropriately supplies various types of power for operation to the imaging element 10, the arithmetic unit 20, the frame memory 30, the display unit 40, the storage unit 50, and the operation unit 60, which are supply targets.

Next, description is given of the imaging element 10. FIG. 2 illustrates an example of a schematic configuration of the imaging element 10. The imaging element 10 includes a pixel array section 110 in which a plurality of sensor pixels 111 each including a photoelectric conversion element are two-dimensionally disposed in matrix (matrix shape). As illustrated in FIG. 3, for example, the sensor pixel 111 is configured by a pixel circuit 112 that performs photoelectric conversion and a readout circuit 113 that outputs a pixel signal based on charges outputted from the pixel circuit 112.

The pixel circuit 112 includes, for example, a photodiode PD, a transfer transistor TR electrically coupled to the photodiode PD, and a floating diffusion FD that temporarily holds charges outputted from the photodiode PD via the transfer transistor TR. The photodiode PD performs photoelectric conversion to generate charges corresponding to an amount of light reception. A cathode of the photodiode PD is coupled to a source of the transfer transistor TR, and an anode of the photodiode PD is coupled to a reference potential line (e.g., ground). A drain of the transfer transistor TR is coupled to the floating diffusion FD, and a gate of the transfer transistor TR is coupled to a pixel drive line ctl1.

In each pixel circuit 112, the floating diffusion FD is coupled to an input end of a corresponding readout circuit 113. The readout circuit 113 includes, for example, a reset transistor RST, a selection transistor SEL, and an amplification transistor AMP. A source of the reset transistor RST (input end of the readout circuit 113) is coupled to the floating diffusion FD, and a drain of the reset transistor RST is coupled to a power source line VDD and a drain of the amplification transistor AMP. A gate of the reset transistor RST is coupled to a pixel drive line ctl2. A source of the amplification transistor AMP is coupled to a drain of the selection transistor SEL, and a gate of the amplification transistor AMP is coupled to the source of the reset transistor RST. A source of the selection transistor SEL (an output end of the readout circuit 113) is coupled to a vertical signal line vsl, and a gate of the selection transistor SEL is coupled to a pixel drive line ctl3.

When the transfer transistor TR is brought into an ON state, the transfer transistor TR transfers charges of the photodiode PD to the floating diffusion FD. The reset transistor RST resets an electric potential of the floating diffusion FD to a predetermined electric potential. When the reset transistor RST is brought into an ON state, the electric potential of the floating diffusion FD is reset to an electric potential of the power source line VDD. The selection transistor SEL controls an output timing of the pixel signal from the readout circuit 113. The amplification transistor AMP generates, as a pixel signal, a signal of a voltage corresponding to a level of charges held in the floating diffusion FD. That is, the amplification transistor AMP generates, as a pixel signal, a signal of a voltage corresponding to an amount of light reception in the sensor pixel 111. The amplification transistor AMP configures a source-follower type amplifier, and outputs a pixel signal of a voltage corresponding to a level of charges generated in the photodiode PD. When the selection transistor SEL is brought into an ON state, the amplification transistor AMP amplifies an electric potential of the floating diffusion FD, and outputs a voltage corresponding to the electric potential to a column signal processing circuit 122 (described later) via the vertical signal line vsl.

It is to be noted that selection transistor SEL may be provided between the power source line VDD and the amplification transistor AMP. In this case, the drain of the reset transistor RST is coupled to the power source line VDD and the drain of the selection transistor SEL. The source of the selection transistor SEL is coupled to the drain of the amplification transistor AMP, and the gate of the selection transistor SEL is coupled to the pixel drive line ctl3. The source of the amplification transistor AMP (output end of the readout circuit 113) is coupled to the vertical signal line vsl, and the gate of the amplification transistor AMP is coupled to the source of the reset transistor RST.

The imaging element 10 further includes a logic circuit 120 that processes the pixel signal. The logic circuit 120 includes, for example, a vertical drive circuit 121, a column signal processing circuit 122, a horizontal drive circuit 123, and a system control circuit 124. The logic circuit 120 outputs a digital value for each sensor pixel 111 to the outside.

The system control circuit 124 generates, on the basis of a master clock, a clock signal, a control signal, and the like to be standards of operations of the vertical drive circuit 121, the column signal processing circuit 122, the horizontal drive circuit 123, and the like, and provides the generated signals to the vertical drive circuit 121, the column signal processing circuit 122, the horizontal drive circuit 123, and the like. The vertical drive circuit 121 is configured by, for example, a shift register, or the like, and controls row scanning of the plurality of sensor pixels 111 via a plurality of pixel drive lines ctl (e.g., ctl1, ctl2, ctl3, ctlM (described later), ctlL (described later), and ctlS (described later)).

The column signal processing circuit 122 performs, for example, correlated double sampling (Correlated Double Sampling: CDS) processing on a pixel signal outputted from each sensor pixel 111 of a row selected by the vertical drive circuit 121. The column signal processing circuit 122 performs, for example, the CDS processing to thereby extract a signal level of the pixel signal and to hold pixel data corresponding to an amount of light reception of each sensor pixel 111. The column signal processing circuit 122 includes, for example, a plurality of ADCs (analog-digital conversion circuits) provided one by one for each vertical signal line vsl. For example, the ADC converts an analog pixel signal outputted for each column from each sensor pixel 111 into a digital signal for outputting. For example, changes in a ramp waveform voltage (ramp voltage) and a counter value in a one-to-one correspondence cause the ADC to convert an electric potential (analog signal) of the vertical signal line vsl into a digital signal. For example, the ADC converts a change in the ramp voltage into a change in time, and counts the time at a certain cycle (clock) to thereby perform conversion into a digital value.

The horizontal drive circuit 123 is configured by a shift register or the like, and controls column address and column scanning of the ADCs in the column signal processing circuit 122. Under the control of the horizontal drive circuit 123, N-bit digital signals having been subjected to the AD conversion in the respective ADCs are read to the horizontal output line in order, and are outputted as imaging data via the horizontal output line.

Next, description is given of the pixel array section 110.

FIG. 4 illustrates a configuration example of the pixel array section 110. The pixel array section 110 includes, on a light-receiving surface 110A, a plurality of color filters CF and a plurality of light-receiving lenses OCL. The plurality of color filters CF are provided one by one for every sensor pixels 111 (photodiodes PD) in two rows×two (i.e., four) columns. The plurality of light-receiving lenses OCL are provided one by one for the respective color filters CF. That is, the plurality of light-receiving lenses OCL are also provided one by one for every sensor pixels 111 in two rows×two (i.e., four) columns. Thus, light incident on each light-receiving lens OCL is condensed by the light-receiving lens OCL and transmitted through the corresponding color filter CF, and thereafter is incident on the corresponding sensor pixels 111 in two rows×two columns. It is to be noted that the sensor pixels 111 in two rows×two columns corresponding to the light-receiving lens OCL is hereinafter referred to as a monochromatic sensor pixel group P1.

The plurality of color filters CF is configured by a plurality of color filters CFr that transmits light in a red wavelength range, a plurality of color filters CFg that transmits light in a green wavelength range, and a plurality of color filters CFb that transmits light in a blue wavelength range. The plurality of color filters CFs are in a Bayer arrangement on a light-receiving surface. The Bayer arrangement of the plurality of color filters CFs on the light-receiving surface enables cyclic acquisition of phase difference data in a row direction and a column direction. The color filter CFr, the color filter CFg, and the color filter CFb are arranged on the light-receiving surface 110A at a ratio of 1:2:1. It is to be noted that the monochromatic sensor pixel group P1 in two rows×two columns in the Bayer arrangement is hereinafter referred to as a trichromatic sensor pixel group P2.

Exposure time of each sensor pixel 111 (photodiode PD) is controlled by the system control circuit 124. FIG. 4 illustrates an example of an exposure time of each sensor pixel 111 at the time of being controlled by the system control circuit 124. According to FIG. 4, in the monochromatic sensor pixel group P1, exposure times of two sensor pixels 111 (photodiodes PD) are set to "middle (Middle)", an exposure time of one of remaining two sensor pixels 111 (photodiodes PD) is set to "short (Short)", and the remaining one exposure time is set to "long (Long)". That is, the monochromatic sensor pixel group P1 includes three types of sensor pixels 111 (photodiodes PD) of which the exposure times are different from one another, and further includes two sensor pixels 111 (photodiodes PD) having the same exposure time. In other words, the system control circuit 124 controls exposure times of the plurality of sensor pixels 111 (photodiodes PD) to allow exposure times of three sensor pixels 111 (photodiodes PD), of the monochromatic sensor pixel group P1, to be different from one another, and exposure times of two sensor pixels 111 (photodiodes PD) thereof to be the same as each other.

In each monochromatic sensor pixel group P1, exposure times of two sensor pixels 111 (photodiodes PD) arranged in a right upward direction are set to "middle (Middle)" as illustrated in FIG. 4. That is, in each monochromatic sensor pixel group P1, the exposure times of the two sensor pixels 111 (photodiodes PD) arranged in the right upward direction are set equal to each other. In addition, in each monochromatic sensor pixel group P1, an exposure time of the lower right sensor pixel 111 (photodiode PD) is set to "short (Short)" as illustrated in FIG. 4. In addition, in each monochromatic sensor pixel group P1, an exposure time of the upper left sensor pixel 111 (photodiode PD) is set to "long (Long)" as illustrated in FIG. 4.

In addition, for example, as illustrated in FIG. 4, the pixel drive line ctlM is coupled to the sensor pixel 111 of which the exposure time is set to "middle (Middle)". That is, one pixel drive line ctlM of the two pixel drive lines ctlM assigned to the monochromatic sensor pixel group P1 is coupled to the upper right sensor pixel 111 of the monochromatic sensor pixel group P1, and the other pixel drive line ctlM thereof is coupled to the lower left sensor pixel 111 of the monochromatic sensor pixel group P1. The pixel drive line ctlS is coupled to each sensor pixel 111 of which the exposure time is set to "short (Short)". That is, the pixel drive line ctlS is coupled to the lower right sensor pixel 111 of the monochromatic sensor pixel group P1. The pixel drive line ctlL is coupled to the sensor pixel 111 of which the exposure time is set to "long (Long)". That is, the pixel drive line ctlL is coupled to the upper left sensor pixel 111 of the monochromatic sensor pixel group P1. The pixel array section 110 includes the pixel drive line ctlL and the pixel drive line ctlM at a location corresponding to the upper tier of each monochromatic sensor pixel group P1. In addition, the pixel array section 110 includes the pixel drive line ctlM and the pixel drive line ctlS at a location corresponding to the lower tier of each monochromatic sensor pixel group P1.

The system control circuit 124 outputs a control signal to the pixel drive line ctlM to allow the exposure time to be "middle (Middle)" to thereby control the exposure time of each sensor pixel 111 coupled to the pixel drive line ctlM to be "middle (Middle)". The system control circuit 124 outputs a control signal to the pixel drive line ctlS to allow the exposure time to be "short (Short)" to thereby control the exposure time of each sensor pixel 111 coupled to the pixel drive line ctlS to be "short (Short)". The system control circuit 124 outputs a control signal to the pixel drive line ctlL to allow the exposure time to be "long (Long)" to thereby control the exposure time of each sensor pixel 111 coupled to the pixel drive line ctlL to be "long (Long)". In this manner, the system control circuit 124 controls an exposure time for each sensor pixel 111. The imaging element 10 outputs image data Ia obtained under such control.

The image data Ia includes pixel data Sig in X rows×Y columns corresponding to sensor pixels 111 in X rows×Y columns in the pixel array section 110. The pixel data Sig in two rows×two columns corresponding to each monochromatic sensor pixel group P1, of the pixel data Sig in X rows×Y columns, includes two pixel data Sig1 corresponding to the two sensor pixels 111 of which the exposure times are set to "middle (Middle)", one pixel data Sig2 corresponding to the sensor pixel 111 of which the exposure time is set to "short (Short)", and one pixel data Sig3 corresponding to the sensor pixel 111 of which the exposure time is set to "long (Long)".

Accordingly, the pixel data Sig in two rows×two columns corresponding to each monochromatic sensor pixel group P1, of the pixel data Sig in X rows×Y columns, includes two pixel data Sig1 of which the exposure times are the same as each other. In addition, in the pixel data Sig in two rows×two columns corresponding to each monochromatic sensor pixel group P1, of the pixel data Sig in X rows×Y columns, it is possible to obtain a phase difference in the right upward direction on the light-receiving surface 110A by taking a difference between two pixel data Sig1 of which the exposure times are the same as each other. From the above, it is appreciated that the pixel array section 110 is configured to obtain phase difference data in one direction (right upward direction) from each monochromatic sensor pixel group P1.

It is to be noted that, in each monochromatic sensor pixel group P1, the exposure times of the two sensor pixels 111 (photodiodes PD) arranged in a right downward direction may be set to "middle (Middle)" as illustrated in FIG. 5. That is, in each monochromatic sensor pixel group P1, the exposure times of the two sensor pixels 111 (photodiodes PD) arranged in the right downward direction may be set equal to each other.

At this time, for example, as illustrated in FIG. 5, the pixel drive line ctlM is coupled to the sensor pixel 111 of which the exposure time is set to "middle (Middle)". That is, one pixel drive line ctlM of the two pixel drive lines ctlM assigned to the monochromatic sensor pixel group P1 is coupled to the upper left sensor pixel 111 of the monochromatic sensor pixel group P1, and the other pixel drive line ctlM thereof is coupled to the lower right sensor pixel 111 of the monochromatic sensor pixel group P1. The pixel drive line ctlS is coupled to each sensor pixel 111 of which the exposure time is set to "short (Short)". That is, the pixel drive line ctlS is coupled to the lower left sensor pixel 111 of the monochromatic sensor pixel group P1. The pixel drive line ctlL is coupled to the sensor pixel 111 of which the exposure time is set to "long (Long)". That is, the pixel drive line ctlL is coupled to the upper right sensor pixel 111 of the monochromatic sensor pixel group P1. The pixel array section 110 includes the pixel drive line ctlM and the pixel drive line ctlL at a location corresponding to the upper tier of each monochromatic sensor pixel group P1. In addition, the pixel array section 110 includes the pixel drive line ctlS and the pixel drive line ctlM at a location corresponding to the lower tier of each monochromatic sensor pixel group P1.

In this case, in the pixel data Sig in two rows×two columns corresponding to each monochromatic sensor pixel group P1, of the pixel data Sig in X rows×Y columns, it is possible to obtain a phase difference in the right downward direction on the light-receiving surface 110A by taking a difference between two pixel data Sig1 of which the exposure times are the same as each other. It is appreciated, in this case, that the pixel array section 110 is configured to obtain phase difference data in one direction (right downward direction) from each monochromatic sensor pixel group P1.

In addition, in each monochromatic sensor pixel group P1, the exposure times of the two sensor pixels 111 (photodiodes PD) arranged in a horizontal direction may be set to "middle (Middle)" as illustrated in FIG. 6. That is, in each monochromatic sensor pixel group P1, the exposure times of the two sensor pixels 111 (photodiodes PD) arranged in the horizontal direction may be set equal to each other. FIG. 6 exemplifies a case where, in each monochromatic sensor pixel group P1, exposure times of two sensor pixels 111 (photodiodes PD) in the upper tier are set to "middle (Middle)", an exposure time of one of the two sensor pixels 111 (photodiodes PD) in the lower tier is set to "short (Short)", and an exposure time of the other thereof is set to "long (Long)".

At this time, for example, as illustrated in FIG. 6, the pixel drive line ctlM is coupled to the sensor pixel 111 of which the exposure time is set to "middle (Middle)". That is, one pixel drive line ctlM of the two pixel drive lines ctlM assigned to each monochromatic sensor pixel group P1 is coupled to the upper left sensor pixel 111 of the monochromatic sensor pixel group P1, and the other pixel drive line ctlM thereof is coupled to the upper right sensor pixel 111 of the monochromatic sensor pixel group P1. The pixel drive line ctlS is coupled to each sensor pixel 111 of which the exposure time is set to "short (Short)". That is, the pixel drive line ctlS is coupled to the lower right sensor pixel 111 of the monochromatic sensor pixel group P1. The pixel drive line ctlL is coupled to the sensor pixel 111 of which the exposure time is set to "long (Long)". That is, the pixel drive line ctlL is coupled to the lower left sensor pixel 111 of the monochromatic sensor pixel group P1. The pixel array section 110 includes the two pixel drive lines ctlM at a location corresponding to the upper tier of each monochromatic sensor pixel group P1. In addition, the pixel array section 110 includes the pixel drive line ctlL and the pixel drive line ctlS at a location corresponding to the lower tier of each monochromatic sensor pixel group P1.

In this case, in the pixel data Sig in two rows×two columns corresponding to each monochromatic sensor pixel group P1, of the pixel data Sig in X rows×Y columns, it is possible to obtain a phase difference in the horizontal direction on the light-receiving surface 110A by taking a difference between two pixel data Sig1 of which the exposure times are the same as each other. It is appreciated, in this case, that the pixel array section 110 is configured to obtain phase difference data in one direction (horizontal direction) from each monochromatic sensor pixel group P1.

It is to be noted that, in the monochromatic sensor pixel group P1, the exposure times of the two sensor pixels 111 (photodiodes PD) in the lower tier may be set to "middle (Middle)". In this case, in the monochromatic sensor pixel group P1, an exposure time of one of the two sensor pixels 111 (photodiodes PD) in the upper tier is set to "short (Short)", and an exposure time of the other thereof is set to "long (Long)". At this time, the pixel array section 110 includes the two pixel drive lines ctlM at a location corresponding to the lower tier of each monochromatic sensor pixel group P1. In addition, the pixel array section 110 includes the pixel drive line ctlL and the pixel drive line ctlS at a location corresponding to the upper tier of each monochromatic sensor pixel group P1.

Also in this case, in the pixel data Sig in two rows×two columns corresponding to each monochromatic sensor pixel group P1, of the pixel data Sig in X rows×Y columns, it is possible to obtain a phase difference in the horizontal direction on the light-receiving surface 110A by taking a difference between two pixel data Sig1 of which the exposure times are the same as each other. It is appreciated, in this case, that the pixel array section 110 is configured to obtain phase difference data in one direction (horizontal direction) from each monochromatic sensor pixel group P1.

In addition, in each monochromatic sensor pixel group P1, exposure times of two sensor pixels 111 (photodiodes PD) arranged in a vertical direction may be set to "middle (Middle)" as illustrated in FIG. 7. That is, in each monochromatic sensor pixel group P1, the exposure times of the two sensor pixels 111 (photodiodes PD) arranged in the vertical direction may be set equal to each other. FIG. 7 exemplifies a case where, in each monochromatic sensor pixel group P1, exposure times of two photodiodes PD on left side are set to "middle (Middle)", an exposure time of one of the two sensor pixels 111 (photodiodes PD) on right side is set to "short (Short)", and an exposure time of the other thereof is set to "long (Long)".

Suppose, in each monochromatic sensor pixel group P1, that an exposure time of one in the upper tier, of the two sensor pixels 111 (photodiodes PD) on the right side, is set to "long (Long)", and an exposure time of the other in the lower tier thereof is set to "short (Short)". In this case, one pixel drive line ctlM of the two pixel drive lines ctlM assigned to the monochromatic sensor pixel group P1 is coupled to the upper left sensor pixel 111 of the monochromatic sensor pixel group P1, and the other pixel drive line ctlM thereof is coupled to the lower left sensor pixel 111 of the monochromatic sensor pixel group P1. The pixel drive line ctlS is coupled to the lower right sensor pixel 111 of the monochromatic sensor pixel group P1. The pixel drive line ctlL is coupled to the upper right sensor pixel 111 of the monochromatic sensor pixel group P1. The pixel array section 110 includes the pixel drive line ctlM and the pixel drive line ctlL at a location corresponding to the upper tier of each monochromatic sensor pixel group P1. In addition, the pixel array section 110 includes the pixel drive line ctlM and the pixel drive line ctlS at a location corresponding to the lower tier of each monochromatic sensor pixel group P1.

In addition, suppose, in each monochromatic sensor pixel group P1, that an exposure time of one in the upper tier, of the two sensor pixels 111 (photodiodes PD) on the right side, is set to "short (Short)", and an exposure time of the other in the lower tier thereof is set to "long (Long)". In this case, one pixel drive line ctlM of the two pixel drive lines ctlM assigned to the monochromatic sensor pixel group P1 is coupled to the upper left sensor pixel 111 of the monochromatic sensor pixel group P1, and the other pixel drive line ctlM thereof is coupled to the lower left sensor pixel 111 of the monochromatic sensor pixel group P1. The pixel drive line ctlS is coupled to the upper right sensor pixel 111 of the monochromatic sensor pixel group P1. The pixel drive line ctlL is coupled to the lower right sensor pixel 111 of the monochromatic sensor pixel group P1. The pixel array section 110 includes the pixel drive line ctlM and the pixel drive line ctlS at a location corresponding to the upper tier of each monochromatic sensor pixel group P1, and includes the pixel drive line ctlM and the pixel drive line ctlL at a location corresponding to the lower tier of each monochromatic sensor pixel group P1.

In this case, in the pixel data Sig in two rows×two columns corresponding to each monochromatic sensor pixel group P1, of the pixel data Sig in X rows×Y columns, it is possible to obtain a phase difference in the vertical direction on the light-receiving surface 110A by taking a difference between two pixel data Sig1 of which the exposure times are the same as each other. It is appreciated, in this case, that the pixel array section 110 is configured to obtain phase difference data in one direction (vertical direction) from each monochromatic sensor pixel group P1.

It is to be noted that, in the monochromatic sensor pixel group P1, the exposure times of the two sensor pixels 111 (photodiodes PD) on the right side may be set to "middle (Middle)". In this case, in the monochromatic sensor pixel group P1, an exposure time of one of the two sensor pixels 111 (photodiodes PD) on the left side is set to "short (Short)", and an exposure time of the other thereof is set to "long (Long)". Also in this case, in the pixel data Sig in two rows×two columns corresponding to each monochromatic sensor pixel group P1, of the pixel data Sig in X rows×Y columns, it is possible to obtain a phase difference in the vertical direction on the light-receiving surface 110A by taking a difference between two pixel data Sig1 of which the exposure times are the same as each other. It is appreciated, also in this case, that the pixel array section 110 is configured to obtain phase difference data in one direction (vertical direction) from each monochromatic sensor pixel group P1.

Next, description is given of an arithmetic circuit 20.

FIG. 8 illustrates an example of a signal processing procedure in the arithmetic circuit 20. The arithmetic circuit 20 generates an HDR image data Ib on the basis of the image data Ia obtained by the imaging element 10. The arithmetic circuit 20 first decomposes the image data Ia for each exposure time (step S101). Specifically, the arithmetic circuit 20 decomposes the image data Ia into data (image data Im) of which the exposure time is "middle (Middle)", data (image data Il) of which the exposure time is "long (Long)", and data (image data Is) of which the exposure time is "short (Short)".

Next, the arithmetic circuit 20 generates phase difference data Pd1 on the basis of the image data Im (Step S102). Specifically, the arithmetic circuit 20 derives, in the image data Im, a difference value between two pixel data Sig1 corresponding to each monochromatic sensor pixel group P1, and generates the phase difference data Pd1 from the derived difference value. In addition, the arithmetic circuit 20 generates phase difference data Pd2 on the basis of image data Il and Im (step S102). Specifically, the arithmetic circuit 20 derives a difference value between the image data Il and image data Im' obtained by multiplying the image data Im by an exposure time ratio between the exposure time "long (Long)" and the exposure time "middle (Middle)", and generates the phase difference data Pd2 from the derived difference value. In addition, the arithmetic circuit 20 generates phase difference data Pd3 on the basis of the image data Im and Is (step S102). Specifically, the arithmetic circuit 20 derives a difference value between the image data Im and image data Is' obtained by multiplying the image data Is by an exposure time ratio between the exposure time "middle (Middle)" and the exposure time "short (Short)", and generates the phase difference data Pd3 from the derived difference value.

Next, the arithmetic circuit 20 converts the phase difference data Pd1 into level data Da for a phase difference (step S103). The level data Da is, for example, data represented by values within a range from a lower limit value (e.g., zero bit) to an upper limit value (e.g., 128 bits). For example, in the phase difference data Pd1, the arithmetic circuit 20 converts a numerical value falling below a predetermined range into the lower limit value (e.g., zero bit). For example, in the phase difference data Pd1, the arithmetic circuit 20 converts a numerical value exceeding the predetermined range into the upper limit value (e.g., 128 bits). For example, in the phase difference data Pd1, the arithmetic circuit 20 converts a numerical value within the predetermined range into a value within a range from one bit to 127 bits in accordance with magnitude of the numerical value.

Next, the arithmetic circuit 20 converts the phase difference data Pd2 and Pd3 into level data Db on a moving object (step S104). The level data Db is, for example, data represented by values within a range from the lower limit value (e.g., zero bit) to the upper limit value (e.g., 128 bits). Specifically, the arithmetic circuit 20 generates the level data Db on the basis of data (noise data) on a noise level of the imaging element 10 and the phase difference data Pd2 and Pd3.

Next, the arithmetic circuit 20 detects a location having a large phase difference from the obtained level data Da (step S105). Further, the arithmetic circuit 20 detects presence or absence of a moving object from the obtained level data Db (step S106). Finally, the arithmetic circuit 20 generates the HDR image data Ib from the image data Im, Ti, and Is, presence or absence of a phase difference, and the presence or absence of a moving object (step S107). In this manner, the HDR image data Ib is generated.

Next, description is given of an imaging procedure in the imaging apparatus 1.

FIG. 9 illustrates an example of a flowchart of an imaging operation in the imaging apparatus 1. A user instructs the imaging apparatus 1 to start imaging by operating the operation unit 60 (step S201). Then, the operation unit 60 transmits an imaging command to the imaging element 10 (step S202). Upon receiving the imaging command, the imaging element 10 (specifically, the system control circuit 124) executes imaging in a predetermined imaging method (step S203).

For example, the system control circuit 124 performs exposure control on each sensor pixel 111 coupled to the pixel drive line ctlM to allow the exposure time to be "middle (Middle)". For example, the system control circuit 124 further performs exposure control on each sensor pixel 111 coupled to the pixel drive line ctlS to allow the exposure time to be "short (Short)". For example, the system control circuit 124 further performs exposure control on each sensor pixel 111 coupled to the pixel drive line ctlL to allow the exposure time to be "long (Long)". In this manner, the system control circuit 124 controls an exposure time for each sensor pixel 111. The imaging element 10 outputs, to the arithmetic circuit 20, the image data Ia having a pixel number of X rows×Y columns obtained under such control.

The arithmetic circuit 20 performs predetermined signal processing (e.g., generation of the HDR image data Ib, etc.) on the basis of the image data Ia inputted from the imaging element 10 (step S204). The arithmetic circuit 20 holds image data (e.g., the HDR image data Ib) obtained by the predetermined signal processing in the frame memory 30, and the frame memory 30 records the held image data (e.g., the HDR image data Ib) in the storage unit 50 (step S205). In this manner, the imaging in the imaging apparatus 1 is performed.

[Effects]

Next, description is given of effects of the imaging apparatus 1 according to the present embodiment.

In the present embodiment, the imaging element 10 is configured to obtain phase difference data in one direction (right upward direction, right downward direction, horizontal direction, or vertical direction). This makes it possible to determine the presence or absence of a phase difference and the presence or absence of a moving object in one direction.

2. Modification Examples

Hereinafter, description is given of modification examples of the imaging element 1 according to the foregoing embodiment.

Modification Example A

In the foregoing embodiment, the pixel array section 110 is configured to obtain phase difference data in one direction from each monochromatic sensor pixel group P1. However, in the foregoing embodiment, the pixel array section 110 may be configured to obtain phase difference data in two directions from each trichromatic sensor pixel group P2.

FIG. 10 illustrates a configuration example of the pixel array section 110 according to the present modification example. In the present modification example, the pixel array section 110 is configured to obtain phase difference data in the right upward direction and the right downward direction from each trichromatic sensor pixel group P2. At this time, in each trichromatic sensor pixel group P2, the monochromatic sensor pixel group P1 corresponding to the color filters CFr and CFb has the same configuration as that of the monochromatic sensor pixel group P1 according to the foregoing embodiment. In each trichromatic sensor pixel group P2, the monochromatic sensor pixel group P1 corresponding to one of the color filters CFg (hereinafter, referred to as a "monochromatic sensor pixel group Pa") also has the same configuration as that of the monochromatic sensor pixel group P1 according to the foregoing embodiment. Meanwhile, in each trichromatic sensor pixel group P2, the monochromatic sensor pixel group P1 corresponding to the other of the color filters CFg (hereinafter, referred to as a "monochromatic sensor pixel group Pb") has a configuration different from that of the monochromatic sensor pixel group P1 according to the foregoing embodiment.

Specifically, in each monochromatic sensor pixel group Pa, exposure times of two sensor pixels 111 (photodiodes PD) arranged in the right upward direction are set to "middle (Middle)" as illustrated in FIG. 10. That is, in each monochromatic sensor pixel group Pa, the exposure times of the two sensor pixels 111 (photodiodes PD) arranged in the right upward direction are set equal to each other. In addition, in each monochromatic sensor pixel group Pa, an exposure time of the lower right sensor pixel 111 (photodiode PD) is set to "short (Short)" as illustrated in FIG. 10. In addition, in each monochromatic sensor pixel group Pa, an exposure time of the upper left sensor pixel 111 (photodiode PD) is set to "long (Long)" as illustrated in FIG. 10.

Specifically, in each monochromatic sensor pixel group Pb, exposure times of two sensor pixels 111 (photodiodes PD) arranged in the right downward direction are set to "middle (Middle)" as illustrated in FIG. 10. That is, in each monochromatic sensor pixel group Pb, the exposure times of the two sensor pixels 111 (photodiodes PD) arranged in the right downward direction are set equal to each other. In addition, in each monochromatic sensor pixel group Pb, an exposure time of the lower left sensor pixel 111 (photodiode PD) is set to "short (Short)" as illustrated in FIG. 10. In addition, in each monochromatic sensor pixel group Pb, an exposure time of the upper right sensor pixel 111 (photodiode PD) is set to "long (Long)" as illustrated in FIG. 10. In other words, the system control circuit 124 controls exposure times of the plurality of sensor pixels 111 (photodiodes PD) to allow exposure times of three sensor pixels 111 (photodiodes PD), of each monochromatic sensor pixel group Pb, to be different from one another, and exposure times of two sensor pixels 111 (photodiodes PD) thereof to be the same as each other.

One pixel drive line ctlM of the two pixel drive lines ctlM assigned to the monochromatic sensor pixel group Pa is coupled to the upper right sensor pixel 111 of the monochromatic sensor pixel group Pa, and the other pixel drive line ctlM thereof is coupled to the lower left sensor pixel 111 of the monochromatic sensor pixel group Pa. The pixel drive line ctlS is coupled to the lower right sensor pixel 111 of the monochromatic sensor pixel group Pa. The pixel drive line ctlL is coupled to the upper left sensor pixel 111 of the monochromatic sensor pixel group Pa.

One pixel drive line ctlM of the two pixel drive lines ctlM assigned to the monochromatic sensor pixel group Pb is coupled to the upper left sensor pixel 111 of the monochromatic sensor pixel group Pb, and the other pixel drive line ctlM is coupled to the lower right sensor pixel 111 of the monochromatic sensor pixel group Pb. The pixel drive line ctlS is coupled to the lower left sensor pixel 111 of the monochromatic sensor pixel group Pb. The pixel drive line ctlL is coupled to the upper right sensor pixel 111 of the monochromatic sensor pixel group Pb.

Here, the pixel array section 110 includes the pixel drive line ctlL and the pixel drive line ctlM at a location corresponding to the upper tier of each monochromatic sensor pixel group P1. In addition, the pixel array section 110 includes the pixel drive line ctlM and the pixel drive line ctlS at a location corresponding to the lower tier of each monochromatic sensor pixel group P1. This makes it possible to determine the presence or absence of a phase difference and the presence or absence of a moving object in the two directions (right upward direction and right downward direction).

It is to be noted that, in each trichromatic sensor pixel group P2, the monochromatic sensor pixel group Pa may be disposed on the upper right, and the monochromatic sensor pixel group Pb may be disposed on the lower left. In addition, in each trichromatic sensor pixel group P2, the monochromatic sensor pixel group Pa may be disposed on the lower left, and the monochromatic sensor pixel group Pb may be disposed on the upper right. In addition, a plurality of monochromatic sensor pixel groups Pa, and a plurality of monochromatic sensor pixel groups Pb may be alternately disposed in the two directions (right upward direction and right downward direction) within the light-receiving surface 110A.

In the present modification example, for example, as illustrated in FIG. 11, the pixel array section 110 may be configured to obtain phase difference data in the horizontal direction and the vertical direction from each trichromatic sensor pixel group P2. At this time, in each trichromatic sensor pixel group P2, the pixel array section 110 may be configured to obtain phase difference data in the horizontal direction from the monochromatic sensor pixel group P1 corresponding to one of the color filters CFg (hereinafter, referred to as a "monochromatic sensor pixel group Pc"). Further, in each trichromatic sensor pixel group P2, the pixel array section 110 may be configured to obtain phase difference data in the vertical direction from the monochromatic sensor pixel group P1 corresponding to the other of the color filters CFg (hereinafter, referred to as a "monochromatic sensor pixel group Pd").

Here, in each monochromatic sensor pixel group Pc, exposure times of two sensor pixels 111 (photodiodes PD) disposed on the upper tier are set to middle (Middle) as illustrated in FIG. 11. That is, in each monochromatic sensor pixel group Pc, the exposure times of the two sensor pixels 111 disposed on the upper tier (photodiode PD) are set equal to each other. In addition, in each monochromatic sensor pixel group Pc, as illustrated in FIG. 11, an exposure time of one sensor pixel 111 (photodiode PD) of the two sensor pixels 111 (photodiodes PD) disposed in the lower tier is set to "short (Short)", and an exposure time of the other sensor pixel 111 (photodiode PD) thereof is set to "long (Long)".

In addition, in each monochromatic sensor pixel group Pd, exposure times of two sensor pixels 111 (photodiodes PD) disposed on the left side are set to "middle (Middle)" as illustrated in FIG. 11. That is, in each monochromatic sensor pixel group Pd, the exposure times of the two sensor pixels 111 (photodiodes PD) disposed on the left side are set equal to each other. In addition, in each monochromatic sensor pixel group Pd, as illustrated in FIG. 11, an exposure time of the sensor pixel 111 (photodiode PD) disposed on the upper right is set to "long (Long)", and an exposure time of the lower right sensor pixel 111 (photodiode PD) is set to "short (Short)".

One pixel drive line ctlM of the two pixel drive lines ctlM assigned to the monochromatic sensor pixel group Pc is coupled to the upper left sensor pixel 111 of the monochromatic sensor pixel group Pc, and the other pixel drive line ctlM is coupled to the upper right sensor pixel 111 of the monochromatic sensor pixel group Pc. The pixel drive line ctlS is coupled to the lower right sensor pixel 111 of the monochromatic sensor pixel group Pc. The pixel drive line ctlL is coupled to the lower left sensor pixel 111 of the monochromatic sensor pixel group Pc.

One pixel drive line ctlM of the two pixel drive lines ctlM assigned to the monochromatic sensor pixel group Pd is coupled to the upper left sensor pixel 111 of the monochromatic sensor pixel group Pd, and the other pixel drive line ctlM is coupled to the lower left sensor pixel 111 of the monochromatic sensor pixel group Pd. The pixel drive line ctlS is coupled to the lower right sensor pixel 111 of the monochromatic sensor pixel group Pd. The pixel drive line ctlL is coupled to the upper right sensor pixel 111 of the monochromatic sensor pixel group Pd.

It is to be noted that, in each monochromatic sensor pixel group Pc, the exposure times of the two sensor pixels 111 (photodiodes PD) disposed on the lower tier may be set to "middle (Middle)". That is, in each monochromatic sensor pixel group Pc, the exposure times of the two sensor pixels 111 (photodiodes PD) disposed on the lower tier may be set equal to each other. In addition, in each monochromatic sensor pixel group Pd, the exposure times of the two sensor pixels 111 (photodiodes PD) disposed on the right may be set to "middle (Middle)". That is, in each monochromatic sensor pixel group Pd, the exposure times of the two sensor pixels 111 (photodiodes PD) disposed on the right side may be set equal to each other.

In each monochromatic sensor pixel group Pc, in a case where exposure times of two sensor pixels 111 (photodiodes PD) disposed on the upper tier are set to "middle (Middle)", the pixel array section 110 includes the two pixel drive lines ctlM at a location corresponding to the upper tier of each monochromatic sensor pixel group Pc, and includes the pixel drive line ctlS and the pixel drive line ctlL at a location corresponding to the lower tier of each monochromatic sensor pixel group Pc. Meanwhile, in a case where, in each monochromatic sensor pixel group Pc, exposure times of two sensor pixels 111 (photodiodes PD) disposed on the lower tier are set to "middle (Middle)", the pixel array section 110 includes the two pixel drive lines ctlM at a location corresponding to the lower tier of each monochromatic sensor pixel group Pc, and includes the pixel drive line ctlS and the pixel drive line ctlL at a location corresponding to the upper tier of each monochromatic sensor pixel group Pc.

In each monochromatic sensor pixel group Pd, in a case where exposure times of two sensor pixels 111 (photodiodes PD) disposed on the left side are set to "middle (Middle)", the pixel array section 110 includes one pixel drive line ctlM at a location corresponding to the upper tier of each monochromatic sensor pixel group Pd, and includes one pixel drive line ctlM at a location corresponding to the lower tier of each monochromatic sensor pixel group Pd. In a case where, in each monochromatic sensor pixel group Pd, exposure times of two sensor pixels 111 (photodiodes PD) disposed on the right side are set to "middle (Middle)", the pixel array section 110 includes one pixel drive line ctlM at a location corresponding to the upper tier of each monochromatic sensor pixel group Pd, and includes one pixel drive line ctlM at a location corresponding to the lower tier of each monochromatic sensor pixel group Pd.

In this manner, in the present modification example, the imaging element 10 is configured to obtain phase difference data in the two directions (horizontal direction and vertical direction). This makes it possible to determine the presence or absence of a phase difference and the presence or absence of a moving object in the two directions.

Modification Example B

In the foregoing Modification Example A, the pixel array section 110 is configured to obtain phase difference data in the two directions from each trichromatic sensor pixel group P2. However, in the foregoing Modification Example A, the pixel array section 110 may be configured to obtain phase difference data in three directions from trichromatic sensor pixel group P2 in two rows×two columns (hereinafter, referred to as a "trichromatic sensor pixel group P3").

FIG. 12 illustrates a configuration example of the pixel array section 110 according to the present modification example. FIG. 13 illustrates an example of a wiring layout of the pixel array section 110 of FIG. 12. FIG. 14 illustrates an example of directions of phase differences detectable in the pixel array section 110 of FIG. 12.

In the present modification example, the pixel array section 110 is configured to obtain phase difference data in the right upward direction, the vertical direction, and the horizontal direction from each trichromatic sensor pixel group P3. At this time, in each trichromatic sensor pixel group P3, the monochromatic sensor pixel group P1 corresponding to the color filters CFr and CFb (hereinafter, referred to as a "monochromatic sensor pixel group Ph") has the same configuration as that of the monochromatic sensor pixel group P1 according to the foregoing embodiment. In the upper left and lower right trichromatic sensor pixel groups P2 included in each trichromatic sensor pixel group P3, the monochromatic sensor pixel group P1 corresponding to each color filter CFg (hereinafter, referred to as a "monochromatic sensor pixel group Pe") also has the same configuration as that of the monochromatic sensor pixel group P1 according to the foregoing embodiment. Meanwhile, in the lower left trichromatic sensor pixel group P2 included in each trichromatic sensor pixel group P3, the monochromatic sensor pixel group P1 corresponding to each color filter CFg (hereinafter, referred to as a "monochromatic sensor pixel group Pf") has a configuration different from that of the monochromatic sensor pixel group P1 according to the foregoing embodiment. Further, in the upper right trichromatic sensor pixel group P2 included in each trichromatic sensor pixel group P3, the monochromatic sensor pixel group P1 corresponding to each color filter CFg (hereinafter, referred to as a "monochromatic sensor pixel group Pg") has a configuration different from that of the monochromatic sensor pixel group P1 according to the foregoing embodiment.

Specifically, in the monochromatic sensor pixel group Pf, exposure times of two sensor pixels 111 (photodiodes PD) are set to "short (Short)", an exposure time of one of the remaining two sensor pixels 111 (photodiodes PD) is set to "middle (Middle)", and an exposure time of the remaining one is set to "long (Long)". That is, the monochromatic sensor pixel group Pf includes three types of sensor pixels 111 (photodiodes PD) of which the exposure times are different from one another, and further includes two sensor pixels 111 (photodiodes PD) of which the exposure times are the same as each other. In other words, the system control circuit 124 controls exposure times of the plurality of sensor pixels 111 (photodiodes PD) to allow exposure times of three sensor pixels 111 (photodiodes PD), of the monochromatic sensor pixel group Pf, to be different from one another, and exposure times of two sensor pixels 111 (photodiodes PD) thereof to be the same as each other.

In each monochromatic sensor pixel group Pf, exposure times of two sensor pixels 111 (photodiodes PD) arranged in the horizontal direction in the lower tier are set to "short (Short)" as illustrated in FIG. 12. That is, in each monochromatic sensor pixel group Pf, the exposure times of the two sensor pixels 111 (photodiodes PD) arranged in the horizontal direction in the lower tier are set equal to each other. In addition, in each monochromatic sensor pixel group Pf, an exposure time of the upper right sensor pixel 111 (photodiode PD) is set to "middle (Middle)" as illustrated in FIG. 12. In addition, in each monochromatic sensor pixel group Pf, an exposure time of the upper left sensor pixel 111 (photodiode PD) is set to "long (Long)" as illustrated in FIG. 12.

One pixel drive line ctlS of the two pixel drive lines ctlS assigned to the monochromatic sensor pixel group Pf is coupled to the lower left sensor pixel 111 of the monochromatic sensor pixel group Pf, and the other pixel drive line ctlS thereof is coupled to the lower right sensor pixel 111 of the monochromatic sensor pixel group Pf. The pixel drive line ctlM is coupled to the upper right sensor pixel 111 of the monochromatic sensor pixel group Pf. The pixel drive line ctlL is coupled to the upper left sensor pixel 111 of the monochromatic sensor pixel group Pf. At this time, the pixel array section 110 includes the pixel drive line ctlL and the pixel drive line ctlM at a location corresponding to the upper tier of each monochromatic sensor pixel group Pf. In addition, the pixel array section 110 includes the two pixel drive lines ctlS at a location corresponding to the lower tier of each monochromatic sensor pixel group Pf.

It is to be noted that, in each monochromatic sensor pixel group Pf, the one sensor pixel 111 (photodiode PD) of which the exposure time is set to "middle (Middle)" may be disposed on the upper left, and the one sensor pixel 111 (photodiode PD) of which the exposure time is set to "long (Long)" may be disposed on the upper right. In addition, in each monochromatic sensor pixel group Pf, the two sensor pixels 111 (photodiodes PD) of which the exposure times are set to "short (Short)" may be disposed on the upper tier, and may be arranged in the horizontal direction. In this case, in the monochromatic sensor pixel group Pf, an exposure time of one of the two sensor pixels 111 (photodiodes PD) in the lower tier is set to "middle (Middle)", and an exposure time of the other thereof is set to "long (Long)". At this time, the pixel array section 110 includes the two pixel drive lines ctlS at a location corresponding to the upper tier of each monochromatic sensor pixel group Pf. In addition, the pixel array section 110 includes the pixel drive line ctlL and the pixel drive line ctlM at a location corresponding to the lower tier of each monochromatic sensor pixel group Pf.

In addition, in the monochromatic sensor pixel group Pg, exposure times of two sensor pixels 111 (photodiodes PD) are set to "long (Long)", an exposure time of one of the remaining two sensor pixels 111 (photodiodes PD) is set to "middle (Middle)", and an exposure time of the remaining one is set to "short (Short)". That is, the monochromatic sensor pixel group Pg includes three types of sensor pixels 111 (photodiodes PD) of which the exposure times are different from one another, and further includes two sensor pixels 111 (photodiodes PD) of which the exposure times are the same as each other. In other words, the system control circuit 124 controls exposure times of the plurality of sensor pixels 111 (photodiodes PD) to allow exposure times of three sensor pixels 111 (photodiodes PD), of the monochromatic sensor pixel group Pg, to be different from one another, and exposure times of two sensor pixels 111 (photodiodes PD) thereof to be the same as each other.

In each monochromatic sensor pixel group Pg, the two sensor pixels 111 (photodiodes PD) of which the exposure times are set to "long (Long)" are disposed on the left side, and are arranged in the vertical direction, for example, as illustrated in FIG. 12. That is, in each monochromatic sensor pixel group Pg, the two sensor pixels 111 (photodiodes PD) of which the exposure times are the same as each other are disposed on the left side, and are arranged in the vertical direction, for example, as illustrated in FIG. 12. In addition, in each monochromatic sensor pixel group Pg, one sensor pixel 111 (photodiode PD) of which the exposure time is set to "middle (Middle)" is disposed on the upper right, for example, as illustrated in FIG. 12. In addition, in each monochromatic sensor pixel group Pg, one sensor pixel 111 (photodiode PD) of which the exposure time is set to "short (Short)" is disposed on the lower right, for example, as illustrated in FIG. 12.

One pixel drive line ctlL of the two pixel drive lines ctlL assigned to the monochromatic sensor pixel group Pg is coupled to the upper left sensor pixel 111 of the monochromatic sensor pixel group Pg, and the other pixel drive line ctlL thereof is coupled to the lower left sensor pixel 111 of the monochromatic sensor pixel group Pg. The pixel drive line ctlM is coupled to the upper right sensor pixel 111 of the monochromatic sensor pixel group Pg. The pixel drive line ctlS is coupled to the lower right sensor pixel 111 of the monochromatic sensor pixel group Pg. At this time, the pixel array section 110 includes the pixel drive line ctlL and the pixel drive line ctlM at a location corresponding to the upper tier of each monochromatic sensor pixel group Pg. In addition, the pixel array section 110 includes the pixel drive line ctlL and the pixel drive line ctlS at a location corresponding to the lower tier of each monochromatic sensor pixel group Pf.

It is to be noted that, in each monochromatic sensor pixel group Pg, the one sensor pixel 111 (photodiode PD) of which the exposure time is set to "middle (Middle)" may be disposed on the lower right, and the one sensor pixel 111 (photodiode PD) of which the exposure time is set to "short (Short)" may be disposed on the upper right. At this time, the pixel array section 110 includes the pixel drive line ctlL and the pixel drive line ctlS at a location corresponding to the upper tier of each monochromatic sensor pixel group Pg. In addition, the pixel array section 110 includes the pixel drive line ctlL and the pixel drive line ctlM at a location corresponding to the lower tier of each monochromatic sensor pixel group Pf. In addition, in each monochromatic sensor pixel group Pg, the two sensor pixels 111 (photodiodes PD) of which the exposure time is set to "long (Long)" may be disposed on the right side, and may be arranged in the vertical direction. In this case, in the monochromatic sensor pixel group Pg, an exposure time of one of the two sensor pixels 111 (photodiodes PD) on the left side is set to "middle (Middle)", and an exposure time of the other thereof is set to "short (Short)".

In the present modification example, the image data Ia includes the pixel data Sig in X rows×Y columns corresponding to the sensor pixels 111 in X rows×Y columns in the pixel array section 110. The pixel data Sig in two rows×two columns corresponding to the monochromatic sensor pixel group Ph, of the pixel data Sig in X rows×Y columns, includes two pixel data Sig1 corresponding to the two sensor pixels 111 of which the exposure times are set to "middle (Middle)", one pixel data Sig2 corresponding to the sensor pixel 111 of which the exposure time is set to "short (Short)", and one pixel data Sig3 corresponding to the sensor pixel 111 of which the exposure time is set to "long (Long)". In addition, the pixel data Sig in two rows×two columns corresponding to the monochromatic sensor pixel group Pe, of the pixel data Sig in X rows×Y columns, includes two pixel data Sig1 corresponding to the two sensor pixels 111 of which the exposure times are set to "middle (Middle)", one pixel data Sig2 corresponding to the sensor pixel 111 of which the exposure time is set to "short (Short)", and one pixel data Sig3 corresponding to the sensor pixel 111 of which the exposure time is set to "long (Long)".

In addition, the pixel data Sig in two rows×two columns corresponding to the monochromatic sensor pixel group Pf, of the pixel data Sig in X rows×Y columns, includes two pixel data Sig2 corresponding to the two sensor pixels 111 of which the exposure times are set to "short (Short)", one pixel data Sig1 corresponding to the sensor pixel 111 of which the exposure time is set to "middle (Middle)", and one pixel data Sig3 corresponding to the sensor pixel 111 of which the exposure time is set to "long (Long)". In addition, the pixel data Sig in two rows×two columns corresponding to the monochromatic sensor pixel group Pg, of the pixel data Sig in X rows×Y columns, includes two pixel data Sig3 corresponding to the two sensor pixels 111 of which the exposure times are set to "long (Long)", one pixel data Sig1 corresponding to the sensor pixel 111 of which the exposure time is set to "middle (Middle)", and one pixel data Sig2 corresponding to the sensor pixel 111 of which the exposure time is set to "short (Short)".

Next, description is given of the arithmetic circuit 20 of the present modification example.

FIG. 15 illustrates an example of a signal processing procedure in the arithmetic circuit 20 of the present modification example. The arithmetic circuit 20 generates the HDR image data Ib on the basis of the image data Ia obtained by the imaging element 10. The arithmetic circuit 20 first decomposes the image data Ia for each exposure time (step S301). Specifically, the arithmetic circuit 20 decomposes the image data Ia into data (image data Im) of which the exposure time is "middle (Middle)", data (image data Il) of which the exposure time is "long (Long)", and data (image data Is) of which the exposure time is "short (Short)".

Next, the arithmetic circuit 20 generates phase difference data Pd11 on the basis of the image data Im (Step S302). Specifically, the arithmetic circuit 20 derives, in the image data Im, a difference value between the two pixel data Sig1 corresponding to each monochromatic sensor pixel group Pe, and generates the phase difference data Pd11 in a first direction (right upward direction) on the light-receiving surface 110A from the derived difference value. In addition, phase difference data Pd12 is generated on the basis of the image data Is (step S302). Specifically, the arithmetic circuit 20 derives, in the image data Is, a difference value between the two pixel data Sig2 corresponding to each monochromatic sensor pixel group Pf, and generates the phase difference data Pd12 in a second direction (horizontal direction) on the light-receiving surface 110A from the derived difference value. In addition, phase difference data Pd13 is generated on the basis of the image data Il (step S302). Specifically, the arithmetic circuit 20 derives, in the image data Il, a difference value between the two pixel data Sig3 corresponding to each monochromatic sensor pixel group Pg, and generates the phase difference data Pd13 in a third direction (horizontal direction) on the light-receiving surface 110A from the derived difference value.

In addition, the arithmetic circuit 20 generates phase difference data Pd14 on the basis of the image data Il and Im (step S302). Specifically, the arithmetic circuit 20 derives a difference value between the image data Il and the image data Im' obtained by multiplying the image data Im by an exposure time ratio between the exposure time "long (Long)" and the exposure time "middle (Middle)", and generates the phase difference data Pd14 from the derived difference value. In addition, the arithmetic circuit 20 generates phase difference data Pd15 on the basis of the image data Im and Is (step S302). Specifically, the arithmetic circuit 20 derives a difference value between the image data Im and the image data Is' obtained by multiplying the image data Is by an exposure time ratio between the exposure time "middle (Middle)" and the exposure time "short (Short)", and generates the phase difference data Pd15 from the derived difference value.

Next, the arithmetic circuit 20 generates the level data Da for a phase difference on the basis of the phase difference data Pd11, Pd12, and Pd13 (step S303). The level data Da is, for example, data represented by values within a range from the lower limit value (e.g., zero bit) to the upper limit value (e.g., 128 bits). For example, in the phase difference data Pd11, Pd12, and Pd13, the arithmetic circuit 20 converts a numerical value falling below a predetermined range into the lower limit value (e.g., zero bit). For example, in the phase difference data Pd11, Pd12, and Pd13, the arithmetic circuit 20 converts a numerical value exceeding the predetermined range into the upper limit value (e.g., 128 bits). For example, in the phase difference data Pd11, Pd12, and Pd13, the arithmetic circuit 20 converts a numerical value within the predetermined range into a value within a range from one bit to 127 bits in accordance with magnitude of the numerical value.

Next, the arithmetic circuit 20 converts the phase difference data Pd14 and Pd15 into the level data Db on a moving object (step S104). The level data Db is, for example, data represented by values within a range from the lower limit value (e.g., zero bit) to the upper limit value (e.g., 128 bits). Specifically, the arithmetic circuit 20 generates the level data Db on the basis of data (noise data) on a noise level of the imaging element 10 and the phase difference data Pd14 and Pd15.

Next, the arithmetic circuit 20 detects a location having a large phase difference from the obtained level data Da (step S305). Further, the arithmetic circuit 20 detects presence or absence of a moving object from the obtained level data Db (step S306). Finally, the arithmetic circuit 20 generates the HDR image data Ib from the image data Im, Il, and Is, presence or absence of a phase difference, and the presence or absence of a moving object (step S307). In this manner, the HDR image data Ib is generated.

In this manner, in the present modification example, the imaging element 10 is configured to obtain the phase difference data in the three directions from the trichromatic sensor pixel group P2 in two rows×two columns (hereinafter, referred to as the "trichromatic sensor pixel group P3"). This makes it possible to determine the presence or absence of a phase difference and the presence or absence of a moving object in the three directions.

Modification Example C

In the foregoing embodiment and modification examples thereof, the pixel array section 110 is configured to obtain phase difference data in one direction from the pixel data Sig in two rows×two columns corresponding to the monochromatic sensor pixel group P1. However, in the foregoing embodiment and modification examples thereof, the pixel array section 110 may be configured to obtain phase difference data in two directions from the pixel data Sig in two rows×two columns corresponding to the monochromatic sensor pixel group P1.

FIG. 16 illustrates a configuration example of the pixel array section 110 according to the present modification example. In the present modification example, the pixel array section 110 is configured to obtain phase difference data in the right upward direction and the right downward direction from each trichromatic sensor pixel group P2. At this time, in each trichromatic sensor pixel group P2, the monochromatic sensor pixel group P1 (monochromatic sensor pixel group Ph) corresponding to each of the color filters CFr and CFb has the same configuration as that of the monochromatic sensor pixel group P1 according to the foregoing embodiment. In each trichromatic sensor pixel group P2, the monochromatic sensor pixel group P1 corresponding to each of the color filters CFg (monochromatic sensor pixel group Pa and Pb) has a configuration different from that of the monochromatic sensor pixel group P1 according to the foregoing embodiment.

Specifically, in each monochromatic sensor pixel group Pb, exposure times of two sensor pixels 111 (photodiodes PD) are set to "short (Short)", and exposure times of the remaining two sensor pixels 111 (photodiodes PD) are set to "middle (Middle)". In other words, the system control circuit 124 controls exposure times of the plurality of sensor pixels 111 (photodiodes PD) to allow exposure times of two sensor pixels 111 (photodiodes PD), of the monochromatic sensor pixel group Pb, to be different from each other, and exposure times of two sensor pixels 111 (photodiodes PD) thereof to be the same as each other. In addition, in each monochromatic sensor pixel group Pb, two sensor pixels 111 (photodiodes PD) of which the exposure times are set to short (Short) are arranged in the right downward direction, for example, as illustrated in FIG. 16. That is, in each monochromatic sensor pixel group Pb, the two sensor pixels 111 (photodiodes PD) of which the exposure times are the same as each other are arranged in the right downward direction, for example, as illustrated in FIG. 16. In addition, in each monochromatic sensor pixel group Pb, two sensor pixels 111 (photodiodes PD) of which the exposure times are set to "middle (Middle)" are arranged in the right upward direction, for example, as illustrated in FIG. 16. That is, in each monochromatic sensor pixel group Pb, the two sensor pixels 111 (photodiodes PD) of which the exposure times are the same as each other are arranged also in the right upward direction, for example, as illustrated in FIG. 16.

One pixel drive line ctlS of the two pixel drive lines ctlS assigned to the monochromatic sensor pixel group Pb is coupled to the upper left sensor pixel 111 of the monochromatic sensor pixel group Pb, and the other pixel drive line ctlS is coupled to the lower right sensor pixel 111 of the monochromatic sensor pixel group Pb. One pixel drive line ctlM of the two pixel drive lines ctlM assigned to the monochromatic sensor pixel group Pb is coupled to the lower left sensor pixel 111 of the monochromatic sensor pixel group Pb, and the other pixel drive line ctlM thereof is coupled to the upper right sensor pixel 111 of the monochromatic sensor pixel group Pb.

At this time, the pixel array section 110 includes the pixel drive line ctlM and the pixel drive line ctlS at a location corresponding to the upper tier of each monochromatic sensor pixel group Pb. In addition, the pixel array section 110 includes the pixel drive line ctlM and the pixel drive line ctlS at a location corresponding to the lower tier of each monochromatic sensor pixel group Pb. Here, in a case where an exposure time of one sensor pixel 111 (photodiode PD) included in the upper tier of the monochromatic sensor pixel group Ph disposed on the right adjacent or on the left adjacent to the monochromatic sensor pixel group Pb is set to "long (Long)", the pixel array section 110 further includes the pixel drive line ctlL at a location corresponding to the upper tier of each monochromatic sensor pixel group Pb. In addition, in a case where an exposure time of one sensor pixel 111 (photodiode PD) included in the lower tier of the monochromatic sensor pixel group Ph disposed on the right adjacent or on the left adjacent to the monochromatic sensor pixel group Pb is set to "long (Long)", the pixel array section 110 further includes the pixel drive line ctlL at a location corresponding to the lower tier of each monochromatic sensor pixel group Pb.

In addition, in each monochromatic sensor pixel group Pa, exposure times of two sensor pixels 111 (photodiodes PD) are set to "long (Long)", and exposure times of the remaining two sensor pixels 111 (photodiodes PD) are set to "middle (Middle)". In other words, the system control circuit 124 controls exposure times of the plurality of sensor pixels 111 (photodiodes PD) to allow exposure times of two sensor pixels 111 (photodiodes PD), of the monochromatic sensor pixel group Pa, to be different from each other, and exposure times of two sensor pixels 111 (photodiodes PD) thereof to be the same as each other. In addition, in each monochromatic sensor pixel group Pa, two sensor pixels 111 (photodiodes PD) of which the exposure times are set to long (Long) are arranged in the right downward direction, for example, as illustrated in FIG. 16. That is, in each monochromatic sensor pixel group Pa, the two sensor pixels 111 (photodiodes PD) of which the exposure times are the same as each other are arranged in the right downward direction, for example, as illustrated in FIG. 16. In addition, in each monochromatic sensor pixel group Pa, two sensor pixels 111 (photodiodes PD) of which the exposure times are set to "middle (Middle)" are arranged in the right upward direction, for example, as illustrated in FIG. 16. That is, in each monochromatic sensor pixel group Pa, the two sensor pixels 111 (photodiodes PD) of which the exposure times are the same as each other are arranged also in the right upward direction, for example, as illustrated in FIG. 16.

One pixel drive line ctlL of the two pixel drive lines ctlL assigned to the monochromatic sensor pixel group Pa is coupled to the upper left sensor pixel 111 of the monochromatic sensor pixel group Pa, and the other pixel drive line ctlL is coupled to the lower right sensor pixel 111 of the monochromatic sensor pixel group Pa. One pixel drive line ctlM of the two pixel drive lines ctlM assigned to the monochromatic sensor pixel group Pa is coupled to the lower left sensor pixel 111 of the monochromatic sensor pixel group Pa, and the other pixel drive line ctlM thereof is coupled to the upper right sensor pixel 111 of the monochromatic sensor pixel group Pa.

At this time, the pixel array section 110 includes the pixel drive line ctlL and the pixel drive line ctlM at a location corresponding to the upper tier of each monochromatic sensor pixel group Pa. In addition, the pixel array section 110 includes the pixel drive line ctlM and the pixel drive line ctlL at a location corresponding to the lower tier of each monochromatic sensor pixel group Pa. Here, in a case where an exposure time of one sensor pixel 111 (photodiode PD) included in the lower tier of the monochromatic sensor pixel group Ph disposed on the right adjacent or on the left adjacent to the monochromatic sensor pixel group Pa is set to "short (Short)", the pixel array section 110 further includes the pixel drive line ctlS at a location corresponding to the lower tier of each monochromatic sensor pixel group Pa. In addition, in a case where an exposure time of one sensor pixel 111 (photodiode PD) included in the upper tier of the monochromatic sensor pixel group Ph disposed on the right adjacent or on the left adjacent to the monochromatic sensor pixel group Pa is set to "short (Short)", the pixel array section 110 further includes the pixel drive line ctlS at a location corresponding to the upper tier of each monochromatic sensor pixel group Pa.

In the present modification example, the image data Ia includes the pixel data Sig in X rows×Y columns corresponding to the sensor pixels 111 in X rows×Y columns in the pixel array section 110. The pixel data Sig in two rows×two columns corresponding to the monochromatic sensor pixel group Ph, of the pixel data Sig in X rows×Y columns, includes two pixel data Sig1 corresponding to the two sensor pixels 111 of which the exposure times are set to "middle (Middle)", one pixel data Sig2 corresponding to the sensor pixel 111 of which the exposure time is set to "short (Short)", and one pixel data Sig3 corresponding to the sensor pixel 111 of which the exposure time is set to "long (Long)". In addition, the pixel data Sig in two rows×two columns corresponding to the monochromatic sensor pixel group Pa, of the pixel data Sig in X rows×Y columns, includes two pixel data Sig1 corresponding to the two sensor pixels 111 of which the exposure times are set to "middle (Middle)", and two pixel data Sig2 corresponding to the two sensor pixels 111 of which the exposure times are set to "short (Short)". In addition, the pixel data Sig in two rows×two columns corresponding to the monochromatic sensor pixel group Pb, of the pixel data Sig in X rows×Y columns, includes two pixel data Sig1 corresponding to the two sensor pixels 111 of which the exposure times are set to "middle (Middle)", and two pixel data Sig3 corresponding to the two sensor pixels 111 of which the exposure times are set to "long (Long)".

Next, description is given of the arithmetic circuit 20 of the present modification example.

FIG. 17 illustrates an example of a signal processing procedure in the arithmetic circuit 20 of the present modification example. The arithmetic circuit 20 generates the HDR image data Ib on the basis of the image data Ia obtained by the imaging element 10. The arithmetic circuit 20 first decomposes the image data Ia for each exposure time (step S401). Specifically, the arithmetic circuit 20 decomposes the image data Ia into data (image data Im) of which the exposure time is "middle (Middle)", data (image data Il) of which the exposure time is "long (Long)", and data (image data Is) of which the exposure time is "short (Short)".

Next, the arithmetic circuit 20 generates phase difference data Pd21 on the basis of the image data Im (Step S402).

Specifically, the arithmetic circuit 20 derives, in the image data Im, a difference value between the two pixel data Sig1 corresponding to each of the monochromatic sensor pixel groups Pa and Pb, and generates the phase difference data Pd21 in the first direction (right upward direction) on the light-receiving surface 110A from the derived difference value. In addition, phase difference data Pd22 is generated on the basis of the image data Is (step S402). Specifically, the arithmetic circuit 20 derives, in the image data Is, a difference value between the two pixel data Sig2 corresponding to each monochromatic sensor pixel group Pa, and generates the phase difference data Pd22 in a second direction (right downward direction) on the light-receiving surface 110A from the derived difference value. In addition, phase difference data Pd23 is generated on the basis of the image data Il (step S402). Specifically, the arithmetic circuit 20 derives, in the image data Il, a difference value between the two pixel data Sig3 corresponding to each monochromatic sensor pixel group Pb, and generates the phase difference data Pd23 in the second direction (right downward direction) on the light-receiving surface 110A from the derived difference value.

In addition, the arithmetic circuit 20 generates phase difference data Pd24 on the basis of the image data Il and Im (step S402). Specifically, the arithmetic circuit 20 derives a difference value between the image data Il and the image data Im' obtained by multiplying the image data Im by an exposure time ratio between the exposure time "long (Long)" and the exposure time "middle (Middle)", and generates the phase difference data Pd24 from the derived difference value. In addition, the arithmetic circuit 20 generates phase difference data Pd25 on the basis of the image data Im and Is (step S402). Specifically, the arithmetic circuit 20 derives a difference value between the image data Im and the image data Is' obtained by multiplying the image data Is by an exposure time ratio between the exposure time "middle (Middle)" and the exposure time "short (Short)", and generates the phase difference data Pd25 from the derived difference value.

Next, the arithmetic circuit 20 generates the level data Da for a phase difference on the basis of the phase difference data Pd21, Pd22, and Pd23 (step S403). The level data Da is, for example, data represented by values within a range from the lower limit value (e.g., zero bit) to the upper limit value (e.g., 128 bits). For example, in the phase difference data Pd21, Pd22, and Pd23, the arithmetic circuit 20 converts a numerical value falling below a predetermined range into the lower limit value (e.g., zero bit). For example, in the phase difference data Pd21, Pd22, and Pd23, the arithmetic circuit 20 converts a numerical value exceeding the predetermined range into the upper limit value (e.g., 128 bits). For example, in the phase difference data Pd21, Pd22, and Pd23, the arithmetic circuit 20 converts a numerical value within the predetermined range into a value within a range from one bit to 127 bits in accordance with magnitude of the numerical value.

Next, the arithmetic circuit 20 converts the phase difference data Pd24 and Pd25 into the level data Db on a moving object (step S404). The level data Db is, for example, data represented by values within a range from the lower limit value (e.g., zero bit) to the upper limit value (e.g., 128 bits). Specifically, the arithmetic circuit 20 generates the level data Db on the basis of data (noise data) on a noise level of the imaging element 10 and the phase difference data Pd24 and Pd25.

Next, the arithmetic circuit 20 detects a location having a large phase difference from the obtained level data Da (step S405). Further, the arithmetic circuit 20 detects presence or absence of a moving object from the obtained level data Db (step S406). Finally, the arithmetic circuit 20 generates the HDR image data Ib from the image data Im, Il, and Is, presence or absence of a phase difference, and the presence or absence of a moving object (step S407). In this manner, the HDR image data Ib is generated.

In the present modification example, the imaging element 10 is configured to obtain phase difference data in two directions from the pixel data Sig in two rows×two columns corresponding to the monochromatic sensor pixel group P1. This makes it possible to determine the presence or absence of a phase difference and the presence or absence of a moving object in the two directions.

Modification Example D

In the foregoing embodiment and modification examples thereof, the pixel array section 110 is configured to obtain one phase difference data in one direction from the pixel data Sig in two rows×two columns corresponding to the monochromatic sensor pixel group P1. However, in the foregoing embodiment and modification examples thereof, the pixel array section 110 may be configured to obtain two phase difference data in one direction from the pixel data Sig in two rows×two columns corresponding to the monochromatic sensor pixel group P1.

FIG. 18 illustrates a configuration example of the pixel array section 110 according to the present modification example. In the present modification example, the pixel array section 110 is configured to obtain phase difference data in the vertical direction and the horizontal direction from each trichromatic sensor pixel group P2. At this time, in each trichromatic sensor pixel group P2, the monochromatic sensor pixel group P1 (monochromatic sensor pixel group Ph) corresponding to each of the color filters CFr and CFb has the same configuration as that of the monochromatic sensor pixel group P1 according to the foregoing embodiment. In each trichromatic sensor pixel group P2, the monochromatic sensor pixel group P1 corresponding to each of the color filters CFg (monochromatic sensor pixel group Pa and Pb) has a configuration different from that of the monochromatic sensor pixel group P1 according to the foregoing embodiment.

Specifically, in each monochromatic sensor pixel group Pb, exposure times of two sensor pixels 111 (photodiodes PD) are set to "short (Short)", and exposure times of the remaining two sensor pixels 111 (photodiodes PD) are set to "middle (Middle)". In other words, the system control circuit 124 controls exposure times of the plurality of sensor pixels 111 (photodiodes PD) to allow exposure times of two sensor pixels 111 (photodiodes PD), of the monochromatic sensor pixel group Pb, to be different from each other, and exposure times of two sensor pixels 111 (photodiodes PD) thereof to be the same as each other. In addition, in each monochromatic sensor pixel group Pb, two sensor pixels 111 (photodiodes PD) of which the exposure times are set to short (Short) are disposed in the upper tier and arranged in the horizontal direction, for example, as illustrated in FIG. 18. That is, in each monochromatic sensor pixel group Pb, the two sensor pixels 111 (photodiodes PD) of which the exposure times are the same as each other are disposed in the upper tier and arranged in the horizontal direction, for example, as illustrated in FIG. 18. In addition, in each monochromatic sensor pixel group Pb, two sensor pixels 111 (photodiodes PD) of which the exposure times are set to "middle (Middle)" are disposed in the lower tier and arranged in the horizontal direction, for example, as illustrated in FIG. 18. That is, in each monochromatic sensor pixel group Pb, the two sensor pixels 111 (photodiodes PD) of which the exposure times are the same as each other are disposed in the lower tier and arranged in the horizontal direction, for example, as illustrated in FIG. 18.

One pixel drive line ctlS of the two pixel drive lines ctlS assigned to the monochromatic sensor pixel group Pb is coupled to the upper left sensor pixel 111 of the monochromatic sensor pixel group Pb, and the other pixel drive line ctlS is coupled to the upper right sensor pixel 111 of the monochromatic sensor pixel group Pb. One pixel drive line ctlM of the two pixel drive lines ctlM assigned to the monochromatic sensor pixel group Pb is coupled to the lower left sensor pixel 111 of the monochromatic sensor pixel group Pb, and the other pixel drive line ctlM thereof is coupled to the lower right sensor pixel 111 of the monochromatic sensor pixel group Pb.

At this time, the pixel array section 110 includes the two pixel drive lines ctlS at a location corresponding to the upper tier of each monochromatic sensor pixel group Pb, and includes the two pixel drive lines ctlM at a location corresponding to the lower tier of each monochromatic sensor pixel group Pb. Here, in a case where an exposure time of one sensor pixel 111 (photodiode PD) included in the upper tier of the monochromatic sensor pixel group Ph disposed on the right adjacent or on the left adjacent to the monochromatic sensor pixel group Pb is set to "long (Long)", the pixel array section 110 further includes the pixel drive line ctlL at a location corresponding to the upper tier of each monochromatic sensor pixel group Pb. In addition, in a case where an exposure time of one sensor pixel 111 (photodiode PD) included in the lower tier of the monochromatic sensor pixel group Ph disposed on the right adjacent or on the left adjacent to the monochromatic sensor pixel group Pb is set to "long (Long)", the pixel array section 110 further includes the pixel drive line ctlL at a location corresponding to the lower tier of each monochromatic sensor pixel group Pb.

It is to be noted that, in each monochromatic sensor pixel group Pb, the exposure times of the two sensor pixels 111 (photodiodes PD) in the lower tier may be set to "short (Short)", and the exposure times of the two sensor pixels 111 (photodiodes PD) in the upper tier may be set to "middle (Middle)".

In addition, in each monochromatic sensor pixel group Pa, exposure times of two sensor pixels 111 (photodiodes PD) are set to "long (Long)", and exposure times of the remaining two sensor pixels 111 (photodiodes PD) are set to "middle (Middle)". In other words, the system control circuit 124 controls exposure times of the plurality of sensor pixels 111 (photodiodes PD) to allow exposure times of two sensor pixels 111 (photodiodes PD), of the monochromatic sensor pixel group Pa, to be different from each other, and exposure times of two sensor pixels 111 (photodiodes PD) thereof to be the same as each other. In addition, in each monochromatic sensor pixel group Pa, two sensor pixels 111 (photodiodes PD) of which the exposure times are set to long (Long) are disposed on the left side and arranged in the vertical direction, for example, as illustrated in FIG. 18. That is, in each monochromatic sensor pixel group Pa, the two sensor pixels 111 (photodiodes PD) of which the exposure times are the same as each other are disposed on the left side and arranged in the vertical direction, for example, as illustrated in FIG. 18. In addition, in each monochromatic sensor pixel group Pa, two sensor pixels 111 (photodiodes PD) of which the exposure times are set to "middle (Middle)" are disposed on the right side and arranged in the vertical direction, for example, as illustrated in FIG. 18. That is, in each monochromatic sensor pixel group Pa, the two sensor pixels 111 (photodiodes PD) of which the exposure times are the same as each other are disposed on the right side and arranged in the vertical direction, for example, as illustrated in FIG. 18.

At this time, the pixel array section 110 includes the pixel drive line ctlL and the pixel drive line ctlM at a location corresponding to the upper tier of each monochromatic sensor pixel group Pa. In addition, the pixel array section 110 includes the pixel drive line ctlL and the pixel drive line ctlM at a location corresponding to the lower tier of each monochromatic sensor pixel group Pa. Here, in a case where an exposure time of one sensor pixel 111 (photodiode PD) included in the lower tier of the monochromatic sensor pixel group Ph disposed on the right adjacent or on the left adjacent to the monochromatic sensor pixel group Pa is set to "short (Short)", the pixel array section 110 further includes the pixel drive line ctlS at a location corresponding to the lower tier of each monochromatic sensor pixel group Pa. In addition, in a case where an exposure time of one sensor pixel 111 (photodiode PD) included in the upper tier of the monochromatic sensor pixel group Ph disposed on the right adjacent or on the left adjacent to the monochromatic sensor pixel group Pa is set to "short (Short)", the pixel array section 110 further includes the pixel drive line ctlS at a location corresponding to the upper tier of each monochromatic sensor pixel group Pa.

It is to be noted that, in each monochromatic sensor pixel group Pa, the exposure times of the two sensor pixels 111 (photodiodes PD) on the right side may be set to "long (Long)", and the exposure times of the two sensor pixels 111 (photodiodes PD) on the left side may be set to "middle (Middle)".

In the present modification example, the image data Ia includes the pixel data Sig in X rows×Y columns corresponding to the sensor pixels 111 in X rows×Y columns in the pixel array section 110. The pixel data Sig in two rows×two columns corresponding to the monochromatic sensor pixel group Ph, of the pixel data Sig in X rows×Y columns, includes two pixel data Sig1 corresponding to the two sensor pixels 111 of which the exposure times are set to "middle (Middle)", one pixel data Sig2 corresponding to the sensor pixel 111 of which the exposure time is set to "short (Short)", and one pixel data Sig3 corresponding to the sensor pixel 111 of which the exposure time is set to "long (Long)". In addition, the pixel data Sig in two rows×two columns corresponding to the monochromatic sensor pixel group Pa, of the pixel data Sig in X rows×Y columns, includes two pixel data Sig1 corresponding to the two sensor pixels 111 of which the exposure times are set to "middle (Middle)", and one pixel data Sig2 corresponding to the two sensor pixels 111 of which the exposure times are set to "short (Short)". In addition, the pixel data Sig in two rows×two columns corresponding to the monochromatic sensor pixel group Pb, of the pixel data Sig in X rows×Y columns, includes two pixel data Sig1 corresponding to the two sensor pixels 111 of which the exposure times are set to "middle (Middle)", and one pixel data Sig3 corresponding to the two sensor pixels 111 of which the exposure times are set to "long (Long)".

Next, description is given of the arithmetic circuit 20 of the present modification example.

FIG. 19 illustrates an example of a signal processing procedure in the arithmetic circuit 20 of the present modification example. The arithmetic circuit 20 generates the HDR image data Ib on the basis of the image data Ia obtained by the imaging element 10. The arithmetic circuit 20 first decomposes the image data Ia for each exposure time (step S501). Specifically, the arithmetic circuit 20 decomposes the image data Ia into data (image data Im) of which the exposure time is "middle (Middle)", data (image data Il) of which the exposure time is "long (Long)", and data (image data Is) of which the exposure time is "short (Short)".

Next, the arithmetic circuit 20 generates phase difference data Pd31 and Pd32 on the basis of the image data Im (Step S502). Specifically, the arithmetic circuit 20 derives, in the image data Im, a difference value between the two pixel data Sig1 corresponding to each monochromatic sensor pixel group Pa, and generates the phase difference data Pd31 in a first direction (horizontal direction) on the light-receiving surface 110A from the derived difference value. In addition, the arithmetic circuit 20 derives, in the image data Im, a difference value between the two pixel data Sig1 corresponding to each monochromatic sensor pixel group Pb, and generates the phase difference data Pd32 in a second direction (vertical direction) on the light-receiving surface 110A from the derived difference value.

In addition, the arithmetic circuit 20 generates phase difference data Pd33 on the basis of the image data Is (step S502). Specifically, the arithmetic circuit 20 derives, in the image data Is, a difference value between the two pixel data Sig2 corresponding to each monochromatic sensor pixel group Pa, and generates the phase difference data Pd33 in the first direction (horizontal direction) on the light-receiving surface 110A from the derived difference value. In addition, phase difference data Pd34 is generated on the basis of the image data Il (step S502). Specifically, the arithmetic circuit 20 derives, in the image data Il, a difference value between the two pixel data Sig3 corresponding to each monochromatic sensor pixel group Pb, and generates the phase difference data Pd34 in the second direction (vertical direction) on the light-receiving surface 110A from the derived difference value.

In addition, the arithmetic circuit 20 generates phase difference data Pd35 on the basis of the image data Il and Im (step S502). Specifically, the arithmetic circuit 20 derives a difference value between the image data Il and the image data Im' obtained by multiplying the image data Im by an exposure time ratio between the exposure time "long (Long)" and the exposure time "middle (Middle)", and generates the phase difference data Pd35 from the derived difference value. In addition, the arithmetic circuit 20 generates phase difference data Pd36 on the basis of the image data Im and Is (step S502). Specifically, the arithmetic circuit 20 derives a difference value between the image data Im and the image data Is' obtained by multiplying the image data Is by an exposure time ratio between the exposure time "middle (Middle)" and the exposure time "short (Short)", and generates the phase difference data Pd36 from the derived difference value.

Next, the arithmetic circuit 20 generates the level data Da for a phase difference on the basis of the phase difference data Pd31, Pd32, Pd33, and Pd34 (step S503). The level data Da is, for example, data represented by values within a range from the lower limit value (e.g., zero bit) to the upper limit value (e.g., 128 bits). For example, in the phase difference data Pd31, Pd32, Pd33, and Pd34, the arithmetic circuit 20 converts a numerical value falling below a predetermined range into the lower limit value (e.g., zero bit). For example, in the phase difference data Pd31, Pd32, Pd33, and Pd34, the arithmetic circuit 20 converts a numerical value exceeding the predetermined range into the upper limit value (e.g., 128 bits). For example, in the phase difference data Pd31, Pd32, Pd33, and Pd34, the arithmetic circuit 20 converts a numerical value within the predetermined range into a value within a range from one bit to 127 bits in accordance with magnitude of the numerical value.

Next, the arithmetic circuit 20 converts the phase difference data Pd35 and Pd36 into the level data Db on a moving object (step S504). The level data Db is, for example, data represented by values within a range from the lower limit value (e.g., zero bit) to the upper limit value (e.g., 128 bits). Specifically, the arithmetic circuit 20 generates the level data Db on the basis of data (noise data) on a noise level of the imaging element 10 and the phase difference data Pd35 and Pd36.

Next, the arithmetic circuit 20 detects a location having a large phase difference from the obtained level data Da (step S505). Further, the arithmetic circuit 20 detects presence or absence of a moving object from the obtained level data Db (step S506). Finally, the arithmetic circuit 20 generates the HDR image data Ib from the image data Im, Il, and Is, presence or absence of a phase difference, and the presence or absence of a moving object (step S507). In this manner, the HDR image data Ib is generated.

In the present modification example, the pixel array section 110 is configured to obtain two phase difference data in the first direction from the pixel data Sig in two rows×two columns corresponding to the monochromatic sensor pixel group Pa, and is configured to obtain two phase difference data in the second direction from the pixel data Sig in two rows×two columns corresponding to the monochromatic sensor pixel group Pb. This makes it possible to determine the presence or absence of a phase difference and the presence or absence of a moving object in the two directions.

Modification Example E

In the foregoing Modification Example B, the pixel array section 110 is configured to obtain phase difference data in four directions from the pixel data Sig in eight rows×eight columns corresponding to each trichromatic sensor pixel group P3. However, in the foregoing embodiment, the pixel array section 110 may be configured to obtain phase the difference data in four directions from the pixel data Sig in two rows×two columns corresponding to one monochromatic sensor pixel group Pa of each trichromatic sensor pixel group P3.

FIG. 20 illustrates a configuration example of the pixel array section 110 according to the present modification example. In the present modification example, the pixel array section 110 is configured to obtain phase difference data in the right upward direction, the right downward direction, the horizontal direction, and the vertical direction, from the pixel data Sig in two rows×two columns corresponding to one monochromatic sensor pixel group P1 (hereinafter, a "monochromatic sensor pixel group Pi") of each trichromatic sensor pixel group P3. The monochromatic sensor pixel group Pi is the monochromatic sensor pixel group P1 corresponding to the color filter CFg. At this time, in each trichromatic sensor pixel group P3, each monochromatic sensor pixel group P1 except for the monochromatic sensor pixel group Pi has the same configuration as that of the monochromatic sensor pixel group P1 according to the foregoing embodiment. Meanwhile, each monochromatic sensor pixel group Pi has a configuration different from that of the monochromatic sensor pixel group P1 according to the foregoing embodiment. Specifically, in each monochromatic sensor pixel group Pi, exposure times of four sensor pixels 111 (photodiodes PD) are set to "middle (Middle)". In other words, the system control circuit 124 controls exposure times of the plurality of sensor pixels 111 (photodiodes PD) to allow, in the monochromatic sensor pixel group Pi included in each trichromatic sensor pixel group P3, exposure times of the respective sensor pixels 111 (photodiodes PD) to be the same as one another.

One pixel drive line ctlM of the two pixel drive lines ctlM assigned to the monochromatic sensor pixel group Pi is coupled to the two sensor pixels 111 in the upper tier of the monochromatic sensor pixel group Pi, and the other pixel drive line ctlM thereof is coupled to the two sensor pixels 111 in the lower tier of the monochromatic sensor pixel group Pi.

Here, in a case where an exposure time of one sensor pixel 111 (photodiode PD) included in the upper tier of the monochromatic sensor pixel group P1 disposed on the right adjacent or on the left adjacent to the monochromatic sensor pixel group Pi is set to "long (Long)", the pixel array section 110 further includes the pixel drive line ctlL at a location corresponding to the upper tier of each monochromatic sensor pixel group Pi. In addition, in a case where an exposure time of one sensor pixel 111 (photodiode PD) included in the upper tier of the monochromatic sensor pixel group P1 disposed on the right adjacent or on the left adjacent to the monochromatic sensor pixel group Pi is set to "short (Short)", the pixel array section 110 further includes the pixel drive line ctlS at a location corresponding to the upper tier of each monochromatic sensor pixel group Pi. In addition, in a case where an exposure time of one sensor pixel 111 (photodiode PD) included in the lower tier of the monochromatic sensor pixel group P1 disposed on the right adjacent or on the left adjacent to the monochromatic sensor pixel group Pi is set to "short (Short)", the pixel array section 110 further includes the pixel drive line ctlS at a location corresponding to the lower tier of each monochromatic sensor pixel group Pi. In addition, in a case where an exposure time of one sensor pixel 111 (photodiode PD) included in the lower tier of the monochromatic sensor pixel group P1 disposed on the right adjacent or on the left adjacent to the monochromatic sensor pixel group Pi is set to "long (Long)", the pixel array section 110 further includes the pixel drive line ctlL at a location corresponding to the lower tier of each monochromatic sensor pixel group Pi.

In the present modification example, the image data Ia includes the pixel data Sig in X rows×Y columns corresponding to the sensor pixels 111 in X rows×Y columns in the pixel array section 110. The pixel data Sig in two rows×two columns corresponding to each monochromatic sensor pixel group P1 except for the monochromatic sensor pixel group Pd, of the pixel data Sig in X rows×Y columns, includes two pixel data Sig1 corresponding to the two sensor pixels 111 of which the exposure times are set to "middle (Middle)", one pixel data Sig2 corresponding to the sensor pixel 111 of which the exposure time is set to "short (Short)", and one pixel data Sig3 corresponding to the sensor pixel 111 of which the exposure time is set to "long (Long)". In addition, the pixel data Sig in two rows×two columns corresponding to the monochromatic sensor pixel group Pd, of the pixel data Sig in X rows×Y columns, includes four pixel data Sig1 corresponding to the four sensor pixels 111 of which the exposure times are set to "middle (Middle)".

Next, description is given of the arithmetic circuit 20 of the present modification example.

FIG. 21 illustrates an example of a signal processing procedure in the arithmetic circuit 20 of the present modification example. The arithmetic circuit 20 generates the HDR image data Ib on the basis of the image data Ia obtained by the imaging element 10. The arithmetic circuit 20 first decomposes the image data Ia for each exposure time (step S601). Specifically, the arithmetic circuit 20 decomposes the image data Ia into data (image data Im) of which the exposure time is "middle (Middle)", data (image data Il) of which the exposure time is "long (Long)", and data (image data Is) of which the exposure time is "short (Short)".

Next, the arithmetic circuit 20 generates phase difference data Pd41, Pd42, Pd43, and Pd44 on the basis of the image data Im (Step S602). Specifically, the arithmetic circuit 20 derives, in the image data Im, a difference value between the two pixel data Sig1, which are the two pixel data Sig1 corresponding to each monochromatic sensor pixel group Pi and are arranged in the right upward direction, and generates the phase difference data Pd41 in the first direction (right upward direction) on the light-receiving surface 110A from the derived difference value. In addition, the arithmetic circuit 20 derives, in the image data Im, a difference value between the two pixel data Sig1, which are the two pixel data Sig1 corresponding to each monochromatic sensor pixel group Pi and are arranged in the right downward direction, and generates the phase difference data Pd42 in the second direction (right downward direction) on the light-receiving surface 110A from the derived difference value.

The arithmetic circuit 20 derives, in the image data Im, a difference value between the two pixel data Sig1 in the upper tier, which are the two pixel data Sig1 corresponding to each monochromatic sensor pixel group Pi and are arranged in the horizontal direction, and a difference value between the two pixel data Sig1 in the lower tier arranged in the horizontal direction, and generates the phase difference data Pd43 in the third direction (horizontal direction) on the light-receiving surface 110A from the derived difference value. In addition, the arithmetic circuit 20 derives, in the image data Im, a difference value between the two pixel data Sig1 on the left side, which are the two pixel data Sig1 corresponding to each monochromatic sensor pixel group Pi and are arranged in the vertical direction, and a difference value between the two pixel data Sig1 on the right side arranged in the vertical direction, and generates the phase difference data Pd44 in a fourth direction (vertical direction) on the light-receiving surface 110A from the derived difference value.

In addition, the arithmetic circuit 20 generates phase difference data Pd45 on the basis of the image data Il and Im (step S602). Specifically, the arithmetic circuit 20 derives a difference value between the image data Il and the image data Im' obtained by multiplying the image data Im by an exposure time ratio between the exposure time "long (Long)" and the exposure time "middle (Middle)", and generates the phase difference data Pd45 from the derived difference value. In addition, the arithmetic circuit 20 generates phase difference data Pd46 on the basis of the image data Im and Is (step S602). Specifically, the arithmetic circuit 20 derives a difference value between the image data Im and the image data Is' obtained by multiplying the image data Is by an exposure time ratio between the exposure time "middle (Middle)" and the exposure time "short (Short)", and generates the phase difference data Pd46 from the derived difference value.

Next, the arithmetic circuit 20 generates the level data Da for a phase difference on the basis of the phase difference data Pd41, Pd42, Pd43, and Pd44 (step S603). The level data Da is, for example, data represented by values within a range from the lower limit value (e.g., zero bit) to the upper limit value (e.g., 128 bits). For example, in the phase difference data Pd41, Pd42, Pd43, and Pd44, the arithmetic circuit 20 converts a numerical value falling below a predetermined range into the lower limit value (e.g., zero bit). For example, in the phase difference data Pd41, Pd42, Pd43, and Pd44, the arithmetic circuit 20 converts a numerical value exceeding the predetermined range into the upper limit value (e.g., 128 bits). For example, in the phase difference data Pd41, Pd42, Pd43, and Pd44, the arithmetic circuit 20 converts a numerical value within the predetermined range into a value within a range from one bit to 127 bits in accordance with magnitude of the numerical value.

Next, the arithmetic circuit 20 converts the phase difference data Pd45 and Pd46 into the level data Db on a moving object (step S604). The level data Db is, for example, data represented by values within a range from the lower limit value (e.g., zero bit) to the upper limit value (e.g., 128 bits). Specifically, the arithmetic circuit 20 generates the level data Db on the basis of data (noise data) on a noise level of the imaging element 10 and the phase difference data Pd45 and Pd46.

Next, the arithmetic circuit 20 detects a location having a large phase difference from the obtained level data Da (step S605). Further, the arithmetic circuit 20 detects presence or absence of a moving object from the obtained level data Db (step S606). Finally, the arithmetic circuit 20 generates the HDR image data Ib from the image data Im, Il, and Is, presence or absence of a phase difference, and the presence or absence of a moving object (step S607). In this manner, the HDR image data Ib is generated.

In the present modification example, the pixel array section 110 is configured to obtain phase difference data in the four directions from the pixel data Sig in two rows×two columns corresponding to one monochromatic sensor pixel group Pa of each trichromatic sensor pixel group P3. This makes it possible to determine the presence or absence of a phase difference and the presence or absence of a moving object in the four directions.

Modification Example F

In the foregoing Modification Example E, the pixel array section 110 is configured to obtain phase difference data in the four directions from the pixel data Sig in two rows×two columns corresponding to one monochromatic sensor pixel group Pa of each trichromatic sensor pixel group P3. However, in the foregoing Modification Example E, the pixel array section 110 may be configured to obtain phase difference data in the four directions from pixel data Sig in four rows×four columns corresponding to one trichromatic sensor pixel group P2 of each trichromatic sensor pixel group P3.

FIG. 22 illustrates a configuration example of the pixel array section 110 according to the present modification example. In the present modification example, the pixel array section 110 is configured to obtain phase difference data in the right upward direction, the right downward direction, the horizontal direction, and the vertical direction, from the pixel data Sig in four rows×four columns corresponding to one trichromatic sensor pixel group P2 (hereinafter, a "trichromatic sensor pixel group Pj") of each trichromatic sensor pixel group P3. In each trichromatic sensor pixel group P3, each monochromatic sensor pixel group P1 included in each trichromatic sensor pixel group P2 except for the trichromatic sensor pixel group Pj has the same configuration as that of the monochromatic sensor pixel group P1 according to the foregoing embodiment.

Meanwhile, each trichromatic sensor pixel group Pj has a configuration different from that of the trichromatic sensor pixel group P2 according to the foregoing embodiment. Specifically, in each monochromatic sensor pixel group P1 of each trichromatic sensor pixel group Pj, exposure times of four sensor pixels 111 (photodiodes PD) are set to "middle (Middle)". In other words, the system control circuit 124 controls exposure times of the plurality of sensor pixels 111 (photodiodes PD) to allow, in each monochromatic sensor pixel group P1 of the trichromatic sensor pixel group Pj included in each trichromatic sensor pixel group P3, exposure times of the respective sensor pixels 111 (photodiodes PD) to be the same as one another.

One pixel drive line ctlM of the two pixel drive lines ctlM assigned to the monochromatic sensor pixel group P1 in the upper tier of the trichromatic sensor pixel group Pj is coupled to the two sensor pixels 111 in the upper tier of the monochromatic sensor pixel group P1, and the other pixel drive line ctlM thereof is coupled to the two sensor pixels 111 in the lower tier of the monochromatic sensor pixel group P1.

Here, in a case where an exposure time of one sensor pixel 111 (photodiode PD) included in the upper tier of the monochromatic sensor pixel group P1 disposed on the right adjacent or on the left adjacent to the upper tier of the trichromatic sensor pixel group Pj is set to "long (Long)", the pixel array section 110 further includes the pixel drive line ctlL at a location corresponding to the sensor pixel 111 (photodiode PD) in the upper tier of the monochromatic sensor pixel group P1 in the upper tier of each trichromatic sensor pixel group Pj. In addition, in a case where an exposure time of one sensor pixel 111 (photodiode PD) included in the upper tier of the monochromatic sensor pixel group P1 disposed on the right adjacent or on the left adjacent to the upper tier of the trichromatic sensor pixel group Pj is set to "short (Short)", the pixel array section 110 further includes the pixel drive line ctlS at a location corresponding to the sensor pixel 111 (photodiode PD) in the upper tier of the monochromatic sensor pixel group P1 in the upper tier of each trichromatic sensor pixel group Pj.

In addition, in a case where an exposure time of one sensor pixel 111 (photodiode PD) included in the lower tier of the monochromatic sensor pixel group P1 disposed on the right adjacent or on the left adjacent to the upper tier of the trichromatic sensor pixel group Pj is set to "long (Long)", the pixel array section 110 further includes the pixel drive line ctlL at a location corresponding to the sensor pixel 111 (photodiode PD) in the lower tier of the monochromatic sensor pixel group P1 in the upper tier of each trichromatic sensor pixel group Pj. In addition, in a case where an exposure time of one sensor pixel 111 (photodiode PD) included in the lower tier of the monochromatic sensor pixel group P1 disposed on the right adjacent or on the left adjacent to the upper tier of the trichromatic sensor pixel group Pj is set to "short (Short)", the pixel array section 110 further includes the pixel drive line ctlS at a location corresponding to the sensor pixel 111 (photodiode PD) in the lower tier of the monochromatic sensor pixel group P1 in the upper tier of each trichromatic sensor pixel group Pj.

In addition, in a case where an exposure time of one sensor pixel 111 (photodiode PD) included in the upper tier of the monochromatic sensor pixel group P1 disposed on the right adjacent or on the left adjacent to the lower tier of the trichromatic sensor pixel group Pj is set to "long (Long)", the pixel array section 110 further includes the pixel drive line ctlL at a location corresponding to the sensor pixel 111 (photodiode PD) in the upper tier of the monochromatic sensor pixel group P1 in the lower tier of each trichromatic sensor pixel group Pj. In addition, in a case where an exposure time of one sensor pixel 111 (photodiode PD) included in the upper tier of the monochromatic sensor pixel group P1 disposed on the right adjacent or on the left adjacent to the lower tier of the trichromatic sensor pixel group Pj is set to "short (Short)", the pixel array section 110 further includes the pixel drive line ctlS at a location corresponding to the sensor pixel 111 (photodiode PD) in the upper tier of the monochromatic sensor pixel group P1 in the lower tier of each trichromatic sensor pixel group Pj.

In addition, in a case where an exposure time of one sensor pixel 111 (photodiode PD) included in the lower tier of the monochromatic sensor pixel group P1 disposed on the right adjacent or on the left adjacent to the lower tier of the trichromatic sensor pixel group Pj is set to "long (Long)", the pixel array section 110 further includes the pixel drive line ctlL at a location corresponding to the sensor pixel 111 (photodiode PD) in the lower tier of the monochromatic sensor pixel group P1 in the lower tier of each trichromatic sensor pixel group Pj. In addition, in a case where an exposure time of one sensor pixel 111 (photodiode PD) included in the lower tier of the monochromatic sensor pixel group P1 disposed on the right adjacent or on the left adjacent to the lower tier of the trichromatic sensor pixel group Pj is set to "short (Short)", the pixel array section 110 further includes the pixel drive line ctlS at a location corresponding to the sensor pixel 111 (photodiode PD) in the lower tier of the monochromatic sensor pixel group P1 in the upper tier of each trichromatic sensor pixel group Pj.

In the present modification example, the image data Ia includes the pixel data Sig in X rows×Y columns corresponding to the sensor pixels 111 in X rows×Y columns in the pixel array section 110. The pixel data Sig in four rows×four columns corresponding to each monochromatic sensor pixel group P1 included in each trichromatic sensor pixel group P2 except for the trichromatic sensor pixel group Pe, of the pixel data Sig in X rows×Y columns, includes two pixel data Sig1 corresponding to the two sensor pixels 111 of which the exposure times are set to "middle (Middle)", one pixel data Sig2 corresponding to the sensor pixel 111 of which the exposure time is set to "short (Short)", and one pixel data Sig3 corresponding to the sensor pixel 111 of which the exposure time is set to "long (Long)". In addition, the pixel data Sig in two rows×two columns corresponding to each monochromatic sensor pixel group P1 included in the trichromatic sensor pixel group Pe, of the pixel data Sig in X rows×Y columns, includes four pixel data Sig1 corresponding to the four sensor pixels 111 of which the exposure times are set to "middle (Middle)".

Next, description is given of the arithmetic circuit 20 of the present modification example.

FIG. 23 illustrates an example of a signal processing procedure in the arithmetic circuit 20 of the present modification example. The arithmetic circuit 20 generates the HDR image data Ib on the basis of the image data Ia obtained by the imaging element 10. The arithmetic circuit 20 first decomposes the image data Ia for each exposure time (step S701). Specifically, the arithmetic circuit 20 decomposes the image data Ia into data (image data Im) of which the exposure time is "middle (Middle)", data (image data Il) of which the exposure time is "long (Long)", and data (image data Is) of which the exposure time is "short (Short)".

Next, the arithmetic circuit 20 generates phase difference data Pd51, Pd52, Pd53, and Pd54 on the basis of the image data Im (Step S702). Specifically, the arithmetic circuit 20 derives, in the image data Im, a difference value between the two pixel data Sig1, which are the two pixel data Sig1 corresponding to each monochromatic sensor pixel group P1 included in the trichromatic sensor pixel group Pe and are arranged in the right upward direction, and generates the phase difference data Pd51 in the first direction (right upward direction) on the light-receiving surface 110A from the derived difference value. In addition, the arithmetic circuit 20 derives, in the image data Im, a difference value between the two pixel data Sig1, which are the two pixel data Sig1 corresponding to each monochromatic sensor pixel group P1 included in the trichromatic sensor pixel group Pe and are arranged in the right downward direction, and generates the phase difference data Pd52 in the second direction (right downward direction) on the light-receiving surface 110A from the derived difference value.

In addition, the arithmetic circuit 20 derives, in the image data Im, a difference value between the two pixel data Sig1 in the upper tier, which are the two pixel data Sig1 corresponding to each monochromatic sensor pixel group P1 included in the trichromatic sensor pixel group Pe and are arranged in the horizontal direction, and a difference value between the two pixel data Sig1 in the lower tier arranged in the horizontal direction, and generates the phase difference data Pd53 in the third direction (horizontal direction) on the light-receiving surface 110A from the derived difference value. In addition, the arithmetic circuit 20 derives, in the image data Im, a difference value between the two pixel data Sig1 on the left side, which are the two pixel data Sig1 corresponding to each monochromatic sensor pixel group P1 included in the trichromatic sensor pixel group Pe and are arranged in the vertical direction, and a difference value between the two pixel data Sig1 on the right side arranged in the vertical direction, and generates the phase difference data Pd54 in the fourth direction (vertical direction) on the light-receiving surface 110A from the derived difference value.

In addition, the arithmetic circuit 20 generates phase difference data Pd55 on the basis of the image data Il and Im (step S702). Specifically, the arithmetic circuit 20 derives a difference value between the image data Il and the image data Im' obtained by multiplying the image data Im by an exposure time ratio between the exposure time "long (Long)" and the exposure time "middle (Middle)", and generates the phase difference data Pd55 from the derived difference value. In addition, the arithmetic circuit 20 generates phase difference data Pd56 on the basis of the image data Im and Is (step S702). Specifically, the arithmetic circuit 20 derives a difference value between the image data Im and the image data Is' obtained by multiplying the image data Is by an exposure time ratio between the exposure time "middle (Middle)" and the exposure time "short (Short)", and generates the phase difference data Pd56 from the derived difference value.

Next, the arithmetic circuit 20 generates the level data Da for a phase difference on the basis of the phase difference data Pd51, Pd52, Pd53, and Pd54 (step S703). The level data Dais, for example, data represented by values within a range from the lower limit value (e.g., zero bit) to the upper limit value (e.g., 128 bits). For example, in the phase difference data Pd51, Pd52, Pd53, and Pd54, the arithmetic circuit 20 converts a numerical value falling below a predetermined range into the lower limit value (e.g., zero bit). For example, in the phase difference data Pd51, Pd52, Pd53, and Pd54, the arithmetic circuit 20 converts a numerical value exceeding the predetermined range into the upper limit value (e.g., 128 bits). For example, in the phase difference data Pd51, Pd52, Pd53, and Pd54, the arithmetic circuit 20 converts a numerical value within the predetermined range into a value within a range from one bit to 127 bits in accordance with magnitude of the numerical value.

Next, the arithmetic circuit 20 converts the phase difference data Pd55 and Pd56 into the level data Db on a moving object (step S704). The level data Db is, for example, data represented by values within a range from the lower limit value (e.g., zero bit) to the upper limit value (e.g., 128 bits). Specifically, the arithmetic circuit 20 generates the level data Db on the basis of data (noise data) on a noise level of the imaging element 10 and the phase difference data Pd55 and Pd56.

Next, the arithmetic circuit 20 detects a location having a large phase difference from the obtained level data Da (step S705). Further, the arithmetic circuit 20 detects presence or absence of a moving object from the obtained level data Db (step S706). Finally, the arithmetic circuit 20 generates the HDR image data Ib from the image data Im, Il, and Is, presence or absence of a phase difference, and the presence or absence of a moving object (step S707). In this manner, the HDR image data Ib is generated.

In the present modification example, the pixel array section 110 is configured to obtain phase difference data in the four directions from the pixel data Sig in four rows×four columns corresponding to one trichromatic sensor pixel group P2 of each trichromatic sensor pixel group P3. This makes it possible to determine the presence or absence of a phase difference and the presence or absence of a moving object in the four directions.

Modification Example G

In the foregoing Modification Example F, the pixel array section 110 is configured to obtain phase difference data in the four directions from the pixel data Sig in four rows×four columns corresponding to one trichromatic sensor pixel group P2 of each trichromatic sensor pixel group P3. However, in the foregoing Modification Example F, the pixel array section 110 may be configured to obtain phase difference data in the four directions from pixel data Sig in two rows×two columns corresponding to each monochromatic sensor pixel group P1.

FIG. 24 illustrates a configuration example of the pixel array section 110 according to the present modification example. FIG. 25 illustrates an example of a wiring layout of the pixel array section 110 of FIG. 24. FIG. 26 illustrates an example of directions of phase differences detectable in the pixel array section 110 of FIG. 24.

In the present modification example, the pixel array section 110 is configured to obtain phase difference data in the right upward direction, the vertical direction, and the horizontal direction, for example, for each n-th frame (n is an integer of two or more), from each monochromatic sensor pixel group P1. At this time, in each monochromatic sensor pixel group P1, exposure times of the four sensor pixels 111 (photodiodes PD) are set to "middle (Middle)". In other words, the system control circuit 124 controls exposure times of the plurality of sensor pixels 111 (photodiodes PD) to allow, in each monochromatic sensor pixel group P1, exposure times of the respective sensor pixels 111 (photodiodes PD) to be the same as one another.

In the present modification example, for example, the pixel array section 110 is further configured to obtain the image data Ia including image data of three types of exposure times, in each frame other than n×k frames (n is an integer of two or more, and k is an integer of one or more).

As illustrated in FIG. 27, for example, the pixel array section 110 further has a configuration similar to that of the pixel array section 110 according to the foregoing embodiment, in each frame other than the n×k frames (n is an integer of two or more, and k is an integer of one or more). At this time, in each monochromatic sensor pixel group P1, exposure times of two sensor pixels 111 (photodiodes PD) are set to "middle (Middle)", an exposure time of one of the remaining two sensor pixels 111 (photodiodes PD) is set to "short (Short)", and an exposure time of the remaining one is set to "long (Long)".

At this time, as illustrated in FIGS. 25 and 28, for example, the pixel array section 110 includes the pixel drive line ctlL and the pixel drive line ctlM at a location corresponding to the upper tier of each monochromatic sensor pixel group P1. In addition, the pixel array section 110 includes the pixel drive line ctlM and the pixel drive line ctlS at a location corresponding to the lower tier of each monochromatic sensor pixel group P1.

It is to be noted that, in the present modification example, when obtaining the image data Ia for each n-th frame, the system control circuit 124 uses the pixel drive line ctlL and the pixel drive line ctlM provided at a location corresponding to the upper tier of each monochromatic sensor pixel group P1 in order to perform exposure control to set exposure times of the sensor pixels 111 (photo diodes PD) in the upper tier of each monochromatic sensor pixel group P1 to "middle (Middle)". In addition, in the present modification example, when obtaining the image data Ia for each n-th frame, the system control circuit 124 uses the pixel drive line ctlM and the pixel drive line ctlS provided at a location corresponding to the lower tier of each monochromatic sensor pixel group P1 in order to perform exposure control to set exposure times of the sensor pixels 111 (photo diodes PD) in the lower tier of each monochromatic sensor pixel group P1 to "middle (Middle)".

In the present modification example, image data Ia1 obtained for each n-th frame includes the pixel data Sig in X rows×Y columns corresponding to the sensor pixels 111 in X rows×Y columns in the pixel array section 110. The pixel data Sig in four rows×four columns corresponding to each monochromatic sensor pixel group P1, of the pixel data Sig in X rows×Y columns, includes four pixel data Sig1 corresponding to the four sensor pixels 111 of which the exposure times are set to "middle (Middle)".

Further, in the present modification example, image data Ia2 obtained in each frame other than the n×k frames (n is an integer of two or more, and k is an integer of one or more) includes the pixel data Sig in X rows×Y columns corresponding to the sensor pixels 111 in X rows×Y columns in the pixel array section 110. The pixel data Sig in four rows×four columns corresponding to each monochromatic sensor pixel group P1, of the pixel data Sig in X rows×Y columns, includes, for example, two pixel data Sig1 corresponding to the two sensor pixels 111 of which the exposure times are set to "middle (Middle)", one pixel data Sig2 corresponding to the sensor pixel 111 of which the exposure time is set to "short (Short)", and one pixel data Sig3 corresponding to the sensor pixel 111 of which the exposure time is set to "long (Long)".

Next, description is given of the arithmetic circuit 20 of the present modification example.

FIG. 29 illustrates an example of a signal processing procedure in the arithmetic circuit 20 of the present modification example. The arithmetic circuit 20 generates the HDR image data Ib on the basis of the image data Ia1 and Ia2 obtained by the imaging element 10. The arithmetic circuit 20 first decomposes the obtained image data Ia2 for each exposure time (step S801). Specifically, the arithmetic circuit 20 decomposes the image data Ia2 into data (image data Im2) of which the exposure time is "middle (Middle)", data (image data Il2) of which the exposure time is "long (Long)", and data (image data Is2) of which the exposure time is "short (Short)". Subsequently, the arithmetic circuit 20 decomposes the obtained image data Ia1 for each exposure time (step S801). Specifically, the arithmetic circuit 20 decomposes the image data Ia1 into data (image data Im1) of which the exposure time is "middle (Middle)", data (image data Il1) of which the exposure time is "long (Long)", and data (image data Is1) of which the exposure time is "short (Short)".

Next, the arithmetic circuit 20 generates phase difference data Pd61, Pd62, Pd63, and Pd64 on the basis of the image data Im1 (Step S802). Specifically, the arithmetic circuit 20 derives, in the image data Im1, a difference value between the two pixel data Sig1, which are the two pixel data Sig1 corresponding to each monochromatic sensor pixel group P1 and are arranged in the right upward direction, and generates the phase difference data Pd61 in the first direction (right upward direction) on the light-receiving surface 110A from the derived difference value. In addition, the arithmetic circuit 20 derives, in the image data Im1, a difference value between the two pixel data Sig1, which are the two pixel data Sig1 corresponding to each monochromatic sensor pixel group P1 and are arranged in the right downward direction, and generates the phase difference data Pd62 in the second direction (right downward direction) on the light-receiving surface 110A from the derived difference value.

In addition, the arithmetic circuit 20 derives, in the image data Im1, a difference value between the two pixel data Sig1 in the upper tier, which are the two pixel data Sig1 corresponding to each monochromatic sensor pixel group P1 and are arranged in the horizontal direction, and a difference value between the two pixel data Sig1 in the lower tier arranged in the horizontal direction, and generates the phase difference data Pd63 in the third direction (horizontal direction) on the light-receiving surface 110A from the derived difference value. In addition, the arithmetic circuit 20 derives, in the image data Im1, a difference value between the two pixel data Sig1 on the left side, which are the two pixel data Sig1 corresponding to each monochromatic sensor pixel group P1 and are arranged in the vertical direction, and a difference value between the two pixel data Sig1 on the right side arranged in the vertical direction, and generates the phase difference data Pd64 in the fourth direction (vertical direction) on the light-receiving surface 110A from the derived difference value.

In addition, the arithmetic circuit 20 generates phase difference data Pd65 on the basis of the image data Il1 and Im1 (step S802). Specifically, the arithmetic circuit 20 derives a difference value between the image data Il1 and image data Im1' obtained by multiplying the image data Im1 by an exposure time ratio between the exposure time "long (Long)" and the exposure time "middle (Middle)", and generates the phase difference data Pd65 from the derived difference value. In addition, the arithmetic circuit 20 generates phase difference data Pd66 on the basis of the image data Im1 and Is1 (step S802). Specifically, the arithmetic circuit 20 derives a difference value between the image data Im1 and image data Is1' obtained by multiplying the image data Is1 by an exposure time ratio between the exposure time "middle (Middle)" and the exposure time "short (Short)", and generates the phase difference data Pd66 from the derived difference value.

Next, the arithmetic circuit 20 generates the level data Da for a phase difference on the basis of the phase difference data Pd61, Pd62, Pd63, and Pd64 (step S803). The level data Da is, for example, data represented by values within a range from the lower limit value (e.g., zero bit) to the upper limit value (e.g., 128 bits). For example, in the phase difference data Pd61, Pd62, Pd63, and Pd64, the arithmetic circuit 20 converts a numerical value falling below a predetermined range into the lower limit value (e.g., zero bit). For example, in the phase difference data Pd61, Pd62, Pd63, and Pd64, the arithmetic circuit 20 converts a numerical value exceeding the predetermined range into the upper limit value (e.g., 128 bits). For example, in the phase difference data Pd61, Pd62, Pd63, and Pd64, the arithmetic circuit 20 converts a numerical value within the predetermined range into a value within a range from one bit to 127 bits in accordance with magnitude of the numerical value.

Next, the arithmetic circuit 20 converts the phase difference data Pd65 and Pd66 into the level data Db on a moving object (step S804). The level data Db is, for example, data represented by values within a range from the lower limit value (e.g., zero bit) to the upper limit value (e.g., 128 bits). Specifically, the arithmetic circuit 20 generates the level data Db on the basis of data (noise data) on a noise level of the imaging element 10 and the phase difference data Pd65 and Pd66.

Next, the arithmetic circuit 20 detects a location having a large phase difference from the obtained level data Da (step S805). Further, the arithmetic circuit 20 detects presence or absence of a moving object from the obtained level data Db (step S806). Finally, the arithmetic circuit 20 generates the HDR image data Ib from the image data Im2, Il2, and Is2, presence or absence of a phase difference, and the presence or absence of a moving object (step S807). In this manner, the HDR image data Ib is generated.

In the present modification example, the pixel array section 110 is configured to obtain phase difference data in the four directions, for example, for each n-th frame from each monochromatic sensor pixel group P1. In the present modification example, the HDR image Ib is further generated on the basis of the image data image Ia1 obtained for each n-th frame and the image data image Ia1 obtained in each frame other than the n×k frames. This makes it possible to determine the presence or absence of a phase difference and the presence or absence of a moving object in the four directions.

Modification Example H

In the foregoing Modification Examples A, B, C, D, and E, the pixel array section 110 is configured to obtain phase difference data on the basis of monochromatic image data. However, in the foregoing embodiment, the pixel array section 110 may be configured to obtain phase difference data for each color on the basis of full-color image data.

FIG. 30 illustrates a configuration example of the pixel array section 110 according to the present modification example. FIG. 31 illustrates an example of a wiring layout of the pixel array section 110 of FIG. 30. FIG. 32 illustrates an example of directions of phase differences detectable in the pixel array section 110 of FIG. 30.

In the present modification example, the pixel array section 110 is configured to obtain phase difference data in two directions for each color from two trichromatic sensor pixel groups P2 arranged in the row direction (hereinafter, referred to as a "trichromatic sensor pixel group P4"). Specifically, the pixel array section 110 is configured to obtain phase difference data in the right upward direction and the right downward direction for each color from the trichromatic sensor pixel group P4. At this time, in one trichromatic sensor image group P2 included in each trichromatic sensor pixel group P4, each monochromatic sensor pixel group P1 is configured to obtain phase difference data in the right upward direction. In the other trichromatic sensor image group P2 included in each trichromatic sensor pixel group P4, each monochromatic sensor pixel group P1 is configured to obtain phase difference data in the right downward direction.

Specifically, in each monochromatic sensor pixel group P1 of one trichromatic sensor image group P2 included in each trichromatic sensor pixel group P4, exposure times of two sensor pixels 111 (photodiodes PD) arranged in the right upward direction are set to "middle (Middle)" as illustrated in FIG. 30. In addition, in each monochromatic sensor pixel group P1 of one trichromatic sensor image group P2 included in each trichromatic sensor pixel group P4, an exposure time of the lower right sensor pixel 111 (photodiode PD) is set to "short (Short)" as illustrated in FIG. 30. In addition, in each monochromatic sensor pixel group P1 of one trichromatic sensor image group P2 included in each trichromatic sensor pixel group P4, an exposure time of the upper left sensor pixel 111 (photodiode PD) is set to "long (Long)" as illustrated in FIG. 30. In other words, the system control circuit 124 controls exposure times of the plurality of sensor pixels 111 (photodiodes PD) to allow exposure times of two sensor pixels 111 (photodiodes PD), of each monochromatic sensor pixel group P1 of one trichromatic sensor image group P2 included in each trichromatic sensor pixel group P4, to be different from each other, and exposure times of two sensor pixels 111 (photodiodes PD) thereof to be the same as each other.

In each monochromatic sensor pixel group P1 of the other trichromatic sensor image group P2 included in each trichromatic sensor pixel group P4, exposure times of two sensor pixels 111 (photodiodes PD) arranged in the right downward direction are set to "middle (Middle)" as illustrated in FIG. 30. In addition, in each monochromatic sensor pixel group P1 of the other trichromatic sensor image group P2 included in each trichromatic sensor pixel group P4, an exposure time of the lower left sensor pixel 111 (photodiode PD) is set to "short (Short)" as illustrated in FIG. 30. In addition, in each monochromatic sensor pixel group P1 of the other trichromatic sensor image group P2 included in each trichromatic sensor pixel group P4, an exposure time of the upper right sensor pixel 111 (photodiode PD) is set to "long (Long)" as illustrated in FIG. 30. In other words, the system control circuit 124 controls exposure times of the plurality of sensor pixels 111 (photodiodes PD) to allow exposure times of two sensor pixels 111 (photodiodes PD), of each monochromatic sensor pixel group P1 of the other trichromatic sensor image group P2 included in each trichromatic sensor pixel group P4, to be different from each other, and exposure times of two sensor pixels 111 (photodiodes PD) thereof to be the same as each other.

At this time, the pixel array section 110 includes the pixel drive line ctlL and the pixel drive line ctlM at a location corresponding to the upper tier of each monochromatic sensor pixel group P1 included in each trichromatic sensor pixel group P4. In addition, the pixel array section 110 includes the pixel drive line ctlM and the pixel drive line ctlS at a location corresponding to the lower tier of each monochromatic sensor pixel group P1 included in each trichromatic sensor pixel group P4.

In the present modification example, the image data Ia includes the pixel data Sig in X rows×Y columns corresponding to the sensor pixels 111 in X rows×Y columns in the pixel array section 110. The pixel data Sig in four rows×four columns corresponding to each monochromatic sensor pixel group P1, of the pixel data Sig in X rows×Y columns, includes two pixel data Sig1 corresponding to the two sensor pixels 111 of which the exposure times are set to "middle (Middle)", one pixel data Sig2 corresponding to the sensor pixel 111 of which the exposure time is set to "short (Short)", and one pixel data Sig3 corresponding to the sensor pixel 111 of which the exposure time is set to "long (Long)".

Next, description is given of the arithmetic circuit 20 of the present modification example.

FIG. 33 illustrates an example of a signal processing procedure in the arithmetic circuit 20 of the present modification example. The arithmetic circuit 20 generates the HDR image data Ib on the basis of the image data Ia obtained by the imaging element 10. The arithmetic circuit 20 first decomposes the image data Ia for each exposure time (step S901). Specifically, the arithmetic circuit 20 decomposes the image data Ia into data (image data Im) of which the exposure time is "middle (Middle)", data (image data Il) of which the exposure time is "long (Long)", and data (image data Is) of which the exposure time is "short (Short)".

Next, the arithmetic circuit 20 generates phase difference data Pd71 and Pd72 on the basis of the image data Im (Step S902). Specifically, the arithmetic circuit 20 derives, in the image data Im, a difference value between the two pixel data Sig1 corresponding to each monochromatic sensor pixel group P1 of one trichromatic sensor image group P2 included in each trichromatic sensor pixel group P4, and generates the phase difference data Pd71 in the first direction (right upward direction) on the light-receiving surface 110A from the derived difference value. In addition, the arithmetic circuit 20 derives, in the image data Im, a difference value between the monochromatic sensor pixel groups P1 of the other trichromatic sensor image group P2 included in each trichromatic sensor pixel group P4, and generates the phase difference data Pd72 in the second direction (right downward direction) on the light-receiving surface 110A from the derived difference value.

In addition, the arithmetic circuit 20 generates phase difference data Pd73 on the basis of the image data Il and Im (step S902). Specifically, the arithmetic circuit 20 derives a difference value between the image data Il and the image data Im' obtained by multiplying the image data Im by an exposure time ratio between the exposure time "long (Long)" and the exposure time "middle (Middle)", and generates the phase difference data Pd73 from the derived difference value. In addition, the arithmetic circuit 20 generates phase difference data Pd74 on the basis of the image data Im and Is (step S902). Specifically, the arithmetic circuit 20 derives a difference value between the image data Im and the image data Is' obtained by multiplying the image data Is by an exposure time ratio between the exposure time "middle (Middle)" and the exposure time "short (Short)", and generates the phase difference data Pd74 from the derived difference value.

Next, the arithmetic circuit 20 generates the level data Da for a phase difference on the basis of the phase difference data Pd71 and Pd72 (step S903). The level data Da is, for example, data represented by values within a range from the lower limit value (e.g., zero bit) to the upper limit value (e.g., 128 bits). For example, in the phase difference data Pd71 and Pd72, the arithmetic circuit 20 converts a numerical value falling below a predetermined range into the lower limit value (e.g., zero bit). For example, in the phase difference data Pd71 and Pd72, the arithmetic circuit 20 converts a numerical value exceeding the predetermined range into the upper limit value (e.g., 128 bits). For example, in the phase difference data Pd71 and Pd72, the arithmetic circuit 20 converts a numerical value within the predetermined range into a value within a range from one bit to 127 bits in accordance with magnitude of the numerical value.

Next, the arithmetic circuit 20 converts the phase difference data Pd73 and Pd74 into the level data Db on a moving object (step S904). The level data Db is, for example, data represented by values within a range from the lower limit value (e.g., zero bit) to the upper limit value (e.g., 128 bits). Specifically, the arithmetic circuit 20 generates the level data Db on the basis of data (noise data) on a noise level of the imaging element 10 and the phase difference data Pd73 and Pd74.

Next, the arithmetic circuit 20 detects a location having a large phase difference from the obtained level data Da (step S905). Further, the arithmetic circuit 20 detects presence or absence of a moving object from the obtained level data Db (step S906). Finally, the arithmetic circuit 20 generates the HDR image data Ib from the image data Im, Il, and Is, presence or absence of a phase difference, and the presence or absence of a moving object (step S907). In this manner, the HDR image data Ib is generated.

In the present modification example, the pixel array section 110 is configured to obtain phase difference data for each color on the basis of full-color image data. This makes it possible to determine the presence or absence of a phase difference and the presence or absence of a moving object for each color.

Modification Example I

In the foregoing Modification Example H, the pixel array section 110 is configured to obtain phase difference data in the two directions (right upward direction and right downward direction) for each color. However, in the foregoing Modification Example H, the pixel array section 110 may be configured to obtain phase difference data in two directions (horizontal direction and vertical direction) for each color.

FIG. 34 illustrates a configuration example of the pixel array section 110 according to the present modification example. FIG. 35 illustrates an example of a wiring layout of the pixel array section 110 of FIG. 34. FIG. 36 illustrates an example of directions of phase differences detectable in the pixel array section 110 of FIG. 34.

In the present modification example, the pixel array section 110 is configured to obtain phase difference data in two directions for each color from two trichromatic sensor pixel groups P2 arranged in the column direction (hereinafter, referred to as a "trichromatic sensor pixel group P5"). Specifically, the pixel array section 110 is configured to obtain phase difference data in the horizontal direction and the vertical direction for each color from the trichromatic sensor pixel group P5. At this time, in one trichromatic sensor image group P2 included in each trichromatic sensor pixel group P5, each monochromatic sensor pixel group P1 is configured to obtain phase difference data in the vertical direction. In the other trichromatic sensor image group P2 included in each trichromatic sensor pixel group P5, each monochromatic sensor pixel group P1 is configured to obtain phase difference data in the horizontal direction.

Specifically, in each monochromatic sensor pixel group P1 of one trichromatic sensor image group P2 included in each trichromatic sensor pixel group P5, two sensor pixels 111 (photodiodes PD) of which the exposure times are set to "middle (Middle)" are arranged on the left side and in the vertical direction, for example, as illustrated in FIG. 34. In addition, in each monochromatic sensor pixel group P1 of one trichromatic sensor image group P2 included in each trichromatic sensor pixel group P5, one sensor pixel 111 (photodiode PD) of which the exposure time is set to "short (Short)" is disposed on the lower right of the monochromatic sensor pixel group P1. In addition, in each monochromatic sensor pixel group P1 of one trichromatic sensor image group P2 included in each trichromatic sensor pixel group P5, one sensor pixel 111 (photodiode PD) of which the exposure time is set to "long (Long)" is disposed on the upper right of the monochromatic sensor pixel group P1. In other words, the system control circuit 124 controls exposure times of the plurality of sensor pixels 111 (photodiodes PD) to allow exposure times of three sensor pixels 111 (photodiodes PD), of each monochromatic sensor pixel group P1 of one trichromatic sensor image group P2 included in each trichromatic sensor pixel group P5, to be different from one another, and exposure times of two sensor pixels 111 (photodiodes PD) thereof to be the same as each other.

In each monochromatic sensor pixel group P1 of the other trichromatic sensor image group P2 included in each trichromatic sensor pixel group P5, exposure times of two sensor pixels 111 (photodiodes PD) in the upper tier are set to "middle (Middle)" as illustrated in FIG. 34. In addition, in each monochromatic sensor pixel group P1 of the other trichromatic sensor image group P2 included in each trichromatic sensor pixel group P5, an exposure time of the lower right sensor pixel 111 (photodiode PD) is set to "short (Short)" as illustrated in FIG. 34. In addition, in each monochromatic sensor pixel group P1 of the other trichromatic sensor image group P2 included in each trichromatic sensor pixel group P5, an exposure time of the lower left sensor pixel 111 (photodiode PD) is set to "long (Long)" as illustrated in FIG. 34. In other words, the system control circuit 124 controls exposure times of the plurality of sensor pixels 111 (photodiodes PD) to allow exposure times of three sensor pixels 111 (photodiodes PD), of each monochromatic sensor pixel group P1 of the other trichromatic sensor image group P2 included in each trichromatic sensor pixel group P5, to be different from one another, and exposure times of two sensor pixels 111 (photodiodes PD) thereof to be the same as each other.

At this time, the pixel array section 110 includes the pixel drive line ctlM and the pixel drive line ctlL at a location corresponding to the upper tier of each monochromatic sensor pixel group P1 of one trichromatic sensor image group P2 included in each trichromatic sensor pixel group P5. In addition, the pixel array section 110 includes the pixel drive line ctlM and the pixel drive line ctlS at a location corresponding to the lower tier of each monochromatic sensor pixel group P1 of one trichromatic sensor image group P2 included in each trichromatic sensor pixel group P5. In addition, the pixel array section 110 includes the two pixel drive lines ctlM at a location corresponding to the upper tier of each monochromatic sensor pixel group P1 of the other trichromatic sensor image group P2 included in each trichromatic sensor pixel group P5. In addition, the pixel array section 110 includes the pixel drive line ctlL and the pixel drive line ctlS at a location corresponding to the lower tier of each monochromatic sensor pixel group P1 of the other trichromatic sensor image group P2 included in each trichromatic sensor pixel group P5.

Further, in the present modification example, the image data Ia includes the pixel data Sig in X rows×Y columns corresponding to the sensor pixels 111 in X rows×Y columns in the pixel array section 110. The pixel data Sig in two rows×two columns corresponding to each monochromatic sensor pixel group P1, of the pixel data Sig in X rows×Y columns, includes two pixel data Sig1 corresponding to the two sensor pixels 111 of which the exposure times are set to "middle (Middle)", one pixel data Sig2 corresponding to the sensor pixel 111 of which the exposure time is set to "short (Short)", and one pixel data Sig3 corresponding to the sensor pixel 111 of which the exposure time is set to "long (Long)".

Next, description is given of the arithmetic circuit 20 of the present modification example.

FIG. 37 illustrates an example of a signal processing procedure in the arithmetic circuit 20 of the present modification example. The arithmetic circuit 20 generates the HDR image data Ib on the basis of the image data Ia obtained by the imaging element 10. The arithmetic circuit 20 first decomposes the image data Ia for each exposure time (step S1001). Specifically, the arithmetic circuit 20 decomposes the image data Ia into data (image data Im) of which the exposure time is "middle (Middle)", data (image data Il) of which the exposure time is "long (Long)", and data (image data Is) of which the exposure time is "short (Short)".

Next, the arithmetic circuit 20 generates phase difference data Pd81 and Pd82 on the basis of the image data Im (Step S1002). Specifically, the arithmetic circuit 20 derives, in the image data Im, a difference value between the two pixel data Sig1 corresponding to each monochromatic sensor pixel group P1 of one trichromatic sensor image group P2 included in each trichromatic sensor pixel group P5, and generates the phase difference data Pd81 in the first direction (vertical direction) on the light-receiving surface 110A from the derived difference value. In addition, the arithmetic circuit 20 derives, in the image data Im, a difference value between the monochromatic sensor pixel groups P1 of the other trichromatic sensor image group P2 included in each trichromatic sensor pixel group P5, and generates the phase difference data Pd82 in the second direction (horizontal direction) on the light-receiving surface 110A from the derived difference value.

In addition, the arithmetic circuit 20 generates phase difference data Pd83 on the basis of the image data Il and Im (step S1002). Specifically, the arithmetic circuit 20 derives a difference value between the image data Il and the image data Im' obtained by multiplying the image data Im by an exposure time ratio between the exposure time "long (Long)" and the exposure time "middle (Middle)", and generates the phase difference data Pd83 from the derived difference value. In addition, the arithmetic circuit 20 generates phase difference data Pd84 on the basis of the image data Im and Is (step S1002). Specifically, the arithmetic circuit 20 derives a difference value between the image data Im and the image data Is' obtained by multiplying the image data Is by an exposure time ratio between the exposure time "middle (Middle)" and the exposure time "short (Short)", and generates the phase difference data Pd84 from the derived difference value.

Next, the arithmetic circuit 20 generates the level data Da for a phase difference on the basis of the phase difference data Pd81 and Pd82 (step S1003). The level data Da is, for example, data represented by values within a range from the lower limit value (e.g., zero bit) to the upper limit value (e.g., 128 bits). For example, in the phase difference data Pd81 and Pd82, the arithmetic circuit 20 converts a numerical value falling below a predetermined range into the lower limit value (e.g., zero bit). For example, in the phase difference data Pd81 and Pd82, the arithmetic circuit 20 converts a numerical value exceeding the predetermined range into the upper limit value (e.g., 128 bits). For example, in the phase difference data Pd81 and Pd82, the arithmetic circuit 20 converts a numerical value within the predetermined range into a value within a range from one bit to 127 bits in accordance with magnitude of the numerical value.

Next, the arithmetic circuit 20 converts the phase difference data Pd83 and Pd84 into the level data Db on a moving object (step S1004). The level data Db is, for example, data represented by values within a range from the lower limit value (e.g., zero bit) to the upper limit value (e.g., 128 bits). Specifically, the arithmetic circuit 20 generates the level data Db on the basis of data (noise data) on a noise level of the imaging element 10 and the phase difference data Pd83 and Pd84.

Next, the arithmetic circuit 20 detects a location having a large phase difference from the obtained level data Da (step S1005). Further, the arithmetic circuit 20 detects presence or absence of a moving object from the obtained level data Db (step S1006). Finally, the arithmetic circuit 20 generates the HDR image data Ib from the image data Im, Il, and Is, presence or absence of a phase difference, and the presence or absence of a moving object (step S1007). In this manner, the HDR image data Ib is generated.

In the present modification example, the pixel array section 110 is configured to obtain phase difference data in the two directions (horizontal direction and vertical direction) for each color on the basis of full-color image data. This makes it possible to determine the presence or absence of a phase difference and the presence or absence of a moving object in the two directions for each color.

Modification Example J

In the foregoing Modification Examples H and I, the pixel array section 110 is configured to obtain phase difference data in the two directions for each color. However, in the foregoing Modification Examples H and I, the pixel array section 110 may be configured to obtain phase difference data in three directions for each color.

FIG. 38 illustrates a configuration example of the pixel array section 110 according to the present modification example. FIG. 39 illustrates an example of a wiring layout of the pixel array section 110 of FIG. 38. FIG. 40 illustrates an example of directions of phase differences detectable in the pixel array section 110 of FIG. 38.

In the present modification example, the pixel array section 110 is configured to obtain phase difference data in three directions for each color from the trichromatic sensor pixel group P3. Specifically, the pixel array section 110 is configured to obtain phase difference data in the right downward direction, the horizontal direction and the vertical direction for each color from the trichromatic sensor pixel group P3. At this time, in the upper left trichromatic sensor image group P2 and the lower right trichromatic sensor image group P2 included in each trichromatic sensor pixel group P3, each monochromatic sensor pixel group P1 is configured to obtain phase difference data in the right downward direction. In addition, in the lower left trichromatic sensor image group P2 included in each trichromatic sensor pixel group P3, each monochromatic sensor pixel group P1 is configured to obtain phase difference data in the horizontal direction. In addition, in the upper right trichromatic sensor image group P2 included in each trichromatic sensor pixel group P3, each monochromatic sensor pixel group P1 is configured to obtain phase difference data in the vertical direction.

Specifically, in each monochromatic sensor pixel group P1 in the upper left trichromatic sensor image group P2 and the lower right trichromatic sensor image group P2 included in each trichromatic sensor pixel group P3, exposure times of two sensor pixels 111 (photodiodes PD) arranged in the right downward direction are set to "middle (Middle)" as illustrated in FIG. 38. In addition, in each monochromatic sensor pixel group P1 in the upper left trichromatic sensor image group P2 and the lower right trichromatic sensor image group P2 included in each trichromatic sensor pixel group P3, an exposure time of the lower right sensor pixel 111 (photodiode PD) is set to "short (Short)" as illustrated in FIG. 38. In addition, in each monochromatic sensor pixel group P1 in the upper left trichromatic sensor image group P2 and the lower right trichromatic sensor image group P2 included in each trichromatic sensor pixel group P3, an exposure time of the upper left sensor pixel 111 (photodiode PD) is set to "long (Long)" as illustrated in FIG. 38. In other words, the system control circuit 124 controls exposure times of the plurality of sensor pixels 111 (photodiodes PD) to allow exposure times of three sensor pixels 111 (photodiodes PD), of each monochromatic sensor pixel group P1 in the upper left trichromatic sensor image group P2 and the lower right trichromatic sensor image group P2 included in each trichromatic sensor pixel group P3, to be different from one another, and exposure times of two sensor pixels 111 (photodiodes PD) thereof to be the same as each other.

In addition, in each monochromatic sensor pixel group P1 in the lower left trichromatic sensor image group P2 included in each trichromatic sensor pixel group P3, exposure times of two sensor pixels 111 (photodiodes PD) arranged in the horizontal direction in the lower tier are set to "short (Short)" as illustrated in FIG. 38. In addition, in each monochromatic sensor pixel group P1 in the lower left trichromatic sensor image group P2 included in each trichromatic sensor pixel group P3, an exposure time of one sensor pixel 111 (photodiode PD) in the upper tier is set to "long (Long)", and an exposure time of the other sensor pixel 111 (photodiode PD) in the upper tier is set to "middle (Middle)" as illustrated in FIG. 38. It is to be noted that, in each monochromatic sensor pixel group P1 in the lower left trichromatic sensor image group P2 included in each trichromatic sensor pixel group P3, the exposure times of the two sensor pixels 111 (photodiodes PD) arranged in the horizontal direction in the upper tier may be set to "short (Short)". In other words, the system control circuit 124 controls exposure times of the plurality of sensor pixels 111 (photodiodes PD) to allow exposure times of three sensor pixels 111 (photodiodes PD), of each monochromatic sensor pixel group P1 in the lower left trichromatic sensor image group P2 included in each trichromatic sensor pixel group P3, to be different from one another, and exposure times of two sensor pixels 111 (photodiodes PD) thereof to be the same as each other.

In addition, in each monochromatic sensor pixel group P1 in the upper right trichromatic sensor image group P2 included in each trichromatic sensor pixel group P3, exposure times of two sensor pixels 111 (photodiodes PD) arranged in the vertical direction on the left side are set to "long (Long)" as illustrated in FIG. 38. In addition, in each monochromatic sensor pixel group P1 in the upper right trichromatic sensor image group P2 included in each trichromatic sensor pixel group P3, an exposure time of one sensor pixel 111 (photodiode PD) on the right side is set to "middle (Middle)", and an exposure time of the other sensor pixel 111 (photodiode PD) on the right side is set to "short (Short)" as illustrated in FIG. 38. It is to be noted that, in each monochromatic sensor pixel group P1 in the upper right trichromatic sensor image group P2 included in each trichromatic sensor pixel group P3, the exposure times of the two sensor pixels 111 (photodiodes PD) arranged in the vertical direction on the right side may be set to "long (Long)". In other words, exposure times of the plurality of sensor pixels 111 (photodiodes PD) are controlled to allow exposure times of three sensor pixels 111 (photodiodes PD), of each monochromatic sensor pixel group P1 in the upper right trichromatic sensor image group P2 included in each trichromatic sensor pixel group P3, to be different from one another, and exposure times of two sensor pixels 111 (photodiodes PD) thereof to be the same as each other.

At this time, the pixel array section 110 includes the pixel drive line ctlL and the pixel drive line ctlM at a location corresponding to the upper tier in each monochromatic sensor pixel group P1 in the uppermost tier and in the second tier from the top included in each trichromatic sensor pixel group P3. In addition, the pixel array section 110 includes the pixel drive line ctlL, the pixel drive line ctlM, and the pixel drive line ctlS at a location corresponding to the lower tier in each monochromatic sensor pixel group P1 in the uppermost tier and in the second tier from the top included in each trichromatic sensor pixel group P3. In addition, the pixel array section 110 includes the pixel drive line ctlL and the pixel drive line ctlM at a location corresponding to the upper tier in each monochromatic sensor pixel group P1 in the third tier from the top and in the lowermost tier included in each trichromatic sensor pixel group P3. In addition, the pixel array section 110 includes the pixel drive line ctlS and the pixel drive line ctlM at a location corresponding to the lower tier in each monochromatic sensor pixel group P1 in the third tier from the top and in the lowermost tier included in each trichromatic sensor pixel group P3.

In the present modification example, the image data Ia includes the pixel data Sig in X rows×Y columns corresponding to the sensor pixels 111 in X rows×Y columns in the pixel array section 110. The pixel data Sig in two rows×two columns corresponding to the upper left and lower right trichromatic sensor pixel groups P2, of the pixel data Sig in X rows×Y columns, includes two pixel data Sig1 corresponding to the two sensor pixels 111 of which the exposure times are set to "middle (Middle)", one pixel data Sig2 corresponding to the sensor pixel 111 of which the exposure time is set to "short (Short)", and one pixel data Sig3 corresponding to the sensor pixel 111 of which the exposure time is set to "long (Long)". In addition, the pixel data Sig in two rows×two columns corresponding to the lower left trichromatic sensor pixel group P2, of the pixel data Sig in X rows×Y columns, includes two pixel data Sig2 corresponding to the two sensor pixels 111 of which the exposure times are set to "short (Short)", one pixel data Sig1 corresponding to the sensor pixel 111 of which the exposure time is set to "middle (Middle)", and one pixel data Sig3 corresponding to the sensor pixel 111 of which the exposure time is set to "long (Long)". In addition, the pixel data Sig in two rows×two columns corresponding to the upper right trichromatic sensor pixel group P2, of the pixel data Sig in X rows×Y columns, includes two pixel data Sig3 corresponding to the two sensor pixels 111 of which the exposure times are set to "long (Long)", one pixel data Sig1 corresponding to the sensor pixel 111 of which the exposure time is set to "middle (Middle)", and one pixel data Sig2 corresponding to the sensor pixel 111 of which the exposure time is set to "short (Short)".

Next, description is given of the arithmetic circuit 20 of the present modification example.

FIG. 41 illustrates an example of a signal processing procedure in the arithmetic circuit 20 of the present modification example. The arithmetic circuit 20 generates the HDR image data Ib on the basis of the image data Ia obtained by the imaging element 10. The arithmetic circuit 20 first decomposes the image data Ia for each exposure time (step S1101). Specifically, the arithmetic circuit 20 decomposes the image data Ia into data (image data Im) of which the exposure time is "middle (Middle)", data (image data Il) of which the exposure time is "long (Long)", and data (image data Is) of which the exposure time is "short (Short)".

Next, the arithmetic circuit 20 generates phase difference data Pd91, Pd92, and Pd93 on the basis of the image data Im (Step S1102). Specifically, the arithmetic circuit 20 derives, in the image data Im, a difference value between the two pixel data Sig1 corresponding to each monochromatic sensor pixel group P1 included in the upper left and lower right trichromatic sensor pixel groups P2 of each trichromatic sensor pixel group P3, and generates the phase difference data Pd91 in the first direction (right downward direction) on the light-receiving surface 110A from the derived difference value. In addition, the arithmetic circuit 20 derives, in the image data Is, a difference value between the two pixel data Sig2 corresponding to each monochromatic sensor pixel group P1 included in the lower left trichromatic sensor pixel group P2 of each trichromatic sensor pixel group P3, and generates the phase difference data Pd92 in the second direction (horizontal direction) on the light-receiving surface 110A from the derived difference value. In addition, the arithmetic circuit 20 derives, in the image data Il, a difference value between the two pixel data Sig3 corresponding to each monochromatic sensor pixel group P1 included in the upper right trichromatic sensor pixel group P2 of each trichromatic sensor pixel group P3, and generates the phase difference data Pd93 in a third direction (vertical direction) on the light-receiving surface 110A from the derived difference value.

In addition, the arithmetic circuit 20 generates phase difference data Pd94 on the basis of the image data Il and Im (step S1102). Specifically, the arithmetic circuit 20 derives a difference value between the image data Il and the image data Im' obtained by multiplying the image data Im by an exposure time ratio between the exposure time "long (Long)" and the exposure time "middle (Middle)", and generates the phase difference data Pd94 from the derived difference value. In addition, the arithmetic circuit 20 generates phase difference data Pd95 on the basis of the image data Im and Is (step S1102). Specifically, the arithmetic circuit 20 derives a difference value between the image data Im and the image data Is' obtained by multiplying the image data Is by an exposure time ratio between the exposure time "middle (Middle)" and the exposure time "short (Short)", and generates the phase difference data Pd95 from the derived difference value.

Next, the arithmetic circuit 20 generates the level data Da for a phase difference on the basis of the phase difference data Pd91, Pd92, and Pd93 (step S1103). The level data Da is, for example, data represented by values within a range from the lower limit value (e.g., zero bit) to the upper limit value (e.g., 128 bits). For example, in the phase difference data Pd91, Pd92, and Pd93, the arithmetic circuit 20 converts a numerical value falling below a predetermined range into the lower limit value (e.g., zero bit). For example, in the phase difference data Pd91, Pd92, and Pd93, the arithmetic circuit 20 converts a numerical value exceeding the predetermined range into the upper limit value (e.g., 128 bits). For example, in the phase difference data Pd91, Pd92, and Pd93, the arithmetic circuit 20 converts a numerical value within the predetermined range into a value within a range from one bit to 127 bits in accordance with magnitude of the numerical value.

Next, the arithmetic circuit 20 converts the phase difference data Pd94 and Pd95 into the level data Db on a moving object (step S1104). The level data Db is, for example, data represented by values within a range from the lower limit value (e.g., zero bit) to the upper limit value (e.g., 128 bits). Specifically, the arithmetic circuit 20 generates the level data Db on the basis of data (noise data) on a noise level of the imaging element 10 and the phase difference data Pd94 and Pd95.

Next, the arithmetic circuit 20 detects a location having a large phase difference from the obtained level data Da (step S1105). Further, the arithmetic circuit 20 detects presence or absence of a moving object from the obtained level data Db (step S1106). Finally, the arithmetic circuit 20 generates the HDR image data Ib from the image data Im, Il, and Is, presence or absence of a phase difference, and the presence or absence of a moving object (step S1107). In this manner, the HDR image data Ib is generated.

In the present modification example, the pixel array section 110 is configured to obtain phase difference data in the three directions for each color. This makes it possible to determine the presence or absence of a phase difference and the presence or absence of a moving object in the three directions for each color.

Modification Example K

In the foregoing Modification Examples A, B, C, D, and E, the pixel array section 110 is configured to obtain phase difference data on the basis of monochromatic image data. However, in the foregoing embodiment, the pixel array section 110 may be configured to obtain phase difference data for each color on the basis of full-color image data.

FIG. 42 illustrates a configuration example of the pixel array section 110 according to the present modification example. FIG. 43 illustrates an example of a wiring layout of the pixel array section 110 of FIG. 42. FIG. 44 illustrates an example of directions of phase differences detectable in the pixel array section 110 of FIG. 42.

In the present modification example, the pixel array section 110 is configured to obtain phase difference data in two directions for each color from the trichromatic sensor pixel group P3. Specifically, the pixel array section 110 is configured to obtain phase difference data in the right upward direction and the right downward direction for each color from the trichromatic sensor pixel group P3. At this time, in the upper left trichromatic sensor image group P2 and the lower right trichromatic sensor image group P2 included in each trichromatic sensor pixel group P3, each monochromatic sensor pixel group P1 has a configuration similar to that of the monochromatic sensor pixel group P1 according to the foregoing embodiment. In addition, in the lower left trichromatic sensor image group P2 included in each trichromatic sensor pixel group P3, each monochromatic sensor pixel group P1 is configured to obtain phase difference data in the right upward direction and the right downward direction. In addition, in the upper right trichromatic sensor image group P2 included in each trichromatic sensor pixel group P3, each monochromatic sensor pixel group P1 is configured to obtain phase difference data in the right upward direction and the right downward direction.

Specifically, in each monochromatic sensor pixel group P1 in the upper left trichromatic sensor image group P2 and the lower right trichromatic sensor image group P2 included in each trichromatic sensor pixel group P3, exposure times of two sensor pixels 111 (photodiodes PD) arranged in the right upward direction are set to "middle (Middle)" as illustrated in FIG. 42. In addition, in each monochromatic sensor pixel group P1 in the upper left trichromatic sensor image group P2 and the lower right trichromatic sensor image group P2 included in each trichromatic sensor pixel group P3, an exposure time of the lower right sensor pixel 111 (photodiode PD) is set to "short (Short)" as illustrated in FIG. 42. In addition, in each monochromatic sensor pixel group P1 in the upper left trichromatic sensor image group P2 and the lower right trichromatic sensor image group P2 included in each trichromatic sensor pixel group P3, an exposure time of the upper left sensor pixel 111 (photodiode PD) is set to "long (Long)" as illustrated in FIG. 42.

In addition, in each monochromatic sensor pixel group P1 in the lower left trichromatic sensor image group P2 included in each trichromatic sensor pixel group P3, exposure times of two sensor pixels 111 (photodiodes PD) arranged in the right upward direction are set to "middle (Middle)" as illustrated in FIG. 42. In addition, in each monochromatic sensor pixel group P1 in the lower left trichromatic sensor image group P2 included in each trichromatic sensor pixel group P3, exposure times of two sensor pixels 111 (photodiodes PD) arranged in the right downward direction are set to "short (Short)" as illustrated in FIG. 42. In other words, exposure times of the plurality of sensor pixels 111 (photodiodes PD) are controlled to allow exposure times of two sensor pixels 111 (photodiodes PD), of each monochromatic sensor pixel group P1 in the lower left trichromatic sensor image group P2 included in each trichromatic sensor pixel group P3, to be different from each other, and exposure times of two sensor pixels 111 (photodiodes PD) thereof to be the same as each other.

In addition, in each monochromatic sensor pixel group P1 in the upper right trichromatic sensor image group P2 included in each trichromatic sensor pixel group P3, exposure times of two sensor pixels 111 (photodiodes PD) arranged in the right upward direction are set to "middle (Middle)" as illustrated in FIG. 42. In addition, in each monochromatic sensor pixel group P1 in the upper right trichromatic sensor image group P2 included in each trichromatic sensor pixel group P3, exposure times of two sensor pixels 111 (photodiodes PD) arranged in the right downward direction are set to "long (Long)" as illustrated in FIG. 42. In other words, exposure times of the plurality of sensor pixels 111 (photodiodes PD) are controlled to allow exposure times of two sensor pixels 111 (photodiodes PD), of each monochromatic sensor pixel group P1 in the upper right trichromatic sensor image group P2 included in each trichromatic sensor pixel group P3, to be different from each other, and exposure times of two sensor pixels 111 (photodiodes PD) thereof to be the same as each other.

At this time, the pixel array section 110 includes the pixel drive line ctlL and the pixel drive line ctlM at a location corresponding to the upper tier in each monochromatic sensor pixel group P1 in the uppermost tier and in the second tier from the top included in each trichromatic sensor pixel group P3. In addition, the pixel array section 110 includes the pixel drive line ctlL, the pixel drive line ctlM, and the pixel drive line ctlS at a location corresponding to the lower tier in each monochromatic sensor pixel group P1 in the uppermost tier and in the second tier from the top included in each trichromatic sensor pixel group P3. In addition, the pixel array section 110 includes the pixel drive line ctlL, the pixel drive line ctlM, and the pixel drive line ctlS at a location corresponding to the upper tier in each monochromatic sensor pixel group P1 in the third tier from the top and in the lowermost tier included in each trichromatic sensor pixel group P3. In addition, the pixel array section 110 includes the pixel drive line ctlS and the pixel drive line ctlM at a location corresponding to the lower tier in each monochromatic sensor pixel group P1 in the third tier from the top and in the lowermost tier included in each trichromatic sensor pixel group P3.

In the present modification example, the image data Ia includes the pixel data Sig in X rows×Y columns corresponding to the sensor pixels 111 in X rows×Y columns in the pixel array section 110. The pixel data Sig in two rows×two columns corresponding to the upper left and lower right trichromatic sensor pixel groups P2, of the pixel data Sig in X rows×Y columns, includes two pixel data Sig1 corresponding to the two sensor pixels 111 of which the exposure times are set to "middle (Middle)", one pixel data Sig2 corresponding to the sensor pixel 111 of which the exposure time is set to "short (Short)", and one pixel data Sig3 corresponding to the sensor pixel 111 of which the exposure time is set to "long (Long)". In addition, the pixel data Sig in two rows×two columns corresponding to the lower left trichromatic sensor pixel group P2, of the pixel data Sig in X rows×Y columns, includes two pixel data Sig2 corresponding to the two sensor pixels 111 of which the exposure times are set to "short (Short)" and two pixel data Sig1 corresponding to the two sensor pixels 111 of which the exposure times are set to "middle (Middle)". In addition, the pixel data Sig in two rows×two columns corresponding to the upper right trichromatic sensor pixel group P2, of the pixel data Sig in X rows×Y columns, includes two pixel data Sig3 corresponding to the two sensor pixels 111 of which the exposure times are set to "long (Long)" and two pixel data Sig1 corresponding to the two sensor pixels 111 of which the exposure times are set to "middle (Middle)".

Next, description is given of the arithmetic circuit 20 of the present modification example.

FIG. 45 illustrates an example of a signal processing procedure in the arithmetic circuit 20 of the present modification example. The arithmetic circuit 20 generates the HDR image data Ib on the basis of the image data Ia obtained by the imaging element 10. The arithmetic circuit 20 first decomposes the image data Ia for each exposure time (step S1201). Specifically, the arithmetic circuit 20 decomposes the image data Ia into data (image data Im) of which the exposure time is "middle (Middle)", data (image data Il) of which the exposure time is "long (Long)", and data (image data Is) of which the exposure time is "short (Short)".

Next, the arithmetic circuit 20 generates phase difference data Pd101, Pd102, and Pd103 on the basis of the image data Im (Step S1202). Specifically, the arithmetic circuit 20 derives, in the image data Im, a difference value between the two pixel data Sig1 corresponding to each monochromatic sensor pixel group P1 included in the lower left and upper right trichromatic sensor pixel groups P2 of each trichromatic sensor pixel group P3, and generates the phase difference data Pd101 in the first direction (right upward direction) on the light-receiving surface 110A from the derived difference value. In addition, the arithmetic circuit 20 derives, in the image data Is, a difference value between the two pixel data Sig2 corresponding to each monochromatic sensor pixel group P1 included in the lower left trichromatic sensor pixel group P2 of each trichromatic sensor pixel group P3, and generates the phase difference data Pd102 in the second direction (right downward direction) on the light-receiving surface 110A from the derived difference value. In addition, the arithmetic circuit 20 derives, in the image data Il, a difference value between the two pixel data Sig3 corresponding to each monochromatic sensor pixel group P1 included in the upper right trichromatic sensor pixel group P2 of each trichromatic sensor pixel group P3, and generates the phase difference data Pd103 in the first direction (right upward direction) on the light-receiving surface 110A from the derived difference value.

In addition, the arithmetic circuit 20 generates phase difference data Pd104 on the basis of the image data Il and Im (step S1202). Specifically, the arithmetic circuit 20 derives a difference value between the image data Il and the image data Im' obtained by multiplying the image data Im by an exposure time ratio between the exposure time "long (Long)" and the exposure time "middle (Middle)", and generates the phase difference data Pd104 from the derived difference value. In addition, the arithmetic circuit 20 generates phase difference data Pd105 on the basis of the image data Im and Is (step S1202). Specifically, the arithmetic circuit 20 derives a difference value between the image data Im and the image data Is' obtained by multiplying the image data Is by an exposure time ratio between the exposure time "middle (Middle)" and the exposure time "short (Short)", and generates the phase difference data Pd105 from the derived difference value.

Next, the arithmetic circuit 20 generates the level data Da for a phase difference on the basis of the phase difference data Pd101, Pd102, and Pd103 (step S1203). The level data Da is, for example, data represented by values within a range from the lower limit value (e.g., zero bit) to the upper limit value (e.g., 128 bits). For example, in the phase difference data Pd101, Pd102, and Pd103, the arithmetic circuit 20 converts a numerical value falling below a predetermined range into the lower limit value (e.g., zero bit). For example, in the phase difference data Pd101, Pd102, and Pd103, the arithmetic circuit 20 converts a numerical value exceeding the predetermined range into the upper limit value (e.g., 128 bits). For example, in the phase difference data Pd101, Pd102, and Pd103, the arithmetic circuit 20 converts a numerical value within the predetermined range into a value within a range from one bit to 127 bits in accordance with magnitude of the numerical value.

Next, the arithmetic circuit 20 converts the phase difference data Pd104 and Pd105 into the level data Db on a moving object (step S1204). The level data Db is, for example, data represented by values within a range from the lower limit value (e.g., zero bit) to the upper limit value (e.g., 128 bits). Specifically, the arithmetic circuit 20 generates the level data Db on the basis of data (noise data) on a noise level of the imaging element 10 and the phase difference data Pd104 and Pd105.

Next, the arithmetic circuit 20 detects a location having a large phase difference from the obtained level data Da (step S1205). Further, the arithmetic circuit 20 detects presence or absence of a moving object from the obtained level data Db (step S1206). Finally, the arithmetic circuit 20 generates the HDR image data Ib from the image data Im, Il, and Is, presence or absence of a phase difference, and the presence or absence of a moving object (step S1207). In this manner, the HDR image data Ib is generated.

In the present modification example, the pixel array section 110 is configured to obtain phase difference data in the two directions for each color. This makes it possible to determine the presence or absence of a phase difference and the presence or absence of a moving object in the two directions for each color.

Modification Example L

In the foregoing Modification Example K, the pixel array section 110 is configured to obtain phase difference data in the two directions (right upward direction and right downward direction) for each color on the basis of monochromatic or full-color image data. However, in the foregoing Modification Example K, the pixel array section 110 may be configured to obtain phase difference data in two directions (horizontal direction and vertical direction) for each color on the basis of monochromatic or full-color image data.

FIG. 46 illustrates a configuration example of the pixel array section 110 according to the present modification example. FIG. 47 illustrates an example of a wiring layout of the pixel array section 110 of FIG. 46. FIG. 48 illustrates an example of directions of phase differences detectable in the pixel array section 110 of FIG. 46.

In the present modification example, the pixel array section 110 is configured to obtain phase difference data in two directions for each color from the trichromatic sensor pixel group P3. Specifically, the pixel array section 110 is configured to obtain phase difference data in the horizontal direction and the vertical direction for each color from the trichromatic sensor pixel group P3. At this time, in the upper left trichromatic sensor image group P2 and the lower right trichromatic sensor image group P2 included in each trichromatic sensor pixel group P3, each monochromatic sensor pixel group P1 has a configuration similar to that of the monochromatic sensor pixel group P1 according to the foregoing embodiment. In addition, in the lower left trichromatic sensor image group P2 included in each trichromatic sensor pixel group P3, each monochromatic sensor pixel group P1 is configured to obtain phase difference data in the horizontal direction. In addition, in the upper right trichromatic sensor image group P2 included in each trichromatic sensor pixel group P3, each monochromatic sensor pixel group P1 is configured to obtain phase difference data in the vertical direction.

Specifically, in each monochromatic sensor pixel group P1 in the upper left trichromatic sensor image group P2 and the lower right trichromatic sensor image group P2 included in each trichromatic sensor pixel group P3, exposure times of two sensor pixels 111 (photodiodes PD) arranged in the right upward direction are set to "middle (Middle)" as illustrated in FIG. 46. In addition, in each monochromatic sensor pixel group P1 in the upper left trichromatic sensor image group P2 and the lower right trichromatic sensor image group P2 included in each trichromatic sensor pixel group P3, an exposure time of the lower right sensor pixel 111 (photodiode PD) is set to "short (Short)" as illustrated in FIG. 46. In addition, in each monochromatic sensor pixel group P1 in the upper left trichromatic sensor image group P2 and the lower right trichromatic sensor image group P2 included in each trichromatic sensor pixel group P3, an exposure time of the upper left sensor pixel 111 (photodiode PD) is set to "long (Long)" as illustrated in FIG. 46.

In addition, in each monochromatic sensor pixel group P1 in the lower left trichromatic sensor image group P2 included in each trichromatic sensor pixel group P3, exposure times of two sensor pixels 111 (photodiodes PD) arranged in the horizontal direction in the upper tier are set to "short (Short)" as illustrated in FIG. 46. In addition, in each monochromatic sensor pixel group P1 in the lower left trichromatic sensor image group P2 included in each trichromatic sensor pixel group P3, exposure times of two sensor pixels 111 (photodiodes PD) arranged in the horizontal direction in the lower tier are set to "middle (Middle)" as illustrated in FIG. 46. In other words, exposure times of the plurality of sensor pixels 111 (photodiodes PD) are controlled to allow exposure times of two sensor pixels 111 (photodiodes PD), of each monochromatic sensor pixel group P1 in the lower left trichromatic sensor image group P2 included in each trichromatic sensor pixel group P3, to be different from each other, and exposure times of two sensor pixels 111 (photodiodes PD) thereof to be the same as each other.

It is to be noted that, in each monochromatic sensor pixel group P1 in the lower left trichromatic sensor image group P2 included in each trichromatic sensor pixel group P3, the exposure times of the two sensor pixels 111 (photodiodes PD) arranged in the horizontal direction in the upper tier may be set to "middle (Middle)". In addition, in each monochromatic sensor pixel group P1 in the lower left trichromatic sensor image group P2 included in each trichromatic sensor pixel group P3, the exposure times of the two sensor pixels 111 (photodiodes PD) arranged in the horizontal direction in the lower tier may be set to "short (Short)".

In addition, in each monochromatic sensor pixel group P1 in the upper right trichromatic sensor image group P2 included in each trichromatic sensor pixel group P3, exposure times of two sensor pixels 111 (photodiodes PD) arranged in the vertical direction on the left side are set to "long (Long)" as illustrated in FIG. 46. In addition, in each monochromatic sensor pixel group P1 in the upper right trichromatic sensor image group P2 included in each trichromatic sensor pixel group P3, exposure times of two sensor pixels 111 (photodiodes PD) arranged in the vertical direction on the right side are set to "middle (Middle)" as illustrated in FIG. 42. In other words, exposure times of the plurality of sensor pixels 111 (photodiodes PD) are controlled to allow exposure times of two sensor pixels 111 (photodiodes PD), of each monochromatic sensor pixel group P1 in the upper right trichromatic sensor image group P2 included in each trichromatic sensor pixel group P3, to be different from each other, and exposure times of two sensor pixels 111 (photodiodes PD) thereof to be the same as each other.

It is to be noted that, in each monochromatic sensor pixel group P1 in the upper right trichromatic sensor image group P2 included in each trichromatic sensor pixel group P3, the exposure times of the two sensor pixels 111 (photodiodes PD) arranged in the vertical direction on the left side may be set to "middle (Middle)". In addition, in each monochromatic sensor pixel group P1 in the upper right trichromatic sensor image group P2 included in each trichromatic sensor pixel group P3, the exposure times of the two sensor pixels 111 (photodiodes PD) arranged in the vertical direction on the right side may be set to "long (Long)".

At this time, the pixel array section 110 includes the pixel drive line ctlL and the pixel drive line ctlM at a location corresponding to the upper tier in each monochromatic sensor pixel group P1 in the uppermost tier and in the second tier from the top included in each trichromatic sensor pixel group P3. In addition, the pixel array section 110 includes the pixel drive line ctlL, the pixel drive line ctlM, and the pixel drive line ctlS at a location corresponding to the lower tier in each monochromatic sensor pixel group P1 in the uppermost tier and in the second tier from the top included in each trichromatic sensor pixel group P3. In addition, the pixel array section 110 includes the pixel drive line ctlL, the pixel drive line ctlM, and the pixel drive line ctlS at a location corresponding to the upper tier in each monochromatic sensor pixel group P1 in the third tier from the top and in the lowermost tier included in each trichromatic sensor pixel group P3. In addition, the pixel array section 110 includes the pixel drive line ctlS and the pixel drive line ctlM at a location corresponding to the lower tier in each monochromatic sensor pixel group P1 in the third tier from the top and in the lowermost tier included in each trichromatic sensor pixel group P3.

In the present modification example, the image data Ia includes the pixel data Sig in X rows×Y columns corresponding to the sensor pixels 111 in X rows×Y columns in the pixel array section 110. The pixel data Sig in two rows×two columns corresponding to the upper left and lower right trichromatic sensor pixel groups P2, of the pixel data Sig in X rows×Y columns, includes two pixel data Sig1 corresponding to the two sensor pixels 111 of which the exposure times are set to "middle (Middle)", one pixel data Sig2 corresponding to the sensor pixel 111 of which the exposure time is set to "short (Short)", and one pixel data Sig3 corresponding to the sensor pixel 111 of which the exposure time is set to "long (Long)". In addition, the pixel data Sig in two rows×two columns corresponding to the lower left trichromatic sensor pixel group P2, of the pixel data Sig in X rows×Y columns, includes two pixel data Sig2 corresponding to the two sensor pixels 111 of which the exposure times are set to "short (Short)" and two pixel data Sig1 corresponding to the two sensor pixels 111 of which the exposure times are set to "middle (Middle)". In addition, the pixel data Sig in two rows×two columns corresponding to the upper right trichromatic sensor pixel group P2, of the pixel data Sig in X rows×Y columns, includes two pixel data Sig3 corresponding to the two sensor pixels 111 of which the exposure times are set to "long (Long)" and two pixel data Sig1 corresponding to the two sensor pixels 111 of which the exposure times are set to "middle (Middle)".

Next, description is given of the arithmetic circuit 20 of the present modification example.

FIG. 49 illustrates an example of a signal processing procedure in the arithmetic circuit 20 of the present modification example. The arithmetic circuit 20 generates the HDR image data Ib on the basis of the image data Ia obtained by the imaging element 10. The arithmetic circuit 20 first decomposes the image data Ia for each exposure time (step S1301). Specifically, the arithmetic circuit 20 decomposes the image data Ia into data (image data Im) of which the exposure time is "middle (Middle)", data (image data Il) of which the exposure time is "long (Long)", and data (image data Is) of which the exposure time is "short (Short)".

Next, the arithmetic circuit 20 generates phase difference data Pd111, Pd112, Pd113, and Pd114 on the basis of the image data Im (Step S1302). Specifically, the arithmetic circuit 20 derives, in the image data Im, a difference value between the two pixel data Sig1 corresponding to each monochromatic sensor pixel group P1 included in the lower left trichromatic sensor pixel group P2 of each trichromatic sensor pixel group P3, and generates the phase difference data Pd111 in the first direction (horizontal direction) on the light-receiving surface 110A from the derived difference value. In addition, the arithmetic circuit 20 derives, in the image data Im, a difference value between the two pixel data Sig1 corresponding to each monochromatic sensor pixel group P1 included in the upper right trichromatic sensor pixel group P2 of each trichromatic sensor pixel group P3, and generates the phase difference data Pd112 in the second direction (vertical direction) on the light-receiving surface 110A from the derived difference value. In addition, the arithmetic circuit 20 derives, in the image data Is, a difference value between the two pixel data Sig2 corresponding to each monochromatic sensor pixel group P1 included in the lower left trichromatic sensor pixel group P2 of each trichromatic sensor pixel group P3, and generates the phase difference data Pd113 in the first direction (horizontal direction) on the light-receiving surface 110A from the derived difference value. In addition, the arithmetic circuit 20 derives, in the image data Il, a difference value between the two pixel data Sig3 corresponding to each monochromatic sensor pixel group P1 included in the upper right trichromatic sensor pixel group P2 of each trichromatic sensor pixel group P3, and generates the phase difference data Pd114 in the second direction (vertical direction) on the light-receiving surface 110A from the derived difference value.

In addition, the arithmetic circuit 20 generates phase difference data Pd115 on the basis of the image data Il and Im (step S1302). Specifically, the arithmetic circuit 20 derives a difference value between the image data Il and the image data Im' obtained by multiplying the image data Im by an exposure time ratio between the exposure time "long (Long)" and the exposure time "middle (Middle)", and generates the phase difference data Pd115 from the derived difference value. In addition, the arithmetic circuit 20 generates phase difference data Pd116 on the basis of the image data Im and Is (step S1302). Specifically, the arithmetic circuit 20 derives a difference value between the image data Im and the image data Is' obtained by multiplying the image data Is by an exposure time ratio between the exposure time "middle (Middle)" and the exposure time "short (Short)", and generates the phase difference data Pd116 from the derived difference value.

Next, the arithmetic circuit 20 generates the level data Da for a phase difference on the basis of the phase difference data Pd111, Pd112, Pd113, and Pd114 (step S1303). The level data Da is, for example, data represented by values within a range from the lower limit value (e.g., zero bit) to the upper limit value (e.g., 128 bits). For example, in the phase difference data Pd111, Pd112, Pd113, and Pd114, the arithmetic circuit 20 converts a numerical value falling below a predetermined range into the lower limit value (e.g., zero bit). For example, in the phase difference data Pd111, Pd112, Pd113, and Pd114, the arithmetic circuit 20 converts a numerical value exceeding the predetermined range into the upper limit value (e.g., 128 bits). For example, in the phase difference data Pd111, Pd112, Pd113, and Pd114, the arithmetic circuit 20 converts a numerical value within the predetermined range into a value within a range from one bit to 127 bits in accordance with magnitude of the numerical value.

Next, the arithmetic circuit 20 converts the phase difference data Pd115 and Pd116 into the level data Db on a moving object (step S1304). The level data Db is, for example, data represented by values within a range from the lower limit value (e.g., zero bit) to the upper limit value (e.g., 128 bits). Specifically, the arithmetic circuit 20 generates the level data Db on the basis of data (noise data) on a noise level of the imaging element 10 and the phase difference data Pd115 and Pd116.

Next, the arithmetic circuit 20 detects a location having a large phase difference from the obtained level data Da (step S1305). Further, the arithmetic circuit 20 detects presence or absence of a moving object from the obtained level data Db (step S1306). Finally, the arithmetic circuit 20 generates the HDR image data Ib from the image data Im, Il, and Is, presence or absence of a phase difference, and the presence or absence of a moving object (step S1307). In this manner, the HDR image data Ib is generated.

In the present modification example, the pixel array section 110 is configured to obtain phase difference data in the two directions for each color. This makes it possible to determine the presence or absence of a phase difference and the presence or absence of a moving object in the two directions for each color.

3. Practical Application Examples

Practical Application Example 1

The technology according to an embodiment of the present disclosure (present technology) is applicable to various products. For example, the technology according to an embodiment of the present disclosure may be achieved in the form of an apparatus to be mounted to a mobile body of any kind. Non-limiting examples of the mobile body may include an automobile, an electric vehicle, a hybrid electric vehicle, a motorcycle, a bicycle, any personal mobility device, an airplane, an unmanned aerial vehicle (drone), a vessel, and a robot.

FIG. 50 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 50, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automatic driving, which makes the vehicle to travel autonomously without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 50, an audio speaker 12061, a display section 12062, and an instrument panel 12063 are illustrated as the output device. The display section 12062 may, for example, include at least one of an on-board display and a head-up display.

FIG. 51 is a diagram depicting an example of the installation position of the imaging section 12031.

In FIG. 51, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 51 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automatic driving that makes the vehicle travel autonomously without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

The description has been given hereinabove of one example of the mobile body control system, to which the technology according to an embodiment of the present disclosure may be applied. The technology according to an embodiment of the present disclosure may be applied to the imaging section 12031 among components of the configuration described above. Specifically, the imaging element 1 according to any of the foregoing embodiment and modification examples thereof is applicable to the imaging section 12031. The application of the technology according to an embodiment of the present disclosure to the imaging section 12031 allows for a high-definition captured image with less noise, thus making it possible to perform highly accurate control utilizing the captured image in the mobile body control system.

Practical Application Example 2

FIG. 52 is a view depicting an example of a schematic configuration of an endoscopic surgery system to which the technology according to an embodiment of the present disclosure (present technology) can be applied.

In FIG. 52, a state is illustrated in which a surgeon (medical doctor) 11131 is using an endoscopic surgery system 11000 to perform surgery for a patient 11132 on a patient bed 11133. As depicted, the endoscopic surgery system 11000 includes an endoscope 11100, other surgical tools 11110 such as a pneumoperitoneum tube 11111 and an energy device 11112, a supporting arm apparatus 11120 which supports the endoscope 11100 thereon, and a cart 11200 on which various apparatus for endoscopic surgery are mounted.

The endoscope 11100 includes a lens barrel 11101 having a region of a predetermined length from a distal end thereof to be inserted into a body cavity of the patient 11132, and a camera head 11102 connected to a proximal end of the lens barrel 11101. In the example depicted, the endoscope 11100 is depicted which includes as a rigid endoscope having the lens barrel 11101 of the hard type. However, the endoscope 11100 may otherwise be included as a flexible endoscope having the lens barrel 11101 of the flexible type.

The lens barrel 11101 has, at a distal end thereof, an opening in which an objective lens is fitted. A light source apparatus 11203 is connected to the endoscope 11100 such that light generated by the light source apparatus 11203 is introduced to a distal end of the lens barrel 11101 by a light guide extending in the inside of the lens barrel 11101 and is irradiated toward an observation target in a body cavity of the patient 11132 through the objective lens. It is to be noted that the endoscope 11100 may be a forward-viewing endoscope or may be an oblique-viewing endoscope or a side-viewing endoscope.

An optical system and an image pickup element are provided in the inside of the camera head 11102 such that reflected light (observation light) from the observation target is condensed on the image pickup element by the optical system. The observation light is photo-electrically converted by the image pickup element to generate an electric signal corresponding to the observation light, namely, an image signal corresponding to an observation image. The image signal is transmitted as RAW data to a CCU 11201.

The CCU 11201 includes a central processing unit (CPU), a graphics processing unit (GPU) or the like and integrally controls operation of the endoscope 11100 and a display apparatus 11202. Further, the CCU 11201 receives an image signal from the camera head 11102 and performs, for the image signal, various image processes for displaying an image based on the image signal such as, for example, a development process (demosaic process).

The display apparatus 11202 displays thereon an image based on an image signal, for which the image processes have been performed by the CCU 11201, under the control of the CCU 11201.

The light source apparatus 11203 includes a light source such as, for example, a light emitting diode (LED) and supplies irradiation light upon imaging of a surgical region to the endoscope 11100.

An inputting apparatus 11204 is an input interface for the endoscopic surgery system 11000. A user can perform inputting of various kinds of information or instruction inputting to the endoscopic surgery system 11000 through the inputting apparatus 11204. For example, the user would input an instruction or a like to change an image pickup condition (type of irradiation light, magnification, focal distance or the like) by the endoscope 11100.

A treatment tool controlling apparatus 11205 controls driving of the energy device 11112 for cautery or incision of a tissue, sealing of a blood vessel or the like. A pneumoperitoneum apparatus 11206 feeds gas into a body cavity of the patient 11132 through the pneumoperitoneum tube 11111 to inflate the body cavity in order to secure the field of view of the endoscope 11100 and secure the working space for the surgeon. A recorder 11207 is an apparatus capable of recording various kinds of information relating to surgery. A printer 11208 is an apparatus capable of printing various kinds of information relating to surgery in various forms such as a text, an image or a graph.

It is to be noted that the light source apparatus 11203 which supplies irradiation light when a surgical region is to be imaged to the endoscope 11100 may include a white light source which includes, for example, an LED, a laser light source or a combination of them. Where a white light source includes a combination of red, green, and blue (RGB) laser light sources, since the output intensity and the output timing can be controlled with a high degree of accuracy for each color (each wavelength), adjustment of the white balance of a picked up image can be performed by the light source apparatus 11203. Further, in this case, if laser beams from the respective RGB laser light sources are irradiated time-divisionally on an observation target and driving of the image pickup elements of the camera head 11102 are controlled in synchronism with the irradiation timings. Then images individually corresponding to the R, G and B colors can be also picked up time-divisionally. According to this method, a color image can be obtained even if color filters are not provided for the image pickup element.

Further, the light source apparatus 11203 may be controlled such that the intensity of light to be outputted is changed for each predetermined time. By controlling driving of the image pickup element of the camera head 11102 in synchronism with the timing of the change of the intensity of light to acquire images time-divisionally and synthesizing the images, an image of a high dynamic range free from underexposed blocked up shadows and overexposed highlights can be created.

Further, the light source apparatus 11203 may be configured to supply light of a predetermined wavelength band ready for special light observation. In special light observation, for example, by utilizing the wavelength dependency of absorption of light in a body tissue to irradiate light of a narrow band in comparison with irradiation light upon ordinary observation (namely, white light), narrow band observation (narrow band imaging) of imaging a predetermined tissue such as a blood vessel of a superficial portion of the mucous membrane or the like in a high contrast is performed. Alternatively, in special light observation, fluorescent observation for obtaining an image from fluorescent light generated by irradiation of excitation light may be performed. In fluorescent observation, it is possible to perform observation of fluorescent light from a body tissue by irradiating excitation light on the body tissue (autofluorescence observation) or to obtain a fluorescent light image by locally injecting a reagent such as indocyanine green (ICG) into a body tissue and irradiating excitation light corresponding to a fluorescent light wavelength of the reagent upon the body tissue. The light source apparatus 11203 can be configured to supply such narrow-band light and/or excitation light suitable for special light observation as described above.

FIG. 53 is a block diagram depicting an example of a functional configuration of the camera head 11102 and the CCU 11201 depicted in FIG. 52.

The camera head 11102 includes a lens unit 11401, an image pickup unit 11402, a driving unit 11403, a communication unit 11404 and a camera head controlling unit 11405. The CCU 11201 includes a communication unit 11411, an image processing unit 11412 and a control unit 11413. The camera head 11102 and the CCU 11201 are connected for communication to each other by a transmission cable 11400.

The lens unit 11401 is an optical system, provided at a connecting location to the lens barrel 11101. Observation light taken in from a distal end of the lens barrel 11101 is guided to the camera head 11102 and introduced into the lens unit 11401. The lens unit 11401 includes a combination of a plurality of lenses including a zoom lens and a focusing lens.

The number of image pickup elements which is included by the image pickup unit 11402 may be one (single-plate type) or a plural number (multi-plate type). Where the image pickup unit 11402 is configured as that of the multi-plate type, for example, image signals corresponding to respective R, G and B are generated by the image pickup elements, and the image signals may be synthesized to obtain a color image. The image pickup unit 11402 may also be configured so as to have a pair of image pickup elements for acquiring respective image signals for the right eye and the left eye ready for three dimensional (3D) display. If 3D display is performed, then the depth of a living body tissue in a surgical region can be comprehended more accurately by the surgeon 11131. It is to be noted that, where the image pickup unit 11402 is configured as that of stereoscopic type, a plurality of systems of lens units 11401 are provided corresponding to the individual image pickup elements.

Further, the image pickup unit 11402 may not necessarily be provided on the camera head 11102. For example, the image pickup unit 11402 may be provided immediately behind the objective lens in the inside of the lens barrel 11101.

The driving unit 11403 includes an actuator and moves the zoom lens and the focusing lens of the lens unit 11401 by a predetermined distance along an optical axis under the control of the camera head controlling unit 11405. Consequently, the magnification and the focal point of a picked up image by the image pickup unit 11402 can be adjusted suitably.

The communication unit 11404 includes a communication apparatus for transmitting and receiving various kinds of information to and from the CCU 11201. The communication unit 11404 transmits an image signal acquired from the image pickup unit 11402 as RAW data to the CCU 11201 through the transmission cable 11400.

In addition, the communication unit 11404 receives a control signal for controlling driving of the camera head 11102 from the CCU 11201 and supplies the control signal to the camera head controlling unit 11405. The control signal includes information relating to image pickup conditions such as, for example, information that a frame rate of a picked up image is designated, information that an exposure value upon image picking up is designated and/or information that a magnification and a focal point of a picked up image are designated.

It is to be noted that the image pickup conditions such as the frame rate, exposure value, magnification or focal point may be designated by the user or may be set automatically by the control unit 11413 of the CCU 11201 on the basis of an acquired image signal. In the latter case, an auto exposure (AE) function, an auto focus (AF) function and an auto white balance (AWB) function are incorporated in the endoscope 11100.

The camera head controlling unit 11405 controls driving of the camera head 11102 on the basis of a control signal from the CCU 11201 received through the communication unit 11404.

The communication unit 11411 includes a communication apparatus for transmitting and receiving various kinds of information to and from the camera head 11102. The communication unit 11411 receives an image signal transmitted thereto from the camera head 11102 through the transmission cable 11400.

Further, the communication unit 11411 transmits a control signal for controlling driving of the camera head 11102 to the camera head 11102. The image signal and the control signal can be transmitted by electrical communication, optical communication or the like.

The image processing unit 11412 performs various image processes for an image signal in the form of RAW data transmitted thereto from the camera head 11102.

The control unit 11413 performs various kinds of control relating to image picking up of a surgical region or the like by the endoscope 11100 and display of a picked up image obtained by image picking up of the surgical region or the like. For example, the control unit 11413 creates a control signal for controlling driving of the camera head 11102.

Further, the control unit 11413 controls, on the basis of an image signal for which image processes have been performed by the image processing unit 11412, the display apparatus 11202 to display a picked up image in which the surgical region or the like is imaged. Thereupon, the control unit 11413 may recognize various objects in the picked up image using various image recognition technologies. For example, the control unit 11413 can recognize a surgical tool such as forceps, a particular living body region, bleeding, mist when the energy device 11112 is used and so forth by detecting the shape, color and so forth of edges of objects included in a picked up image. The control unit 11413 may cause, when it controls the display apparatus 11202 to display a picked up image, various kinds of surgery supporting information to be displayed in an overlapping manner with an image of the surgical region using a result of the recognition. Where surgery supporting information is displayed in an overlapping manner and presented to the surgeon 11131, the burden on the surgeon 11131 can be reduced and the surgeon 11131 can proceed with the surgery with certainty.

The transmission cable 11400 which connects the camera head 11102 and the CCU 11201 to each other is an electric signal cable ready for communication of an electric signal, an optical fiber ready for optical communication or a composite cable ready for both of electrical and optical communications.

Here, while, in the example depicted, communication is performed by wired communication using the transmission cable 11400, the communication between the camera head 11102 and the CCU 11201 may be performed by wireless communication.

The description has been given above of one example of the endoscopic surgery system, to which the technology according to an embodiment of the present disclosure is applicable. The technology according to an embodiment of the present disclosure is suitably applicable to, for example, the image pickup unit 11402 provided in the camera head 11102 of the endoscope 11100, among the configurations described above. Applying the technology according to an embodiment of the present disclosure to the image pickup unit 11402 enables miniaturization or higher definition of the image pickup unit 11402, thus making it possible to provide the miniaturized or high-definition endoscope 11100.

Although the description has been given hereinabove of the present disclosure with reference to the embodiments and modification examples thereof, the application example, and the practical application examples, the present disclosure is not limited to the foregoing embodiment, etc., and various modifications may be made. It is to be noted that the effects described herein are merely illustrative. The effects of the present disclosure are not limited to those described herein. The present disclosure may have other effects than those described herein.

In addition, the present disclosure may also have the following configurations.

(1)

An imaging apparatus including:

a plurality of pixels each including a photoelectric conversion element, and disposed in matrix on a light-receiving surface;

a plurality of light-receiving lenses provided one by one for each of the plurality of pixels in the plurality of pixels; and a control section that controls exposure times of the plurality of pixels, the control section controlling the exposure times of the plurality of pixels to allow exposure times of at least two of the pixels, of the plurality of pixels corresponding to each of the light-receiving lenses, to be the same, and exposure times of at least two of the pixels, of the plurality of pixels corresponding to each of the light-receiving lenses, to be different from each other.

(2)

The imaging apparatus according to (1), further including a plurality of color filters in a Bayer arrangement provided for each of first pixel groups, the first pixel groups each being the plurality of pixels corresponding to each of the light-receiving lenses.

(3)

The imaging apparatus according to (2), in which the control section controls the exposure times of the plurality of pixels to allow exposure times of two of the pixels, of the plurality of pixels corresponding to each of the light-receiving lenses, to be the same, and exposure times of three of the pixels, of the plurality of pixels corresponding to each of the light-receiving lenses, to be different.

(4)

The imaging apparatus according to (3), in which the control section controls the exposure times of the plurality of pixels to allow exposure times of two of the pixels arranged in a right upward direction, a right downward direction, a horizontal direction, or a vertical direction on the light-receiving surface to be the same, in the plurality of pixels corresponding to each of the light-receiving lenses.

(5)

The imaging apparatus according to (2), in which the control section controls the exposure times of the plurality of pixels to allow exposure times of two of the pixels arranged in a first direction to be the same in a first group of the first pixel groups included in each of second pixel groups, the second pixel groups each being the plurality of first pixel groups in two rows×two columns, and exposure times of two of the pixels arranged in a second direction to be the same in a second group of the first pixel groups included in each of the second pixel groups.

(6)

The imaging apparatus according to (2), in which the control section controls the exposure times of the plurality of pixels to allow exposure times of two of the pixels arranged in a first direction to be the same in a first group of second pixel groups included in each of third pixel groups, the second pixel groups each being the plurality of first pixel groups in two rows×two columns, the third pixel groups each being the second pixel groups in two rows×two columns, exposure times of two of the pixels arranged in a second direction to be the same in a second group of the second pixel groups included in each of the third pixel groups, and exposure times of two of the pixels arranged in a third direction to be the same in a third group of the second pixel groups included in each of the third pixel groups.

(7)

The imaging apparatus according to (2), in which the control section controls the exposure times of the plurality of pixels to allow exposure times of two of the pixels arranged in a first direction to be the same, and exposure times of two of the pixels arranged in a second direction to be the same, in a first group of the first pixel groups included in each of second pixel groups, the second pixel groups each being the plurality of first pixel groups in two rows×two columns, and exposure times of two of the pixels arranged in the first direction to be the same, and exposure times of two of the pixels arranged in the second direction to be the same, in a second group of the first pixel groups included in each of the second pixel groups.

(8)

The imaging apparatus according to (2), in which the control section controls the exposure times of the plurality of pixels to allow exposure times of two of the pixels arranged in a first direction to be the same, and exposure times of two of the pixels arranged in the first direction, which are different from the two of the pixels arranged in the first direction, to be the same, in a first group of the first pixel groups included in each of second pixel groups, the second pixel groups each being the plurality of first pixel groups in two rows×two columns, and exposure times of two of the pixels arranged in a second direction to be the same, and exposure times of two of the pixels arranged in the second direction, which are different from the two of the pixels arranged in the second direction, to be the same, in a second group of the first pixel groups included in each of the second pixel groups.

(9)

The imaging apparatus according to (2), in which the control section controls the exposure times of the plurality of pixels to allow exposure times of the pixels to be the same as each other in one of the first pixel groups included in each of third pixel groups, the third pixel groups each being second pixel groups in two rows×two columns, the second pixel groups each being the plurality of first pixel groups in two rows×two columns.

(10)

The imaging apparatus according to (2), in which the control section controls the exposure times of the plurality of pixels to allow exposure times of the pixels to be the same as each other in one of second pixel groups included in each of third pixel groups, the second pixel groups each being the plurality of first pixel groups in two rows×two columns, the third pixel groups each being the second pixel groups in two rows×two columns.

(11)

The imaging apparatus according to (2), in which the control section controls the exposure times of the plurality of pixels to allow exposure times of the pixels to be the same in each of second pixel groups included in each of third pixel groups, the second pixel groups each being the plurality of first pixel groups in two rows×two columns, the third pixel groups each being the second pixel groups in two rows×two columns.

(12)

The imaging apparatus according to (2), in which the control section controls the exposure times of the plurality of pixels to allow exposure times of two of the pixels arranged in a first direction to be the same in each of the first pixel groups in a first group of second pixel groups included in each of fourth pixel groups, the second pixel groups each being the plurality of first pixel groups in two rows×two columns, the fourth pixel groups each being the second pixel groups in one row×two columns, and exposure times of two of the pixels arranged in a second direction to be the same in each of the first pixel groups in a second group of the second pixel groups included in each of the fourth pixel groups.

(13)

The imaging apparatus according to (2), in which the control section controls the exposure times of the plurality of pixels to allow exposure times of two of the pixels arranged in a first direction to be the same in each of the first pixel groups in a first group of second pixel groups included in each of fifth pixel groups, the second pixel groups each being the plurality of first pixel groups in two rows×two columns, the fifth pixel groups each being the second pixel groups in two rows×one column, and exposure times of two of the pixels arranged in a second direction to be the same in each of the first pixel groups in a second group of the second pixel groups included in each of the fifth pixel groups.

(14)

The imaging apparatus according to (2), in which the control section controls the exposure times of the plurality of pixels to allow exposure times of two of the pixels arranged in a first direction to be the same in each of the first pixel groups in a first group of second pixel groups included in each of third pixel groups, the second pixel groups each being the plurality of first pixel groups in two rows×two columns, the third pixel groups each being the second pixel groups in two rows×two columns, exposure times of two of the pixels arranged in a second direction to be the same in each of the first pixel groups in a second group of the second pixel groups included in each of the third pixel groups, and exposure times of two of the pixels arranged in a third direction to be the same in each of the first pixel groups in a third group of the second pixel groups included in each of the third pixel groups.

(15)

The imaging apparatus according to (2), in which the control section controls the exposure times of the plurality of pixels to allow exposure times of two of the pixels arranged in a first direction to be the same, and exposure times of two of the pixels arranged in a second direction to be the same in each of the first pixel groups in a first group of second pixel groups included in each of third pixel groups, the second pixel groups each being the plurality of first pixel groups in two rows×two columns, the third pixel groups each being the second pixel groups in two rows×two columns, and exposure times of two of the pixels arranged in the first direction to be the same, and exposure times of two of the pixels arranged in the second direction to be the same in each of the first pixel groups in a second group of the second pixel groups included in each of the third pixel groups.

(16)

The imaging apparatus according to (2), in which the control section controls the exposure times of the plurality of pixels to allow exposure times of two of the pixels arranged in a first direction to be the same, and exposure times of two of the pixels arranged in the first direction, which are different from the two of the pixels arranged in the first direction, to be the same in each of the first pixel groups in a first group of second pixel groups included in each of third pixel groups, the second pixel groups each being the plurality of first pixel groups in two rows×two columns, the third pixel groups each being the second pixel groups in two rows×two columns, and exposure times of two of the pixels arranged in a second direction to be the same, and exposure times of two of the pixels arranged in the second direction, which are different from the two of the pixels arranged in the second direction, to be the same in each of the first pixel groups in a second group of the second pixel groups included in each of the third pixel groups.

(17)

The imaging apparatus according to (2), in which phase difference data is generated for each of the exposure times from image data obtained by exposure control by the control section, and a High Dynamic Range image is generated from a plurality of the phase difference data having different exposure times and a plurality of image data having different exposure times.

(18)

A signal processing method, in an imaging apparatus including a plurality of pixels each including a photoelectric conversion element and disposed in matrix on a light-receiving surface, and a plurality of light-receiving lenses provided one by one for each of the plurality of pixels in the plurality of pixels, the signal processing method including:

controlling exposure times of the plurality of pixels to allow exposure times of at least two of the pixels, of the plurality of pixels corresponding to each of the light-receiving lenses, to be the same, and exposure times of at least two of the pixels, of the plurality of pixels corresponding to each of the light-receiving lenses, to be different from each other; and generating phase difference data for each of the exposure times from image data obtained by control of the exposure times, and generating a High Dynamic Range image from a plurality of the phase difference data having different exposure times and a plurality of image data having different exposure times.

According to the imaging apparatus of a first aspect of the present disclosure and the signal processing method of a second aspect of the present disclosure, it is possible to generate phase difference data for each of the exposure times from image data obtained by exposure control by the control section, and to generate an HDR image from a plurality of the phase difference data having different exposure times and a plurality of image data having different exposure times, thus making it possible to suppress occurrence of image quality degradation such as decoloration, coloration, and double contour. As a result, it is possible to suppress image quality degradation of an HDR image. It is to be noted that the effects of the present technology are not necessarily limited to the effects described here, and may be any of the effects described herein.

This application claims the benefit of Japanese Priority Patent Application JP2019-027479 filed with the Japan Patent Office on Feb. 19, 2019, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. An imaging apparatus, comprising:
a plurality of pixels, wherein
each pixel of the plurality of pixels includes a photoelectric conversion element,
the plurality of pixels is in a matrix on a light-receiving surface,
the plurality of pixels corresponds to a plurality of pixel groups,
the plurality of pixel groups includes a plurality of first pixel groups, a plurality of second pixel groups, and a third pixel group,
each pixel group of the plurality of first pixel groups includes pixels of the plurality of pixels in two rows×two columns arrangement,
each pixel group of the plurality of second pixel groups includes pixel groups from the plurality of first pixel groups in two rows×two columns arrangement,
the third pixel group includes the plurality of second pixel groups in two rows×two columns arrangement,
the plurality of second pixel groups in the third pixel group includes:
a first group that includes a first set of two pixels in a first direction;
a second group that includes a second set of two pixels in a second direction; and
a third group that includes a third set of two pixels in a third direction,
the third direction is different from each of the first direction and the second direction, and
the first direction is different from the second direction;
a plurality of light-receiving lenses, wherein each of the plurality of light-receiving lenses is associated with a corresponding pixel group of the plurality of first pixel groups; and
a control section configured to control an exposure time associated with each of the plurality of pixels, wherein
the exposure time for the first set of two pixels in the first direction in the first group is same,
the exposure time for the second set of two pixels in the second direction in the second group is same,
the exposure time for the third set of two pixels in the third direction in the third group is same,
the exposure time of the third set of two pixels is different from each of:
the exposure time of the first set of two pixels, and
the exposure time of the second set of two pixels, and
the exposure time of the second set of two pixels is different from the exposure time of the first set of two pixels.

2. The imaging apparatus according to claim 1, further comprising a plurality of color filters in a Bayer arrangement, wherein each of the plurality of color filters is associated with a corresponding pixel group of the plurality of pixel groups.

3. The imaging apparatus according to claim 2, wherein the plurality of first pixel groups in the first group of the plurality of second pixel groups includes:
a fourth group that includes the first set of two pixels in the first direction; and
a fifth group that includes a fourth set of two pixels in the second direction, and
the exposure time of the fourth set of two pixels is same.

4. The imaging apparatus according to claim 2, wherein the plurality of first pixel groups in the first group of the plurality of second pixel groups includes:
a fourth group that includes:
the first set of two pixels in the first direction; and
a fourth set of two pixels in the second direction; and
a fifth group that includes:
the first set of two pixels in the first direction; and
a fifth set of two pixels in the second direction,
the exposure time of the fourth set of two pixels in the second direction is same, and
the exposure time of the fifth set of two pixels is same.

5. The imaging apparatus according to claim 2, wherein the plurality of first pixel groups in the first group of the plurality of second pixel groups includes:
a fourth group that includes:
the first set of two pixels in the first direction; and
a fourth set of two pixels in the first direction, wherein the fourth set of two pixels is different from the first set of two pixels; and
a fifth group that includes:
a fifth set of two pixels in the second direction; and
a sixth set of two pixels in the second direction, wherein the fifth set of two pixels is different from the sixth set of two pixels,
the exposure time of the fourth set of two pixels is same,
the exposure time of the fifth set of two pixels is same, and
the exposure time of the sixth set of two pixels is same.

6. The imaging apparatus according to claim 2, wherein the third pixel group further includes a specific pixel group of the plurality of first pixel groups,
the control section is further configured to control the exposure time associated with each pixel of the specific pixel group, and
the exposure time of each pixel in the specific pixel group is same.

7. The imaging apparatus according to claim 2, wherein the plurality of second pixel groups further includes a fourth group,
the control section is further configured to control the exposure time associated with each pixel in the fourth group of the plurality of second pixel groups, and
the exposure time of each pixel in the fourth group of the plurality of second pixel groups is same.

8. The imaging apparatus according to claim 2, wherein the plurality of pixel groups further comprises a plurality of fourth pixel groups,
each of the plurality of fourth pixel groups includes a set of second pixel groups of the plurality of second pixel groups in one row×two columns,
the set of second pixel groups of one of the plurality of fourth pixel groups includes the first group of the plurality of second pixel groups and the second group of the plurality of second pixel groups,
the first set of two pixels in the first direction corresponds to a group of the plurality of first pixel groups in the first group of the plurality of second pixel groups, and
the second set of two pixels in the second direction corresponds to a group of the plurality of first pixel groups in the second group of the plurality of second pixel groups.

9. The imaging apparatus according to claim 2, wherein the plurality of pixel groups further comprises a plurality of fifth pixel groups,
each of the plurality of fifth pixel groups includes a set of second pixel groups of the plurality of second pixel groups in two rows×one column,
the set of second pixel groups of each of the plurality of fifth pixel groups includes the first group of the plurality of second pixel groups and the second group of the plurality of second pixel groups,
the first set of two pixels in the first direction corresponds to a group of the plurality of first pixel groups in the first group of the plurality of second pixel groups, and
the second set of two pixels in the second direction corresponds to a group of the plurality of first pixel groups in the second group of the plurality of second pixel groups.

10. The imaging apparatus according to claim 2, wherein the first group of the plurality of second pixel groups includes a first set of first pixel groups of the plurality of first pixel groups,
each pixel group of the first set of first pixel groups includes a fourth set of two pixels in the first direction and a fifth set of two pixels in the second direction,
the second group of the plurality of second pixel groups includes a second set of first pixel groups of the plurality of first pixel groups,
each pixel group of the second set of first pixel groups includes a sixth set of two pixels in the second direction and a seventh set of two pixels in the first direction,
the exposure time of the fourth set of two pixels is same,
the exposure time of the fifth set of two pixels is same,
the exposure time of the sixth set of two pixels is same, and
the exposure time of the seventh set of two pixels is same.

11. The imaging apparatus according to claim 2, wherein the first group of the plurality of second pixel groups includes a first set of first pixel groups of the plurality of first pixel groups,
each pixel group of the first set of first pixel groups includes a fourth set of two pixels in the first direction and a fifth set of two pixels in the first direction, wherein the fourth set of two pixels is different from the fifth set of two pixels,
the second group of the plurality of second pixel groups includes a second set of first pixel groups of the plurality of first pixel groups,
each pixel group of the second set of pixel groups includes a sixth set of two pixels in the second direction and a seventh set of two pixels in the second direction, wherein the sixth set of two pixels is different from the seventh set of two pixels,
the exposure time of the fourth set of two pixels is same,
the exposure time of the fifth set of two pixels is same,
the exposure time of the sixth set of two pixels is same, and
the exposure time of the seventh set of two pixels is same.

12. The imaging apparatus according to claim 2, further comprising an arithmetic circuit configured to:

generate phase difference data for each of the exposure time of the first set of two pixels, the exposure time of the second set of two pixels, and the exposure time of the third set of two pixels, based on image data, wherein the image data is based on the exposure time associated with each of the plurality of pixels; and generate a High Dynamic Range image based on the generated phase difference data.

13. The imaging apparatus according to claim 1, wherein the first direction is one of a right upward direction, a right downward direction, a horizontal direction, or a vertical direction on the light-receiving surface.

14. The imaging apparatus according to claim 1, wherein each pixel group of the plurality of first pixel groups in the first group of the plurality of second pixel groups includes:
   a third pixel that is different from the first set of two pixels; and
   a fourth pixel that is different from the third pixel and the first set of two pixels,
the exposure time of the third pixel is different from the exposure time of the first set of two pixels, and
the exposure time of the fourth pixel is different from the exposure time of the first set of two pixels and the exposure time of the third pixel.

15. A signal processing method, comprising:
in an imaging apparatus that includes a plurality of pixels and a plurality of light-receiving lenses, wherein each of the plurality of pixels includes a photoelectric conversion element and each of the plurality of light-receiving lenses is associated with a corresponding pixel group of a plurality of first pixel groups of a plurality of pixel groups of the plurality of pixels:
   controlling an exposure time associated with each of the plurality of pixels, wherein
      the plurality of pixel groups includes the plurality of first pixel groups, a plurality of second pixel groups, and a third pixel group,
      each pixel group of the plurality of first pixel groups includes pixels of the plurality of pixels in two rows×two columns arrangement,
      each pixel group of the plurality of second pixel groups includes pixel groups from the plurality of first pixel groups in two rows×two columns arrangement,
      the third pixel group includes the plurality of second pixel groups in two rows×two columns arrangement,
      the plurality of second pixel groups in the third pixel group includes:
         a first group that includes a first set of two pixels in a first direction;
         a second group that includes a second set of two pixels in a second direction; and
         a third group that includes a third set of two pixels in a third direction,
      the third direction is different from each of the first direction and the second direction,
      the first direction is different from the second direction,
      the exposure time for the first set of two pixels in the first direction in the first group is same,
      the exposure time for the second set of two pixels in the second direction in the second group is same,
      the exposure time for the third set of two pixels in the third direction in the third group is same,
      the exposure time of the third set of two pixels is different from each of:
         the exposure time of the first set of two pixels, and
         the exposure time of the second set of two pixels, and
      the exposure time of the second set of two pixels is different from the exposure time of the first set of two pixels;
generating phase difference data for each of the exposure time of the first set of two pixels, the exposure time of the second set of two pixels, and the exposure time of the third set of two pixels, based on image data, wherein the image data is based on the controlled exposure time associated with each of the plurality of pixels; and
generating a High Dynamic Range image based on the generated phase difference data.

* * * * *